US009842220B1

(12) United States Patent
Brisebois et al.

(10) Patent No.: US 9,842,220 B1
(45) Date of Patent: Dec. 12, 2017

(54) SYSTEMS AND METHODS OF SECURE SELF-SERVICE ACCESS TO CONTENT

(71) Applicant: Dell Software Inc., Aliso Viejo, CA (US)

(72) Inventors: Michel Albert Brisebois, Renfrew (CA); Curtis T. Johnstone, Ottawa (CA); Olivier Le Rudulier, Halifax (CA)

(73) Assignee: Dell Software Inc., Aliso Viejo, CA (US)

( * ) Notice: Subject to any disclaimer, the term of this patent is extended or adjusted under 35 U.S.C. 154(b) by 82 days.

(21) Appl. No.: 14/683,441

(22) Filed: Apr. 10, 2015

(51) Int. Cl.
*G06F 21/62* (2013.01)
*H04L 29/06* (2006.01)

(52) U.S. Cl.
CPC ........ *G06F 21/6218* (2013.01); *H04L 63/102* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 5,675,711 A | 10/1997 | Kephart et al. | |
| 6,009,439 A | 12/1999 | Shiomi et al. | |
| 6,012,087 A | 1/2000 | Freivald et al. | |
| 6,092,059 A | 7/2000 | Straforini et al. | |
| 6,266,656 B1 | 7/2001 | Ohno | |
| 6,310,944 B1 | 10/2001 | Brisebois et al. | |
| 6,345,327 B1 | 2/2002 | Baskey et al. | |
| 6,415,282 B1 | 7/2002 | Mukherjea et al. | |
| 6,421,676 B1 | 7/2002 | Krishnamurthy et al. | |
| 6,633,835 B1 | 10/2003 | Moran et al. | |
| 6,647,396 B2 | 11/2003 | Parnell et al. | |
| 6,735,701 B1 | 5/2004 | Jacobson | |
| 6,883,019 B1 | 4/2005 | Sengupta et al. | |
| 7,047,236 B2 | 5/2006 | Conroy et al. | |

(Continued)

FOREIGN PATENT DOCUMENTS

| | | | |
|---|---|---|---|
| WO | WO-2011/103385 A1 | 8/2011 | |
| WO | WO-2013/166126 A1 | 11/2013 | |

(Continued)

OTHER PUBLICATIONS

U.S. Appl. No. 15/080,755, Brisebois et al.

(Continued)

*Primary Examiner* — Michael R Vaughan
(74) *Attorney, Agent, or Firm* — Winstead PC

(57) ABSTRACT

In one embodiment, a method is performed by a computer system. The method includes receiving a request from a user to access particular content. The method further includes determining a trust measure of the user, wherein the trust measure is based, at least in part, on an analysis of logged user-initiated communication events of the user on a plurality of communications platforms. In addition, the method includes accessing a self-service access policy applicable to the particular content. Further, the method includes ascertaining, from the self-service access policy, a trust threshold applicable to the particular content. Moreover, the method includes, responsive to a determination that the trust measure fails to satisfy the trust threshold, automatically denying access by the user to the particular content.

18 Claims, 28 Drawing Sheets

(56) References Cited

U.S. PATENT DOCUMENTS

| | | |
|---|---|---|
| 7,058,621 B1 | 6/2006 | Wolge |
| 7,318,040 B2 | 1/2008 | Doss et al. |
| 7,363,278 B2 | 4/2008 | Schmelzer et al. |
| 7,516,045 B2 | 4/2009 | Butler |
| 7,516,492 B1 | 4/2009 | Nisbet et al. |
| 7,668,157 B2 | 2/2010 | Weintraub et al. |
| 7,730,537 B2 | 6/2010 | Bardsley et al. |
| 7,739,210 B2 | 6/2010 | Horvitz et al. |
| 7,760,684 B2 | 7/2010 | Kadar et al. |
| 7,769,751 B1 | 8/2010 | Wu et al. |
| 7,809,856 B2 | 10/2010 | Skarpness |
| 7,836,097 B2 | 11/2010 | Blackstone et al. |
| 7,886,359 B2 | 2/2011 | Jones et al. |
| 7,908,647 B1 | 3/2011 | Polis et al. |
| 7,996,373 B1 | 8/2011 | Zoppas et al. |
| 7,996,374 B1 | 8/2011 | Jones et al. |
| 7,996,670 B1 | 8/2011 | Krishna et al. |
| 8,010,466 B2 | 8/2011 | Patinkin |
| 8,065,739 B1 | 11/2011 | Bruening et al. |
| 8,086,538 B2 | 12/2011 | D'Alo' et al. |
| 8,132,250 B2 | 3/2012 | Judge et al. |
| 8,141,127 B1 | 3/2012 | Mustafa |
| 8,156,553 B1 | 4/2012 | Church et al. |
| 8,224,924 B2 | 7/2012 | Andersen et al. |
| 8,255,370 B1 | 8/2012 | Zoppas et al. |
| 8,255,419 B2 | 8/2012 | Grebenik et al. |
| 8,286,254 B2 | 10/2012 | Kraemer et al. |
| 8,341,734 B1 | 12/2012 | Hernacki et al. |
| 8,346,929 B1 | 1/2013 | Lai |
| 8,359,472 B1 | 1/2013 | Ren et al. |
| 8,407,194 B1 | 3/2013 | Chaput et al. |
| 8,429,179 B1 | 4/2013 | Mirhaji |
| 8,429,260 B2 | 4/2013 | Siegel et al. |
| 8,489,615 B2 | 7/2013 | Dhara et al. |
| 8,549,643 B1 | 10/2013 | Shou |
| 8,620,922 B2 | 12/2013 | Bird et al. |
| 8,649,499 B1 | 2/2014 | Koster et al. |
| 8,671,190 B2 | 3/2014 | Liyanage et al. |
| 8,677,448 B1 * | 3/2014 | Kauffman .......... G06F 17/30082 726/1 |
| 8,706,692 B1 | 4/2014 | Luthra et al. |
| 8,745,091 B2 | 6/2014 | McHenry et al. |
| 8,756,087 B1 | 6/2014 | Ambikar |
| 8,763,140 B2 | 6/2014 | Marcus et al. |
| 8,769,073 B2 | 7/2014 | Humphreys et al. |
| 8,839,350 B1 | 9/2014 | McNair et al. |
| 8,863,272 B1 | 10/2014 | Maeng |
| 8,943,575 B2 | 1/2015 | Kumar et al. |
| 9,015,832 B1 | 4/2015 | Lachwani et al. |
| 9,111,069 B1 | 8/2015 | Torney et al. |
| 9,172,738 B1 | 10/2015 | daCosta |
| 9,183,384 B1 | 11/2015 | Bruhmuller |
| 9,202,063 B1 | 12/2015 | Ekke et al. |
| 9,213,847 B2 | 12/2015 | Farkash et al. |
| 9,300,693 B1 | 3/2016 | Manmohan et al. |
| 9,349,016 B1 | 5/2016 | Brisebois et al. |
| 9,390,240 B1 | 7/2016 | Brisebois et al. |
| 9,705,817 B2 | 7/2017 | Lui et al. |
| 2001/0015817 A1 | 8/2001 | Adachi |
| 2002/0083063 A1 | 6/2002 | Egolf |
| 2002/0087682 A1 | 7/2002 | Roach |
| 2002/0091811 A1 | 7/2002 | Schweitzer et al. |
| 2002/0143595 A1 | 10/2002 | Frank et al. |
| 2002/0162031 A1 | 10/2002 | Levin et al. |
| 2002/0169679 A1 | 11/2002 | Neumayer |
| 2003/0028525 A1 | 2/2003 | Santos et al. |
| 2003/0172368 A1 | 9/2003 | Alumbaugh et al. |
| 2003/0207685 A1 | 11/2003 | Rankin |
| 2003/0226035 A1 | 12/2003 | Robert et al. |
| 2004/0034659 A1 | 2/2004 | Steger |
| 2004/0044482 A1 | 3/2004 | Takeda et al. |
| 2004/0048232 A1 | 3/2004 | Murphy et al. |
| 2004/0083389 A1 | 4/2004 | Yoshida |
| 2004/0199491 A1 | 10/2004 | Bhatt |
| 2004/0205661 A1 | 10/2004 | Gallemore |
| 2005/0060295 A1 | 3/2005 | Gould et al. |
| 2005/0097320 A1 | 5/2005 | Golan et al. |
| 2005/0226495 A1 | 10/2005 | Li |
| 2005/0240754 A1 | 10/2005 | Auterinen |
| 2005/0251675 A1 | 11/2005 | Marcjan et al. |
| 2005/0262061 A1 | 11/2005 | Moritsu et al. |
| 2006/0013456 A1 | 1/2006 | Soykan |
| 2006/0019397 A1 | 1/2006 | Soykan |
| 2006/0031465 A1 | 2/2006 | Ahya et al. |
| 2006/0069686 A1 | 3/2006 | Beyda et al. |
| 2006/0090202 A1 * | 4/2006 | Liu .......... H04L 63/101 726/17 |
| 2006/0167696 A1 | 7/2006 | Chaar et al. |
| 2006/0178910 A1 | 8/2006 | Eisenberger et al. |
| 2006/0218110 A1 | 9/2006 | Simske et al. |
| 2006/0218134 A1 | 9/2006 | Simske et al. |
| 2006/0224994 A1 | 10/2006 | Cheemalapati et al. |
| 2006/0259333 A1 | 11/2006 | Pyburn et al. |
| 2007/0014537 A1 | 1/2007 | Wesemann et al. |
| 2007/0050854 A1 | 3/2007 | Cooperstein et al. |
| 2007/0100812 A1 | 5/2007 | Simske et al. |
| 2007/0143851 A1 | 6/2007 | Nicodemus et al. |
| 2007/0180509 A1 | 8/2007 | Swartz et al. |
| 2007/0198330 A1 | 8/2007 | Korenblit et al. |
| 2007/0219964 A1 | 9/2007 | Cannon et al. |
| 2007/0282908 A1 | 12/2007 | Van der Meulen et al. |
| 2008/0022370 A1 | 1/2008 | Beedubail et al. |
| 2008/0026768 A1 | 1/2008 | Fok et al. |
| 2008/0028453 A1 | 1/2008 | Nguyen et al. |
| 2008/0052217 A1 | 2/2008 | Etkin |
| 2008/0083021 A1 | 4/2008 | Doane et al. |
| 2008/0184366 A1 | 7/2008 | Alperovitch et al. |
| 2008/0208475 A1 | 8/2008 | Karr et al. |
| 2008/0222111 A1 | 9/2008 | Hoang et al. |
| 2008/0250054 A1 | 10/2008 | Nickel |
| 2008/0254774 A1 | 10/2008 | Lee |
| 2009/0006982 A1 | 1/2009 | Curtis et al. |
| 2009/0019065 A1 | 1/2009 | Sapounas |
| 2009/0086252 A1 | 4/2009 | Zucker et al. |
| 2009/0106836 A1 | 4/2009 | Toshima et al. |
| 2009/0177529 A1 | 7/2009 | Hadi |
| 2009/0182820 A1 | 7/2009 | Hamilton, II et al. |
| 2009/0192853 A1 * | 7/2009 | Drake .................. G06Q 10/06 705/319 |
| 2009/0254971 A1 | 10/2009 | Herz et al. |
| 2009/0258636 A1 | 10/2009 | Helvick |
| 2009/0265655 A1 | 10/2009 | Fiedler |
| 2009/0276346 A1 | 11/2009 | Rukonic et al. |
| 2009/0279346 A1 | 11/2009 | Manohar et al. |
| 2009/0292548 A1 | 11/2009 | Van Court |
| 2010/0036779 A1 | 2/2010 | Sadeh-Koniecpol et al. |
| 2010/0042448 A1 | 2/2010 | Bess |
| 2010/0066822 A1 | 3/2010 | Steinberg et al. |
| 2010/0070461 A1 | 3/2010 | Vella et al. |
| 2010/0125911 A1 | 5/2010 | Bhaskaran |
| 2010/0131356 A1 | 5/2010 | Stevens et al. |
| 2010/0132041 A1 | 5/2010 | Chu et al. |
| 2010/0162347 A1 | 6/2010 | Barile |
| 2010/0174813 A1 | 7/2010 | Hildreth et al. |
| 2010/0199287 A1 | 8/2010 | Boda et al. |
| 2010/0235915 A1 | 9/2010 | Memon et al. |
| 2010/0250498 A1 | 9/2010 | Andersen et al. |
| 2010/0273447 A1 | 10/2010 | Mann et al. |
| 2010/0284290 A1 | 11/2010 | Williams |
| 2010/0293543 A1 | 11/2010 | Erhart et al. |
| 2010/0306850 A1 | 12/2010 | Barile et al. |
| 2011/0016534 A1 | 1/2011 | Jakobsson et al. |
| 2011/0055923 A1 | 3/2011 | Thomas |
| 2011/0066468 A1 | 3/2011 | Huang et al. |
| 2011/0093293 A1 | 4/2011 | G. N. et al. |
| 2011/0106797 A1 | 5/2011 | Palakodety et al. |
| 2011/0119730 A1 | 5/2011 | Eldar et al. |
| 2011/0209159 A1 | 8/2011 | Baratz et al. |
| 2011/0213788 A1 | 9/2011 | Zhao et al. |
| 2011/0225650 A1 | 9/2011 | Margolies et al. |
| 2011/0270834 A1 | 11/2011 | Sokolan et al. |
| 2011/0296354 A1 | 12/2011 | Zambetti et al. |
| 2011/0314558 A1 | 12/2011 | Song et al. |
| 2011/0321117 A1 | 12/2011 | Nestler et al. |

(56) References Cited

U.S. PATENT DOCUMENTS

| | | |
|---|---|---|
| 2012/0041929 A1 | 2/2012 | Kapoor |
| 2012/0047439 A1 | 2/2012 | Harlan et al. |
| 2012/0101870 A1 | 4/2012 | Gates et al. |
| 2012/0109802 A1 | 5/2012 | Griffin et al. |
| 2012/0110092 A1 | 5/2012 | Keohane et al. |
| 2012/0130809 A1 | 5/2012 | Tedjamulia et al. |
| 2012/0137061 A1 | 5/2012 | Yang et al. |
| 2012/0137340 A1 | 5/2012 | Jakobsson et al. |
| 2012/0150581 A1 | 6/2012 | Mcphail |
| 2012/0150773 A1 | 6/2012 | DiCorpo et al. |
| 2012/0158846 A1 | 6/2012 | Linder |
| 2012/0167170 A1 | 6/2012 | Shi et al. |
| 2012/0180120 A1 | 7/2012 | Jain |
| 2012/0203733 A1 | 8/2012 | Zhang |
| 2012/0204260 A1 | 8/2012 | Cecil et al. |
| 2012/0215491 A1 | 8/2012 | Theriot et al. |
| 2012/0240183 A1 | 9/2012 | Sinha |
| 2012/0272156 A1 | 10/2012 | Kerger et al. |
| 2012/0290666 A1 | 11/2012 | Fabre et al. |
| 2012/0291087 A1 | 11/2012 | Agrawal |
| 2012/0311696 A1 | 12/2012 | Datsenko et al. |
| 2012/0324008 A1 | 12/2012 | Werz, III et al. |
| 2013/0042327 A1 | 2/2013 | Chow |
| 2013/0057696 A1 | 3/2013 | Felt et al. |
| 2013/0067351 A1 | 3/2013 | Yokoi et al. |
| 2013/0086684 A1 | 4/2013 | Mohler |
| 2013/0097662 A1 | 4/2013 | Pearcy et al. |
| 2013/0097701 A1 | 4/2013 | Moyle et al. |
| 2013/0097709 A1 | 4/2013 | Basavapatna et al. |
| 2013/0102290 A1 | 4/2013 | Akhtar et al. |
| 2013/0117268 A1 | 5/2013 | Smith et al. |
| 2013/0130652 A1 | 5/2013 | Deasy et al. |
| 2013/0132566 A1 | 5/2013 | Olsen et al. |
| 2013/0198811 A1 | 8/2013 | Yu et al. |
| 2013/0211876 A1 | 8/2013 | Perler |
| 2013/0227641 A1 | 8/2013 | White et al. |
| 2013/0227712 A1 | 8/2013 | Salem et al. |
| 2013/0247142 A1 | 9/2013 | Nishizawa et al. |
| 2013/0254831 A1 | 9/2013 | Roach et al. |
| 2013/0290067 A1 | 10/2013 | Barton |
| 2013/0291055 A1 | 10/2013 | Muppidi et al. |
| 2013/0298192 A1 | 11/2013 | Kumar et al. |
| 2013/0298230 A1 | 11/2013 | Kumar et al. |
| 2013/0298242 A1 | 11/2013 | Kumar et al. |
| 2013/0305357 A1 | 11/2013 | Ayyagari et al. |
| 2013/0347055 A1 | 12/2013 | Motoyama |
| 2014/0006244 A1 | 1/2014 | Crowley et al. |
| 2014/0007233 A1* | 1/2014 | Roesch ............... H04L 63/1408 726/22 |
| 2014/0019443 A1 | 1/2014 | Golshan |
| 2014/0020045 A1* | 1/2014 | Kabat ..................... G06F 21/60 726/1 |
| 2014/0026179 A1 | 1/2014 | Devarajan et al. |
| 2014/0026182 A1 | 1/2014 | Pearl et al. |
| 2014/0040182 A1 | 2/2014 | Gilder et al. |
| 2014/0040414 A1 | 2/2014 | Ronchi et al. |
| 2014/0059700 A1 | 2/2014 | Kiriyama et al. |
| 2014/0068779 A1 | 3/2014 | Tan et al. |
| 2014/0074579 A1 | 3/2014 | King |
| 2014/0081643 A1 | 3/2014 | John et al. |
| 2014/0087711 A1 | 3/2014 | Geyer et al. |
| 2014/0122153 A1 | 5/2014 | Truitt |
| 2014/0136612 A1 | 5/2014 | Redfern et al. |
| 2014/0149888 A1 | 5/2014 | Morris |
| 2014/0155028 A1 | 6/2014 | Daniela et al. |
| 2014/0157351 A1 | 6/2014 | Canning et al. |
| 2014/0165137 A1 | 6/2014 | Balinsky et al. |
| 2014/0186810 A1 | 7/2014 | Falash et al. |
| 2014/0187213 A1 | 7/2014 | Shuster et al. |
| 2014/0189784 A1 | 7/2014 | Marino et al. |
| 2014/0199663 A1 | 7/2014 | Sadeh-Koniecpol et al. |
| 2014/0199664 A1 | 7/2014 | Sadeh-Koniecpol et al. |
| 2014/0200944 A1 | 7/2014 | Henriksen et al. |
| 2014/0236737 A1 | 8/2014 | Rowe |
| 2014/0237537 A1* | 8/2014 | Manmohan ............ G06F 21/53 726/1 |
| 2014/0245394 A1 | 8/2014 | Abuelsaad et al. |
| 2014/0259130 A1 | 9/2014 | Li et al. |
| 2014/0282824 A1 | 9/2014 | Lango et al. |
| 2014/0317746 A1 | 10/2014 | Hendel et al. |
| 2014/0344281 A1 | 11/2014 | Rao et al. |
| 2014/0355749 A1 | 12/2014 | Conway et al. |
| 2014/0372162 A1 | 12/2014 | Dhara et al. |
| 2014/0380475 A1 | 12/2014 | Canning et al. |
| 2015/0039565 A1 | 2/2015 | Lucas |
| 2015/0066547 A1 | 3/2015 | Cronin |
| 2015/0074579 A1 | 3/2015 | Gladstone et al. |
| 2015/0111607 A1 | 4/2015 | Baldwin |
| 2015/0120596 A1 | 4/2015 | Fadell et al. |
| 2015/0120763 A1 | 4/2015 | Grue et al. |
| 2015/0135263 A1 | 5/2015 | Singla et al. |
| 2015/0143494 A1 | 5/2015 | Lee et al. |
| 2015/0163121 A1* | 6/2015 | Mahaffey ............ G06F 11/0766 707/687 |
| 2015/0205595 A1 | 7/2015 | Dudai |
| 2015/0215329 A1 | 7/2015 | Singla et al. |
| 2015/0215337 A1 | 7/2015 | Warren |
| 2015/0269386 A1* | 9/2015 | Khetawat ................ G06F 21/62 726/1 |
| 2015/0294275 A1 | 10/2015 | Richardson et al. |
| 2015/0339477 A1 | 11/2015 | Abrams et al. |
| 2016/0007083 A1 | 1/2016 | Gurha |
| 2016/0073148 A1 | 3/2016 | Winograd et al. |
| 2016/0098687 A1 | 4/2016 | Lamons et al. |
| 2017/0024705 A1 | 1/2017 | Richardson et al. |
| 2017/0220972 A1 | 8/2017 | Conway |

FOREIGN PATENT DOCUMENTS

| | | |
|---|---|---|
| WO | WO-2013180707 A1 | 12/2013 |
| WO | WO-2014021871 A1 | 2/2014 |
| WO | WO-2014080239 A1 | 5/2014 |

OTHER PUBLICATIONS

U.S. Appl. No. 15/081,104, Brisebois et al.
U.S. Appl. No. 15/010,960, Le Rudulier et al.
U.S. Appl. No. 14/929,460, Le Rudulier et al.
U.S. Appl. No. 14/875,120, Brisebois et al.
Microsoft; "Network Planning, Monitoring, and Troubleshooting with Lync Server"; http://www.microsoft.com/en-ca/download/details.aspx?id=39084; Jun. 10, 2015; 2 pages.
Microsoft; "Quality of Experience (QoE) database schema in Lync Server 2013"; https://technet.microsoft.com/en-us/library/gg398687.aspx; Oct. 3, 2012; 1 page.
Microsoft; "List of QoE tables in Lync Server 2013"; https://technet.microsoft.com/en-us/library/gg398236.aspx; Oct. 2, 2012; 3 pages.
Microsoft; "AppliedBandwidthSource table in Lync Server 2013"; https://technet.microsoft.com/en-us/library/gg425725.aspx; Oct. 2, 2012; 1 page.
Microsoft; "AppSharingMetricsThreshold table in Lync Server 2013"; https://technet.microsoft.com/en-us/library/jj205018.aspx; Oct. 2, 2012; 2 pages.
Microsoft; "AppSharingStream table in Lync Server 2013"; https://technet.microsoft.com/en-us/library/jj204808.aspx; Feb. 21, 2014; 5 pages.
Microsoft; "AudioClientEvent table in Lync Server 2013"; https://technet.microsoft.com/en-us/library/gg413086.aspx; Oct. 17, 2012; 2 pages.
Microsoft; "AudioSignal table in Lync Server 2013"; https://technet.microsoft.com/en-us/library/gg398064.aspx; Nov. 12, 2013; 3 pages.
Microsoft; "AudioStream table in Lync Server 2013"; https://technet.microsoft.com/en-us/library/gg425961.aspx; Oct. 2, 2012; 4 pages.
Microsoft; "CodecDescription table in Lync Server 2013"; https://technet.microsoft.com/en-us/library/jj204797.aspx; Oct. 17, 2012; 1 page.

(56) References Cited

OTHER PUBLICATIONS

Microsoft; "Conference table in Lync Server 2013"; https://technet.microsoft.com/en-us/library/gg425762.aspx; Oct. 2, 2012; 1 page.
Microsoft; "Device table in Lync Server 2013"; https://technet.microsoft.com/en-us/library/gg398930.aspx; Oct. 2, 2012; 1 page.
Microsoft; "DeviceDriver table in Lync Server 2013"; https://technet.microsoft.com/en-us/library/gg398844.aspx; Oct. 2, 2012; 1 page.
Microsoft; "Dialog table in Lync Server 2013"; https://technet.microsoft.com/en-us/library/gg398313.aspx; Oct. 2, 2012; 1 page.
Microsoft; "Endpoint table in Lync Server 2013"; https://technet.microsoft.com/en-us/library/gg398327.aspx; Oct. 2, 2012; 1 page.
Microsoft; "EndpointSubnet table in Lync Server 2013"; https://technet.microsoft.com/en-us/library/gg398933.aspx; Oct. 2, 2012; 1 page.
Microsoft; "IP Address table in Lync Server 2013"; https://technet.microsoft.com/en-us/library/jj205077.aspx; Oct. 17, 2012; 1 page.
Microsoft; "MacAddress table in Lync Server 2013"; https://technet.microsoft.com/en-us/library/gg412761.aspx; Oct. 2, 2012; 1 page.
Microsoft; "MediaLine table in Lync Server 2013"; https://technet.microsoft.com/en-us/library/gg425920.aspx; Feb. 21, 2014; 3 pages.
Microsoft; "MonitoredRegionLink table in Lync Server 2013"; https://technet.microsoft.com/en-us/library/gg398874.aspx; Oct. 2, 2012; 1 page.
Microsoft; "MonitoredUserSiteLink table"; https://technet.microsoft.com/en-us/library/gg398233.aspx; Oct. 2, 2012; 1 page.
Microsoft; "NetworkConnectionDetail table in Lync Server 2013"; https://technet.microsoft.com/en-us/library/jj205185.aspx; Oct. 2, 2012; 1 page.
Microsoft; "PayloadDescription table in Lync Server 2013"; https://technet.microsoft.com/en-us/library/gg412971.aspx; Oct. 2, 2012; 1 page.
Microsoft; "PurgeSettings table (QoE) in Lync Server 2013"; https://technet.microsoft.com/en-us/library/jj204788.aspx; Oct. 2, 2012; 1 page.
Microsoft; "Region table in Lync Server 2013"; https://technet.microsoft.com/en-us/library/gg398235.aspx; Nov. 9, 2010; 1 page.
Microsoft; "Server table in Lync Server 2013"; https://technet.microsoft.com/en-us/library/gg398801.aspx; Oct. 2, 2012; 1 page.
Microsoft; "Session table in Lync Server 2013"; https://technet.microsoft.com/en-us/library/gg398635.aspx; Sep. 9, 2013; 2 pages.
Microsoft; "SessionCorrelation table in Lync Server 2013"; https://technet.microsoft.com/en-us/library/gg398091.aspx; Oct. 2, 2012; 1 page.
Microsoft; "Subnet table in Lync Server 2013"; https://technet.microsoft.com/en-us/library/gg398582.aspx; Oct. 2, 2012; 1 page.
Microsoft; "TraceRoute table in Lync Server 2013"; https://technet.microsoft.com/en-us/library/jj205205.aspx; Feb. 21, 2014; 1 page.
Microsoft; "User table in Lync Server 2013"; https://technet.microsoft.com/en-us/library/gg398505.aspx; Oct. 2, 2012; 1 page.
Microsoft; "UserAgent table in Lync Server 2013"; https://technet.microsoft.com/en-us/library/gg398939.aspx; May 25, 2012; 1 page.
Microsoft; "UserAgentDef table (QoE) in Lync Server 2013"; https://technet.microsoft.com/en-us/library/jj205259.aspx; Mar. 25, 2014; 2 pages.
Microsoft; "UserSite table in Lync Server 2013"; https://technet.microsoft.com/en-us/library/gg398256.aspx; Nov. 9, 2010; 1 page.
Microsoft; "VideoClientEvent table in Lync Server 2013"; https://technet.microsoft.com/en-us/library/gg399039.aspx; Oct. 2, 2012; 1 page.
Microsoft; "VideoMetricsThreshold table in Lync Server 2013"; https://technet.microsoft.com/en-us/library/jj204778.aspx; Oct. 2, 2012; 1 page.
Microsoft; "VideoStream table in Lync Server 2013"; https://technet.microsoft.com/en-us/library/gg425928.aspx; Dec. 13, 2013; 4 pages.
Microsoft; "QoE view details in Lync Server 2013"; https://technet.microsoft.com/en-us/library/jj688081.aspx; Oct. 3, 2012; 1 page.
Microsoft; "Sample QoE database queries in Lync Server 2013"; https://technet.microsoft.com/en-us/library/gg398100.aspx; Oct. 17, 2012; 1 page.
U.S. Appl. No. 14/819,233, Brisebois et al.
Campbell, Christopher S., et al.; "Expertise Identification using Email Communications"; ACM; Nov. 3, 2003; pp. 528-531.
Balog, Krisztian, et al.; "Finding Experts and their Details in E-mail Corpora"; ACM; May 23, 2006; pp. 1035-1036.
U.S. Appl. No. 13/906,241, Brisebois.
U.S. Appl. No. 13/906,246, Brisebois.
U.S. Appl. No. 13/906,255, Brisebois.
U.S. Appl. No. 14/047,162, Brisebois et al.
U.S. Appl. No. 14/089,427, Brisebois et al.
U.S. Appl. No. 14/265,973, Brisebois et al.
U.S. Appl. No. 14/297,944, Brisebois et al.
U.S. Appl. No. 14/298,095, Brisebois et al.
U.S. Appl. No. 14/335,205, Brisebois et al.
U.S. Appl. No. 14/631,826, Brisebois et al.
U.S. Appl. No. 14/660,697, Brisebois et al.
U.S. Appl. No. 14/674,270, Brisebois et al.
U.S. Appl. No. 14/672,715, Brisebois et al.
U.S. Appl. No. 14/683,513, Brisebois et al.
U.S. Appl. No. 14/683,465, Brisebois et al.
U.S. Appl. No. 14/683,462, Brisebois et al.
U.S. Appl. No. 14/683,453, Brisebois et al.
Microsoft, "Manage Dynamic Distribution Groups", Oct. 15, 2012, 2 pages.
Rubin, Courtney, "Study: Employees Are Unproductive Half the Day", Mar. 2, 2011, 4 pages.
Natural Resources Management and Environment Department, "Land Cover Classification System", May 17, 2012, 4 pages.
Humanext, "Communicating to inform and engage people at work", May 25, 2012, 5 pages.
Lumincreative, "Lumin Synergy: Powerful Corporate Collaboration Software", http://www.lumincreative.com, Oct. 2013, 10 pages.
Syntegrity Group, "THINKahead", Mar. 2013, 16 pages.
Abdi, Herve, et al., "Principal Component Analysis", Jun. 30, 2010, 47 pages.
SharePoint, "Find the right people", http://discoversharepoint.com/people, Jun. 27, 2013, 13 pages.
Bennett, Madeline, "Endorsement feature degrades Linkedin as a professional network", the Inquirer, Oct. 19, 2012, 3 pages.
Breger, David, "Introducing Endorsements: Give Kudos with Just One Click", Linkedin Blog, Sep. 24, 2012, 3 pages.
Microsoft, "How DLP Rules are Applied to Evaluate Messages", Sep. 18, 2013, 5 pages.
Microsoft, "Define Your Own DLP Templates and Information Types", Sep. 30, 2013, 4 pages.
Microsoft, "Policy Templates from Microsoft Partners", Jan. 31, 2013, 1 page.
Microsoft, "DLP Policy Templates Supplied in Exchange", Feb. 4, 2013, 8 pages.
Microsoft, "DLP Policy Templates", Oct. 4, 2012, 4 pages.
Microsoft, "Data Loss Prevention", Mar. 21, 2013, 6 pages.
Pocsi, Gyorgy, "Find a free Meeting Room," http://android.metricscat.com, 2013, 8 pages.
Ragan, Steve, "5 More Post-Holiday BYOD Strategies and Considerations," www.csoonline.com, Jan. 2, 2014, 5 pages.
Duncan, Stacy, "Wendy's Franchisee Safeguards against Data Breaches with Intelligent Firewalls," http://m.hospitalitytechnology.edgl.com, Dec. 12, 2013, 4 pages.
Rubens, Paul, "Cybercrime Shopping List Study Points to Falling Prices," www.bbc.com/news/technology, Dec. 16, 2013, 3 pages.
Kaneshige, Tom, "BYOD Lawsuits Loom as Work Gets Personal," www.cio.com, Apr. 22, 2013, 3 pages.
Kaneshige, Tom, "BYOD Became the 'New Normal' in 2013," www.cio.com, Dec. 19, 2013, 3 pages.
Kaneshige, Tom, "The BYOD Troubleshoot: Security and Cost-Savings," www.cio.com, Mar. 30, 2012, 3 pages.
Eckersley, Peter, "How Unique is Your Web Browser?", Electronic Frontier Foundation, 2010, 19 pages.

(56) References Cited

OTHER PUBLICATIONS

Adamedes, Karen, "5 Truths about Performance Reviews. Are You Ready for Yours?", www.careerchickchat.com, Jan. 5, 2013, 8 pages.
Mosley, Eric, "Crowdsource Your Performance Reviews," HBR Blog Network, Jun. 15, 2012, 2 pages.
Monahan, Tom, "Big Idea 2014: The Couch-Potato-ification of Talent Measurement," Dec. 10, 2013, 7 pages.
SIGNiX; "Know Your Signer"; http://www.signix.com/how-it-works/digital-signature-identity-authentication; Aug. 10, 2014; 4 pages.
Lagorio-Chafkin, Christine; "35 under 35: When I Work: A Company that Incubated Itself"; www.inc.com; Jun. 24, 2014; 4 pages.
Paradiso Solutions; "Paradiso LMS Social Learning: What is Social Learning?"; https:www.paradisosolutions.com/social-learning-lms; Mar. 18, 2015; 5 pages.
McIntosh, Don; "List of Corporate Learning Management Systems"; elearningindustry.com/list-corporate-learning-management-systems; Oct. 3, 2014; 157 pages.
Talbot, Chris; "Level Platforms Adds Managed Print Service Features to Managed Workplace 2011"; http://www.channelinsider.com/c/a/Managed-Services-Level-Platform-Adds-Managed-Pri . . . ; Nov. 30, 2011; 4 pages.
Messmer, Ellen; "Do we Need Data-Loss Prevention for Printers and Copiers? Canon USA Explains Why it Designed a DLP Product Specifically for its Multi-Function Peripherals"; Network World; Dec. 13, 2011; 4 pages.
Intermedia, Inc.; "How to Configure your Printer, Scanner, Copier, Web Script or SMTP Application to Work with an Exchange Account"; https://hosting.intermedia.net/support/kb/viewKBArticle.asp?id=2167; 2013; 3 pages.
Pujol, Josep M., et al.; "Extracting Reputation in Multi Agent Systems by Means of Social Network Topology"; AAMAS; Jul. 15-19, 2002; pp. 467-474.
Wikimedia Foundation, Inc.; "Microsoft Visual SourceSafe"; http://en.wikipedia.org/wiki/Microsoft_Visual_SourceSafe; last modified on Feb. 2, 2015; 6 pages.
Wikimedia Foundation, Inc.; "TinEye"; http://en.wikipedia.org/wiki/TinEye; last modified on Jan. 26, 2015;4 pages.
Microsoft; "Information Rights Management"; https://technet.microsoft.com/en-us/library/dd638140(v=exchg.150).aspx; Nov. 1, 2013; 7 pages.
Microsoft; "Document Fingerprinting"; https://technet.microsoft.com/en-us/library/dn635176(v=exchg.150).aspx; Sep. 11, 2014; 3 pages.
Wikimedia Foundation, Inc.; "Plagiarism Detection"; http://en.wikipedia.org/wiki/Plagiarism_detection; last modified on Mar. 19, 2015; 11 pages.
Proofpoint, Inc.; "Proofpoint Introduces Its Next-Generation Email Security and Privacy Platform with Enhanced Email Encryption, Available for SaaS and Appliance Deployment"; http://investors.proofpoint.com/releasedetail.cfm?releaseid=664064; Oct. 5, 2009; 5 pages.
Kim, Yoohwan, et al.; "Anomaly Detection in Multiple Scale for Insider Threat Analysis"; CSIIRW'11, Oak Ridge, Tennessee; Oct. 2011; 4 pages.
Boudaoud, K., et al.; "Network Security Management with Intelligent Agents"; IEEE, Session Fourteen, Security Management (I); Apr. 2000; pp. 579-592.

\* cited by examiner

Business Communications

Partner
My sent and received messages
0
Last 30 Days

Partner
My staffs sent and received messages
0
Last 30 Days

Customer
My sent and received messages
18
Last 30 Days

Customer
My staffs sent and received messages
82
Last 30 Days

Competitor
My sent and received messages
5
Last 30 Days

Competitor
My staffs sent and received messages
13
Last 30 Days

General Communications

Internal
My sent and received messages
95
Last 30 Days

Internal
My staffs sent and received messages
308
Last 30 Days

External
My sent and received messages
31
Last 30 Days

External
My staffs sent and received messages
148
Last 30 Days

Personal
My sent and received messages
6
Last 30 Days

Personal
My staffs sent and received messages
44
Last 30 Days

Social Networking
My received messages
2
Last 30 Days

Social Networking
My staffs received messages
9
Last 30 Days

Governance

Encrypted
My sent and received messages
0
Last 30 Days

Encrypted
My staffs sent and received messages
0
Last 30 Days

Large Attachme...
My sent and received messages
2
Last 30 Days

Large Attachme...
My staffs sent and received messages
11
Last 30 Days

FIG. 9

Scope: Me ▼

Me — Message — Participant

Direction: Sent or Received
Sent Date: Last 30 Days

Add Search Parameters for Insight

Name
Department
Office
Job Title
Manager - Name
Was External
Was Addressed In To
Was Addressed in Bcc
Was Addressed in Cc
Delivery Time
Response Time
Received Time of Day
Was Received After Hours
Was Sent After Hours
Was AD Account Enabled Subject
Total Size
Message Type
Has External Recipients
Sent Time of Day
File Attachment - Extension
File Attachment - File Name
File Attachment - Last Modified Date
File Attachment - Size
Was Encrypted
Importance
Sensitivity
Original Message Id Name
Message Address
Department
Office
Mailbox Type
Was External
Domain - Name
Domain - Classification
Direct Reports - Name
Manager - Name
Was Addressed In To
Was Addressed In Bcc
Was Addressed In Cc
Receipt Date
Delivery Time
Response Time
Received Time of Day
Was Received After Hours Apply    Cancel

FIG. 10

SYSTEMS AND METHODS OF SECURE SELF-SERVICE ACCESS TO CONTENT

CROSS-REFERENCE TO RELATED APPLICATIONS

This patent application incorporates by reference the entire disclosure of U.S. patent application Ser. No. 14/683,453 filed on Apr. 10, 2015. This patent application also incorporates by reference the entire disclosure of U.S. patent application Ser. No. 14/683,462 filed on Apr. 10, 2015.

BACKGROUND

Technical Field

The present disclosure relates generally to data security and more particularly, but not by way of limitation, to systems and methods of secure self-service access to content.

History of Related Art

For corporate information systems, access management is usually a very rigid process. Typically, an employee must email or call an information technology support center to obtain access to a desired resource.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is performed by a computer system. The method includes receiving a request from a user to access particular content. The method further includes determining a trust measure of the user, wherein the trust measure is based, at least in part, on an analysis of logged user-initiated communication events of the user on a plurality of communications platforms. In addition, the method includes accessing a self-service access policy applicable to the particular content. Further, the method includes ascertaining, from the self-service access policy, a trust threshold applicable to the particular content. Moreover, the method includes, responsive to a determination that the trust measure fails to satisfy the trust threshold, automatically denying access by the user to the particular content.

In one embodiment, an information handling system includes a processor. The processor is operable to implement a method. The method includes receiving a request from a user to access particular content. The method further includes determining a trust measure of the user, wherein the trust measure is based, at least in part, on an analysis of logged user-initiated communication events of the user on a plurality of communications platforms. In addition, the method includes accessing a self-service access policy applicable to the particular content. Further, the method includes ascertaining, from the self-service access policy, a trust threshold applicable to the particular content. Moreover, the method includes, responsive to a determination that the trust measure fails to satisfy the trust threshold, automatically denying access by the user to the particular content.

In one embodiment, a computer-program product includes a non-transitory computer-usable medium having computer-readable program code embodied therein. The computer-readable program code is adapted to be executed to implement a method. The method includes receiving a request from a user to access particular content. The method further includes determining a trust measure of the user, wherein the trust measure is based, at least in part, on an analysis of logged user-initiated communication events of the user on a plurality of communications platforms. In addition, the method includes accessing a self-service access policy applicable to the particular content. Further, the method includes ascertaining, from the self-service access policy, a trust threshold applicable to the particular content. Moreover, the method includes, responsive to a determination that the trust measure fails to satisfy the trust threshold, automatically denying access by the user to the particular content.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 9 illustrates an example of a user interface.

FIG. 10 illustrates an example of a user interface.

DETAILED DESCRIPTION OF ILLUSTRATIVE EMBODIMENTS OF THE INVENTION

This disclosure describes several non-limiting examples of processes for collecting information or data from multiple sources and analyzing the information to classify the data and to extract or determine additional information based on the collected data. The data sources can be internal to the business and/or external to the business. For example, the data sources can include sales databases, business or internal email systems, non-business or external email systems, social networking accounts, inventory databases, file directories, enterprise systems, customer relationship management (CRM) systems, organizational directories, collaboration systems (e.g., SharePoint™ servers), etc.

As used herein, the term "business," in addition to having its ordinary meaning, is intended to include any type of organization or entity. For example, a business can include a charitable organization, a governmental organization, an educational institution, or any other entity that may have one or more sources of data to analyze. Further, the user of any of the above terms may be used interchangeably unless explicitly used otherwise or unless the context makes clear otherwise. In addition, as used herein, the term "data" generally refers to electronic data or any type of data that can be accessed by a computing system.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

I. Example of a Networked Computing Environment

Figure 1:
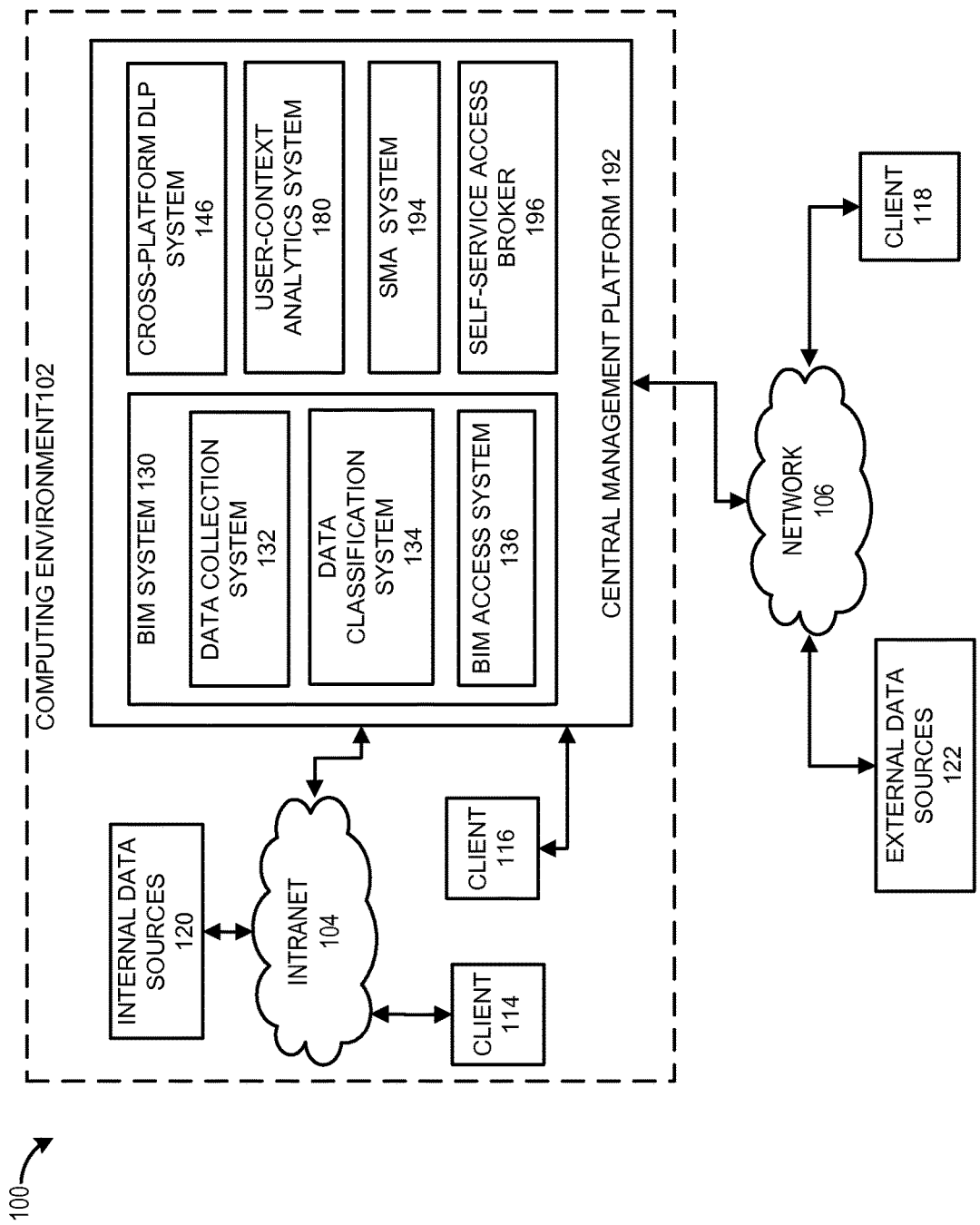
FIG. 1 illustrates an embodiment of a networked computing environment.

FIG. 1 illustrates an embodiment of a networked computing environment 100. The networked computing environment 100 can include a computing environment 102 that is associated with a business or organization. The computing environment 102 may vary based on the type of organization or business. However, generally, the computing environment 102 may include at least a number of computing systems. For example, the computing environment may include clients, servers, databases, mobile computing devices (e.g., tablets, laptops, smartphones, etc.), virtual computing devices, shared computing devices, networked computing devices, and the like. Further, the computing environment 102 may include one or more networks, such as intranet 104.

The computing environment 102 includes a central management platform 192. As illustrated, the central management platform 192 can include a BIM system 130, a cross-platform DLP system 146, a user-context analytics system 180, a subject-matter-affiliation (SMA) system 194, and a self-service access broker 196. The central management platform 192 can include one or more computer systems; be unitary or distributed; span multiple locations; span multiple machines; or reside in a cloud, which may include one or more cloud components in one or more networks. In certain embodiments, these components of the central management platform 192 are operable to interact with the BIM system 130, for example, over the intranet 104. In certain other embodiments, these components of the central management platform 192 can be contained on a same computer system or have direct communication links such that no communication over the intranet 104 needs to occur. In various cases, communication among the components of the central management platform 192 can occur via a combination of the foregoing.

A user can access the central management platform 192 using any computing system, such as an information handling system, that can communicate with the central management platform 192. For example, the user can access the central management platform 192 using client 114, which can communicate with the central management platform 192 via the intranet 104, client 116, which can communicate via a direct communication connection with the central management platform 192, or client 118, which can communicate with the central management platform 192 via the network 106. As illustrated in FIG. 1, in some embodiments the client 118 may not be associated with the computing environment 102. In such embodiments, the client 118 and/or a user associated with the client 118 may be granted access to the central management platform 192. The clients 114, 116, and 118 may include any type of computing system including, for example, a laptop, desktop, smartphone, tablet, wearable or body-borne computer, or the like. In some embodiments, the central management platform 192 (e.g., the BIM system 130) may determine whether the user is authorized to access central management platform 192 as described in further detail below.

Using the BIM system 130, a user can examine the data available to a business regardless of where the data was generated or is stored. Further, in some embodiments, the user can use the BIM system 130 to identify trends and/or metadata associated with the data available to the BIM system 130. In certain embodiments, the BIM system 130 can access the data from internal data sources 120, external data sources 122, or a combination of the two. The data that can be accessed from the internal data sources 120 can include any data that is stored within the computing environment 102 or is accessed by a computing system that is associated with the computing environment 102. For example, the data may include information stored in employee created files, log files, archived files, internal emails, outgoing emails, received emails, received files, data downloaded from an external network or the Internet, not-yet-transmitted emails in a drafts folder, etc. The type of data is not limited and may depend on the organization or business associated with the computing environment 102. For example, the data can include sales numbers, contact information, vendor costs, product designs, meeting minutes, the identity of file creators, the identity of file owners, the identity of users who have accessed a file or are authorized to access a file, etc.

The data that can be accessed from the external data sources 122 can include any data that is stored outside of the computing environment 102 and is publicly accessible or otherwise accessible to the BIM system 130. For example, the data can include data from social networking sites, customer sites, Internet sites, or any other data source that is publicly accessible or which the BIM system 130 has been granted access. In some cases, a subset of the data may be unavailable to the BIM system 130. For example, portions of the computing environment 102 may be configured for private use.

The internal data sources 120 can include any type of computing system that is part of or associated with the computing environment 102 and is available to the BIM system 130. These computing systems can include database systems or repositories, servers (e.g., authentication servers, file servers, email servers, collaboration servers), clients, mobile computing systems (including e.g., tablets, laptops, smartphones, etc.), virtual machines, CRM systems, content-management platforms, directory services, such as lightweight directory access protocol (LDAP) systems, and the like. Further, in some cases, the internal data sources 120 can include the clients 114 and 116. The external data sources 122 can include any type of computing system that is not associated with the computing environment 102, but is accessible to the BIM system 130. For example, the external data sources 122 can include any computing systems associated with cloud services, social media services, hosted applications, etc.

The BIM system 130 can communicate with the internal data sources 120 via the intranet 104. The intranet 104 can include any type of wired and/or wireless network that enables computing systems associated with the computing environment 102 to communicate with each other. For example, the intranet 104 can include any type of a LAN, a WAN, an Ethernet network, a wireless network, a cellular network, a virtual private network (VPN) and an ad hoc network. In some embodiments, the intranet 104 may include an extranet that is accessible by customers or other users who are external to the business or organization associated with the computing environment 102.

The BIM system 130 can communicate with the external data sources 122 via the network 106. The network 106 can include any type of wired, wireless, or cellular network that enables one or more computing systems associated with the computing environment 102 to communicate with the external data sources 122 and/or any computing system that is not associated with the computing environment 102. In some cases, the network 106 can include the Internet.

The BIM system 130 can include a data collection system 132, a data classification system 134, and a BIM access system 136. The data collection system 132 can collect data or information from one or more data sources for processing by the BIM system 130. In some embodiments, the data collection system 132 can reformat the collected data to facilitate processing by the BIM system 130. Further, in some cases, the data collection system 132 may reformat collected data into a consistent or defined format that enables the comparison or processing of data that is of the same or a similar type, but which may be formatted differently because, for example, the data is obtained from different sources. The data collection system 132 is described in more detail below with reference to FIG. 2.

The data classification system 134 can store and classify the data obtained by the data collection system 132. In addition to predefined classifications, the data classification system 134 can identify and develop new classifications and associations between data using, for example, heuristics and probabilistic algorithms. The data classification system 134 is described in more detail below with reference to FIG. 3.

The BIM access system 136 can provide users with access to the BIM system 130. In some embodiments, the BIM access system 136 determines whether a user is authorized to access the BIM system 130. The BIM access system 136 enables a user to query one or more databases (not shown) of the data classification system 134 to obtain access to the data collected by the data collection system 132. Further, the BIM access system 136 enables a user to mine the data and/or to extract metadata by, for example, creating queries based on the data and the data classifications. Advantageously, in certain embodiments, because the data classification system 134 can classify data obtained from a number of data sources, more complex queries can be created compared to a system that can only query its own database or a single data source.

Additionally, in certain embodiments, the BIM access system 136 can enable users to create, share, and access query packages. As described in greater detail below, a query package can encapsulate one or more pre-defined queries, one or more visualizations of queried data, and other package attributes. When a user selects a query package, the query package can be executed in a determined manner in similar fashion to other queries. As an additional advantage, in some embodiments, because the data classification system 134 can use heuristics and probabilistic algorithms to develop and modify data classifications over time, user queries are not limited to a set of predefined search variables. The BIM access system 136 is described in more detail below with reference to FIG. 3.

As mentioned above, the internal data sources 120 and the external data sources 122 can include various communications platforms that are internal and external, respectively. The cross-platform DLP system 146 can enable utilization of cross-platform DLP policies on such communications platforms. For purposes of this patent application, a DLP policy refers to a standard or guideline designed, at least in part, to prevent, detect, or mitigate data loss. By way of example, DLP policies can restrict a number or size of communications, participants in communications, contents of communications, particular communication patterns, etc. For purposes of this patent application, a cross platform DLP policy refers to a DLP policy that can be enforced, monitored, and/or applied across multiple heterogeneous communications platforms. In many cases, the heterogeneous communications platforms may provide a certain degree of native DLP functionality. In other cases, some or all of the heterogeneous platforms may provide no native DLP functionality. To the extent native DLP functionality is provided, the heterogeneous communications platforms generally use an assortment of non-standard data structures and formats to contain a DLP policy.

The cross-platform DLP system 146 can communicate with the internal data sources 120 over the intranet 104 and with the external data sources 122 over the network 106. In general, the cross-platform DLP system 146 collaborates with the BIM system 130, the internal data sources 120, and the external data sources 122 to implement cross-platform DLP policies. Example operation of the cross-platform DLP system 146 will be described in greater detail with respect to FIGS. 11-16.

The user-context analytics system 180 can be used to generate intelligence regarding how user behavior on a remote computer system (e.g., communications platforms represented in the internal data sources 120) differs based, at least in part, on user context. In general, a user context is representative of one or more conditions under which one or more user-initiated events occur. A user-initiated event can be, for example, a user-initiated communication event on a communications platform. Examples of user-initiated communication events include a user creating, drafting, receiving, viewing, opening, editing, transmitting, or otherwise accessing or acting upon a communication. Communications can include, for example, emails, blogs, wikis, documents, presentations, social-media messages, and/or the like. User-initiated events can also include other user behaviors such as, for example, a user accessing or manipulating non-communication computer resources and artifacts thereof. User-initiated events can be initiated via, for example, the client 114, the client 116, the client 116, and/or the like. Example operation of the user-context analytics system 180 will be described in greater detail with respect to FIGS. 17-20.

In certain embodiments, the SMA system 194 can facilitate individual determinations of users' affiliation with particular topics based on an analysis of the contents of the users' communications on communications platforms represented by the internal data sources 120 and the external data sources 122. Communications can include, for example, emails, blogs, wikis, documents, presentations, social-media messages, and/or the like. In some embodiments, the SMA system 194 can encompass functionality for identifying subject matter experts as described in U.S. patent application Ser. No. 14/047,162 ("the '162 application"), which application is hereby incorporated by reference. Example operation of the SMA system 194 will be described in greater detail with respect to FIGS. 21-23.

The self-service access broker 196 can enable user requests for particular content to be granted or denied automatically based on self-service access policies. In certain embodiments, the self-service access broker 196 can allow self-service access policies to be established for particular content. The self-service access policies can specify, for example, criteria for determining whether users are trustworthy, whether users need to know the particular content, etc. Example operation of the self-service access broker 196 will be described in greater detail with respect to FIGS. 24-29.

II. Examples of Collecting, Classifying, and Querying Data

Figure 2:
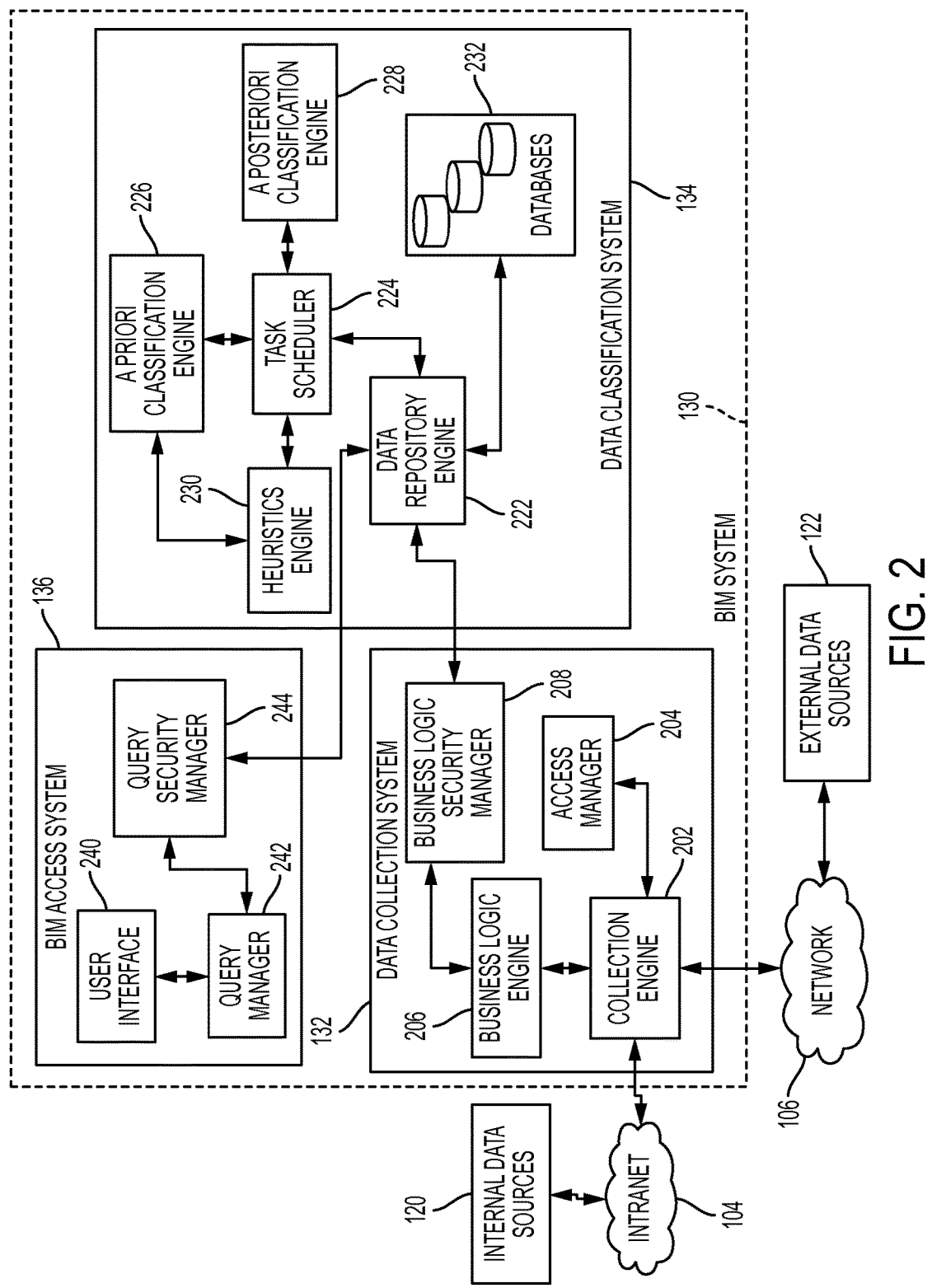
FIG. 2 illustrates an embodiment of a Business Insight on Messaging (BIM) system.

FIG. 2 illustrates an embodiment of an implementation of the BIM system 130. As previously described above, the BIM system 130 can include a data collection system 132 configured to, among other things, collect data from the internal data sources 120 and/or the external data sources 122. The data collection system 132 can include a collection engine 202, an access manager 204, a business logic engine 206, and a business logic security manager 208.

Generally, the collection engine 202 may access the internal data sources 120 thereby providing the BIM system 130 with access to data that is stored by or generated by the internal data sources 120. This data can include any data that may be created, accessed, or received by a user or in response to the actions of a user who is associated with the computing environment 102. Further, in some embodiments, the collection engine 202 can access the external data sources 122 thereby providing the BIM system 130 with access to data from the external data sources 122. In some embodiments, the data can include metadata. For example, supposing that the collection engine 202 accesses a file server, the data can include metadata associated with the files stored on the file server, such as the file name, file author, file owner, time created, last time edited, etc.

In some cases, a number of internal data sources 120 and/or external data sources 122 may require a user or system to be identified and/or authenticated before access to the data source is granted. Authentication may be required for a number of reasons. For example, the data source may provide individual accounts to users, such as a social networking account, email account, or collaboration system account. As another example, the data source may provide different features based on the authorization level of a user. For example, a billing system may be configured to allow all employees of an organization to view invoices, but to only allow employees of the accounting department to modify invoices.

For data sources that require authentication or identification of a specific user, the access manager 204 can facilitate access to the data sources. The access manager 204 can manage and control credentials for accessing the data sources. For example, the access manager 204 can store and manage user names, passwords, account identifiers, certificates, tokens, and any other information that can be used to access accounts associated with one or more internal data sources 120 and/or external data sources 122. For instance, the access manager 204 may have access to credentials associated with a business's Facebook™ or Twitter™ account. As another example, the access manager may have access to credentials associated with an LDAP directory, a file management system, or employee work email accounts.

In some embodiments, the access manager 204 may have credentials or authentication information associated with a master or super user account enabling access to some or all of the user accounts without requiring credentials or authentication information associated with each of the users. In some cases, the collection engine 202 can use the access manager 204 to facilitate accessing internal data sources 120 and/or external data sources 122.

The business logic engine 206 can include any system that can modify or transform the data collected by the collection engine 202 into a standardized format. In some embodiments, the standardized format may differ based on the data source accessed and/or the type of data accessed. For example, the business logic engine 206 may format data associated with emails, data associated with files stored at the computing environment 102, data associated with web pages, and data associated with research files differently. However, each type of data may be formatted consistently. Thus, for example, data associated with product design files may be transformed or abstracted into a common format regardless of whether the product design files are of the same type. As a second example, suppose that the business logic engine 206 is configured to record time using a 24-hour clock format. In this second example, if one email application records the time an email was sent using a 24-hour clock format, and a second email application uses a 12-hour clock format, the business logic engine 206 may reformat the data from the second email application to use a 24-hour clock format In some embodiments, a user may define the format for processing and storing different types of data. In other embodiments, the business logic engine 206 may identify a standard format to use for each type of data based on, for example, the format that is most common among similar types of data sources, the format that reduces the size of the information, or any other basis that can be used to decide a data format.

The business logic security manager 208 can include any system that can implement security and data access policies for data accessed by the collection engine 202. In some embodiments, the business logic security manager 208 may apply the security and data access policies to data before the data is collected as part of a determination of whether to collect particular data. For example, an organization may designate a private folder or directory for each employee and the data access policies may include a policy to not access any files or data stored in the private directory. Alternatively, or in addition, the business logic security manager 208 may apply the security and data access policies to data after it is collected by the collection engine 202. Further, in some cases, the business logic security manager 208 may apply the security and data access policies to the abstracted and/or reformatted data produced by the business logic engine 206. For example, suppose the organization associated with the computing environment 102 has adopted a policy of not collecting emails designated as personal. In this example, the business logic security manager 208 may examine email to determine whether it is addressed to an email address designated as personal (e.g., email addressed to family members) and if the email is identified as personal, the email may be discarded by the data collection system 132 or not processed any further by the BIM system 130.

In some embodiments, the business logic security manager 208 may apply a set of security and data access policies to any data or metadata provided to the classification system 134 for processing and storage. These security and data access policies can include any policy for regulating the storage and access of data obtained or generated by the data collection system 132. For example, the security and data access policies may identify the users who can access the data provided to the data classification system 134. The determination of which users can access the data may be based on the type of data. The business logic security manager 208 may tag the data with an identity of the users, or class or role of users (e.g., mid-level managers and more senior) who can access the data. As another example, of a security and data access policy, the business logic security manager 208 may determine how long the data can be stored by the data classification system 134 based on, for example, the type of data or the source of the data.

After the data collection system 132 has collected and, in some cases, processed the data obtained from the internal data sources 120 and/or the external data sources 122, the data may be provided to the data classification system 134 for further processing and storage. The data classification system 134 can include a data repository engine 222, a task scheduler 224, an a priori classification engine 226, an a posteriori classification engine 228, a heuristics engine 230 and a set of databases 232.

The data repository engine 222 can include any system for storing and indexing the data received from the data collection system 132. The data repository engine 222 can store the data, including any generated indexes, at the set of databases 232, which can include one or more databases or repositories for storing data. In some cases, the set of databases 232 can store data in separate databases based on any factor including, for example, the type of data, the source of data, or the security level or authorization class associated with the data and the class of users who can access the data.

In some implementations, the set of databases 232 can dynamically expand and, in some cases, the set of databases 232 may be dynamically structured. For example, if the data repository engine 222 receives a new type of data that includes metadata fields not supported by the existing databases of the set of databases 232, the data repository engine 222 can create and initialize a new database that includes the metadata fields as part of the set of databases 232. For instance, suppose the organization associated with the computing environment 102 creates its first social media account for the organization to expand its marketing initiatives. Although the databases 232 may have fields for customer information and vendor information, it may not have a field identifying whether a customer or vendor has indicated they "like" or "follow" the organization on its social media page. The data repository engine 222 can create a new field in the databases 232 to store this information and/or create a new database to capture information extracted from the social media account including information that relates to the organization's customers and vendors.

In certain embodiments, the data repository engine 222 can create abstractions of and/or classify the data received from the data collection system 132 using, for example, the task scheduler 224, the a priori classification engine 226, the a posteriori classification engine 228, and the heuristics engine 230. The task scheduler 224 can include any system that can manage the abstraction and classification of the data received from the data collection system 132. In some embodiments, the task scheduler 224 can be included as part of the data repository engine 222.

Data that is to be classified and/or abstracted can be supplied to the task scheduler 224. The task scheduler 224 can supply the data to the a priori classification engine 226, which can include any system that can classify data based on a set of user-defined, predefined, or predetermined classifications. These classifications may be provided by a user (e.g., an administrator) or may be provided by the developer of the BIM system 130. Although not limited as such, the predetermined classifications generally include objective classifications that can be determined based on attributes associated with the data. For example, the a priori classification engine 226 can classify communications based on whether the communication is an email, an instant message, or a voice mail. As a second example, files may be classified based on the file type, such as whether the file is a drawing file (e.g., an AutoCAD™ file), a presentation file (e.g., a PowerPoint™ file), a spreadsheet (e.g., an Excel™ file), a word processing file (e.g., a Word™ file), etc. Although not limited as such, the a priori classification engine 226 generally classifies data at or substantially near the time of collection by the collection engine 202. The a priori classification engine 226 can classify the data prior to the data being stored in the databases 232. However, in some cases, the data may be stored prior to or simultaneously with the a priori classification engine 226 classifying the data. The data may be classified based on one or more characteristics or pieces of metadata associated with the data. For example, an email may be classified based on the email address, a domain or provider associated with the email (e.g., a Yahoo® email address or a corporate email address), or the recipient of the email.

In addition to, or instead of, using the a priori classification engine 226, the task scheduler 224 can provide the data to the a posteriori classification engine 228 for classification or further classification. The a posteriori classification engine 228 can include any system that can determine trends with respect to the collected data. Although not limited as such, the a posteriori classification engine 228 generally classifies data after the data has been collected and stored at the databases 232. However, in some cases, the a posteriori classification engine 228 can also be used to classify data as it is collected by the collection engine 202. Data may be processed and classified or reclassified multiple times by the a posteriori classification engine 228. In some cases, the classification and reclassification of the data occurs on a continuing basis. In other cases, the classification and reclassification of data occurs during specific time periods of events. For example, data may be reclassified each day at midnight or once a week. As another example, data may be reclassified each time one or more of the a posteriori algorithms is modified or after the collection of new data.

In some cases, the a posteriori classification engine 228 classifies data based on one or more probabilistic algorithms. The probabilistic algorithms may be based on any type of statistical analysis of the collected data. For example, the probabilistic algorithms may be based on Bayesian analysis or probabilities. Further, Bayesian inferences may be used to update the probability estimates calculated by the a posteriori classification engine 228. In some implementations, the a posteriori classification engine 228 may use machine learning techniques to optimize or update the a posteriori algorithms. In some embodiments, some of the a posteriori algorithms may determine the probability that a piece or set of data (e.g., an email) should have a particular classification based on an analysis of the data as a whole. Alternatively, or in addition, some of the a posteriori algorithms may determine the probability that a set of data should have a particular classification based on the combination of probabilistic determinations associated with subsets of the data, parameters, or metadata associated with the data (e.g., classifications associated with the content of the email, the recipient of the email, the sender of the email, etc.).

For example, continuing with the email example, one probabilistic algorithm may be based on the combination of the classification or determination of four characteristics associated with the email, which may be used to determine whether to classify the email as a personal email, or non-work related. The first characteristic can include the probability that an email address associated with a participant (e.g., sender, recipient, BCC recipient, etc.) of the email conversation is used by a single employee. This determination may be based on the email address itself (e.g., topic based versus name based email address), the creator of the email address, or any other factor that can be used to determine whether an email address is shared or associated with a particular individual. The second characteristic can include the probability that keywords within the email are not associated with peer-to-peer or work-related communications. For example, terms of endearment and discussion of children and children's activities are less likely to be included in work-related communications. The third characteristic can include the probability that the email address is associated with a participant domain or public service provider (e.g., Yahoo® email or Google® email) as opposed to a corporate or work email account. The fourth characteristic can include determining the probability that the message or email thread can be classified as conversational as opposed to, for example, formal. For example, a series of quick questions in a thread of emails, the use of a number of slang words, or excessive typographical errors may indicate that an email is likely conversational. The a posteriori classification engine 228 can use the determined probabilities for the above four characteristics to determine the probability that the email communication is personal as opposed to, for example, work-related, or spam email.

The combination of probabilities may not total 100%. Further, the combination may itself be a probability and the classification can be based on a threshold determination. For example, the threshold may be set such that an email is classified as personal if there is a 90% probability for three of the four above parameters indicating the email is personal (e.g., email address is used by a single employee, the keywords are not typical of peer-to-peer communication, at least some of the participant domains are from known public service providers, and the message thread is conversational).

As another example of the a posteriori classification engine 228 classifying data, the a posteriori classification engine 228 can use a probabilistic algorithm to determine whether a participant of an email is a customer. The a posteriori classification engine 228 can use the participant's identity (e.g., a customer) to facilitate classifying data that is associated with the participant (e.g., emails, files, etc.). To determine whether the participant should be classified as a customer, the a posteriori classification engine 228 can examiner a number of parameters including a relevant Active Directory Organizational Unit (e.g., sales, support, finance) associated with the participant and/or other participants in communication with the participant, the participant's presence in forum discussions, etc. In some cases, characteristics used to classify data may be weighted differently as part of the probabilistic algorithm. For example, email domain may be a poor characteristic to classify a participant in some cases because the email domain may be associated with multiple roles. For instance, Microsoft® may be a partner, a customer, and a competitor.

In some implementations, a user (e.g., an administrator) can define the probabilistic algorithms used by the a posteriori classification engine 228. For example, suppose customer Y is a customer of business X and that the management of business X is interested in tracking the percentage of communication between business X and customer Y that relates to sales. Further, suppose that a number of employees from business X and a number of employees from business Y are in communication via email. Some of these employees may be in communication to discuss sales. However, it is also possible that some of the employees may be in communication for technical support issues, invoicing, or for personal reasons (e.g., a spouse of a business X employee may work at customer Y). Thus, in this example, to track the percentage of communication between business X and customer Y that relates to sales the user may define a probabilistic algorithm that classifies communications based on the probability that the communication relates to sales. The algorithm for determining the probability may be based on a number of pieces of metadata associated with each communication. For example, the metadata may include the sender's job title, the recipient's job title, the name of the sender, the name of the recipient, whether the communication identifies a product number or an order number, the time of communication, a set of keywords in the content of the communication, etc.

Using the a posteriori classification engine 228, data may be classified based on metadata associated with the data. For example, the communication in the above example can be classified based on whether it relates to sales, supplies, project development, management, personnel, or is personal. The determination of what the data relates to can be based on any criteria. For example, the determination may be based on keywords associated with the data, the data owner, the data author, the identity or roles of users who have accessed the data, the type of data file, the size of the file, the data the file was created, etc.

In certain embodiments, the a posteriori classification engine 228 can use the heuristics engine 230 to facilitate classifying data. Further, in some cases, the a posteriori classification engine 228 can use the heuristics engine 230 to validate classifications, to develop probable associations between potentially related content, and to validate the associations as the data collection system 132 collects more data. In certain embodiments, the a posteriori classification engine 228 may base the classifications of data on the associations between potentially related content. In some implementations, the heuristic engine 230 may use machine learning techniques to optimize or update the heuristic algorithms.

In some embodiments, a user (e.g., an administrator) can verify whether the data or metadata has been correctly classified. Based on the result of this verification, in some cases, the a posteriori classification engine 228 may correct or update one or more classifications of previously processed or classified data. Further, in some implementations, the user can verify whether two or more pieces of data or metadata have been correctly associated with each other. Based on the result of this verification, the a posteriori classification engine 228 using, for example, the heuristics engine 230 can correct one or more associations between previously processed data or metadata. Further, in certain embodiments, one or more of the a posteriori classification engine 228 and the heuristics engine 230 may update one or more algorithms used for processing the data provided by the data collection system 132 based on the verifications provided by the user.

In some embodiments, the heuristics engine 230 may be used as a separate classification engine from the a priori classification engine 226 and the a posteriori classification engine 228. Alternatively, the heuristics engine 230 may be used in concert with one or more of the a priori classification engine 226 and the a posteriori classification engine 228. Similar to the a posteriori classification engine 228, the heuristics engine 230 generally classifies data after the data has been collected and stored at the databases 232. However, in some cases, the heuristics engine 230 can also be used to classify data as it is collected by the collection engine 202.

The heuristics engine 230 can use any type of heuristic algorithm for classifying data. For example, the heuristics engine 230 can determine whether a number of characteristics are associated with the data and based on the determination, classify the data. For example, data that mentions a product, includes price information, addresses (e.g., billing and shipping addresses), and quantity information may be classified as sales data. In some cases, the heuristics engine 230 can classify data based on a subset of characteristics. For example, if a majority or two-thirds of characteristics associated with a particular classification are identified as existing in a set of data, the heuristics engine 230 can associate the classification with the set of data. In some cases, the heuristics engine 230 determines whether one or more characteristics are associated with the data. In other words, the heuristics engine can determine whether a particular characteristic is or is not associated with the data. Alternatively, or in addition, the heuristics engine 230 can determine the value or attribute of a particular characteristic associated with the data. The value or attribute of the characteristic may then be used to determine a classification for the data. For example, one characteristic that may be used to classify data is the length of the data. For instance, in some cases, a long email may make one classification more likely that a short email.

The a priori classification engine 226 and the a posteriori classification engine 228 can store the data classification at the databases 232. Further, the a posteriori classification engine 228 and the heuristics engine 230 can store the probable associations between potentially related data at the databases 232. In some cases, as classifications and associations are updated based on, for example, user verifications or updates to the a posteriori and heuristic classification and association algorithms, the data or metadata stored at the databases 232 can be modified to reflect the updates.

Users can communicate with the BIM system 130 using a client computing system (e.g., client 114, client 116, or client 118). In some cases, access to the BIM system 130, or to some features of the BIM system 130, may be restricted to users who are using clients associated with the computing environment 102. As described above, in some cases, at least some users can access the BIM system 130 to verify classifications and associations of data by the data classification system 134. In addition, in some cases, at least some users can access at least some of the data and/or metadata stored at the data classification system 134 using the BIM access system 136. The BIM access system 136 can include a user interface 240, a query manager 242, and a query security manager 244.

The user interface 240 can generally include any system that enables a user to communicate with the BIM system 130. Further, the user interface 240 enables the user to submit a query to the BIM system 130 to access the data or metadata stored at the databases 232. Moreover, the query can be based on any number of or type of data or metadata fields or variables. Advantageously, in certain embodiments, by enabling, a user to create a query based on any number or type of fields, complex queries can be generated. Further, because the BIM system 130 can collect and analyze data from a number of internal and external data sources, a user of the BIM system 130 can extract data that is not typically available by accessing a single data source. For example, a user can query the BIM system 130 to locate all personal messages sent by the members of the user's department within the last month. As a second example, a user can query the BIM system 130 to locate all helpdesk requests received in a specific month outside of business hours that were sent by customers from Europe. As an additional example, a product manager may create a query to examine customer reactions to a new product release or the pitfalls associated with a new marketing campaign. The query may return data that is based on a number of sources including, for example, emails received from customers or users, Facebook® posts, Twitter® feeds, forum posts, quantity of returned products, etc.

Further, in some cases, a user can create a relatively simple query to obtain a larger picture of an organization's knowledge compared to systems that are incapable of integrating the potentially large number of information sources used by some businesses or organizations. For example, a user can query the BIM system 130 for information associated with customer X over a time range. In response, the BIM system 130 may provide the user with all information associated with customer X over the time range, which can include who communicated with customer X, the percentage of communications relating to specific topics (e.g., sales, support, etc.), the products designed for customer X, the employees who performed any work relating to customer X and the employees' roles, etc. This information may not be captured by a single source. For example, the communications may be obtained from an email server, the products may be identified from product drawings, and the employees and their roles may be identified by examining who accessed specific files in combination with the employees' human resources (HR) records.

The query manager 242 can include any system that enables the user to create the query. The query manager 242 can cause the available types of search parameters for searching the databases 232 to be presented to a user via the user interface 240. These search parameter types can include any type of search parameter that can be used to form a query for searching the databases 232. For example, the search parameter types can include names (e.g., employee names, customer names, vendor names, etc.), data categories (e.g., sales, invoices, communications, designs, miscellaneous, etc.), stored data types (e.g., strings, integers, dates, times, etc.), data sources (e.g., internal data sources, external data sources, communication sources, sales department sources, product design sources, etc.), dates, etc. In some cases, the query manager 242 can also parse a query provided by a user. For example, some queries may be provided using a text-based interface or using a text-field in a Graphical User Interface (GUI). In such cases, the query manager 242 may be configured to parse the query.

The query manager 242 can further include any system that enables the user to create or select a query package that serves as the query. In certain embodiments, the query manager 242 can maintain query packages for each user, group of users, and/or the like. The query packages can be stored, for example, in a SQL database that maintains each user's query packages in a table by a unique identifier. In some embodiments, each user may have a profile that includes a list of package identifiers for that user. The query manager 242 can cause query packages associated with the user to be presented and made selectable via the user interface 240. In various embodiments, the query manager 242 can also facilitate creation of new query packages. New query packages can be made accessible to users in various ways. For example, the new query packages can be created by the user, shared with the user by another user, pushed to the user by an administrator, or created in another fashion.

Further, the query manager 242 can cause any type of additional options for querying the databases 232 to be presented to the user via the user interface 240. These additional options can include, for example, options relating to how query results are displayed or stored.

In some cases, access to the data stored in the BIM system 130 may be limited to specific users or specific roles. For example, access to the data may be limited to "Bob" or to senior managers. Further, some data may be accessible by some users, but not others. For example, sales managers may be limited to accessing information relating to sales, invoicing, and marketing, technical managers may be limited to accessing information relating to product development, design and manufacture, and executive officers may have access to both types of data, and possibly more. In certain embodiments, the query manager 242 can limit the search parameter options that are presented to a user for forming a query based on the user's identity and/or role.

The query security manager 244 can include any system for regulating who can access the data or subsets of data. The query security manager 244 can regulate access to the databases 232 and/or a subset of the information stored at the databases 232 based on any number and/or types of factors. For example, these factors can include a user's identity, a user's role, a source of the data, a time associated with the data (e.g., the time the data was created, a time the data was last accessed, an expiration time, etc.), whether the data is historical or current, etc.

Further, the query security manager 244 can regulate access to the databases 232 and/or a subset of the information stored at the databases 232 based on security restrictions or data access policies implemented by the business logic security manager 208. For example, the business logic security manager 208 may identify all data that is "sensitive" based on a set of rules, such as whether the data mentions one or more keywords relating to an unannounced product in development. Continuing this example, the business logic security manager 208 may label the sensitive data as, for example, sensitive, and may identify which users or roles, which are associated with a set of users, can access data labeled as sensitive. The query security manager 244 can then regulate access to the data labeled as sensitive based on the user or the role associated with the user who is accessing the databases 232.

Although illustrated separately, in some embodiments, the query security manager 244 can be included as part of the query manager 242. Further, in some cases, one or both of the query security manager 244 and the query manager 242 can be included as part of the user interface 240. In certain embodiments, some or all of the previously described systems can be combined or further divided into additional systems. Further, some or all of the previously described systems may be implemented in hardware, software, or a combination of hardware and software.

Figure 3:
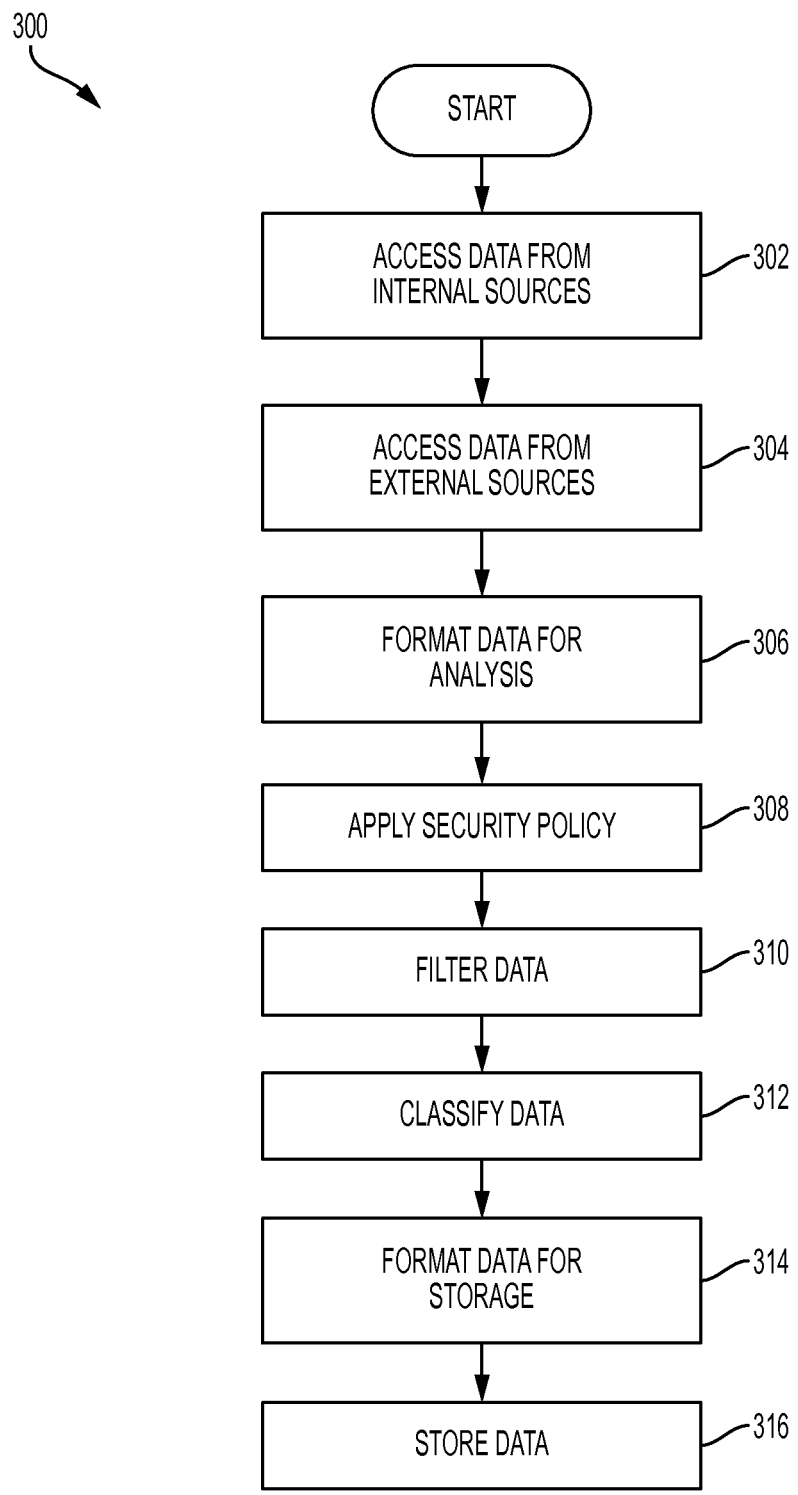
FIG. 3 presents a flowchart of an example of a data collection process.

FIG. 3 presents a flowchart of an example of a data collection process 300. The process 300 can be implemented by any system that can access one or more data sources to collect data for storage and analysis. For example, the process 300, in whole or in part, can be implemented by one or more of the data collection system 132, the collection engine 202, the access manager 204, the business logic engine 206, and the business logic security manager 208. In some cases, the process 300 can be performed generally by the BIM system 130. Although any number of systems, in whole or in part, can implement the process 300, to simplify discussion, the process 300 will be described in relation to specific systems or subsystems of the BIM system 130.

The process 300 begins at block 302 where, for example, the collection engine 202 accesses data from the internal data sources 120. At block 304, the collection engine 202 accesses data from the external data sources 122. In some cases, either the block 302 or 304 may be optional. Accessing the data may include obtaining the data or a copy of the data from the internal data sources 120. Further, accessing the data may include accessing metadata associated with the data. In some embodiments, the collection engine 202 may obtain copies of the metadata or access the data to obtain or determine metadata associated with the data without obtaining a copy of the data. For example, in some cases, the collection engine 202 may access email from an email server to obtain metadata (e.g., sender, recipient, time sent, whether files are attached, etc.) associated with email messages with or, in some cases, without obtaining a copy of the email.

As previously described, accessing one or more of the internal data sources 120 and the external data sources 122 may involve using one or more credentials or accessing one or more accounts associated with the data sources. In such embodiments, the collection engine 202 may use the access manager 204 to access the credentials and/or to facilitate accessing the data sources.

Generally, although not necessarily, the data obtained at blocks 302 and 304 is raw data that is obtained in the format that the data is stored at the data sources with little to no modification. At block 306, the business logic engine 206, as described above, can reformat or transform the accessed or collected data for analysis and/or storage. Reformatting the accessed or collected data can include formatting the data to enable further processing by the BIM system 130. Further, reformatting the accessed or collected data can include formatting the data in a format specified by a user (e.g., an administrator). In addition, in certain cases, reformatting the data can include extracting metadata from the accessed or collected data. In some cases, block 306 can include abstracting the data to facilitate analysis. For example, assuming the data under analysis is an email, a number of users may be identified. For instance, an email may include a sender, one or more recipients, which may also include users that are carbon copied, or listed on the CC line, and Blind Carbon Copied, or listed on the BCC line, and, in some cases, non-user recipients, such as lists or email addresses that result in a copy of the email being placed in an electronic folder for storage. Each of these users can be abstracted as "communication participant." The data can then be analyzed and/or stored with each user identified, for example, as a "communication participant." As another example of abstracting the data, the text content of each type of message can be abstracted as "message body." Thus, an email, a Twitter® post, and a Facebook® post, and a forum post, and a product review can all be abstracted as "message body." By abstracting data, the BIM system 130 enables more in-depth searching across multiple data sources. For example, a user can search for all messages associated with communication participant X. The result of the search can include any type of message that is associated with user X including emails sent by user X, emails received by user X, product review by user X, Twitter® posts by user X, etc. In some embodiments, the databases 232 may store the abstracted or transformed data and the original data or references to the original sources of data. In other embodiments, the databases 232 may store the abstracted or transformed data in place of the original data.

In some cases, reformatting the data may be optional. For example, in cases where the collection engine 202 collects metadata from sources that share a common or substantially similar data storage format, the block 306 may be unnecessary.

At block 308, the business logic security manager 208 applies a security or data access policy to the collected data. Applying the security policy can include preventing the collection engine 202 from accessing some data. For example, applying the security policy can include preventing the collection engine 202 from accessing encrypted files, files associated with a specific project or user, or files marked private. Further, applying the security policy can include marking or identifying data, based on the security policy, that should not be stored at the databases 232, that should be accessible by a set of users or roles, or that should be inaccessible by a set of users or roles. The business logic security manager 208 can filter any data marked for exclusion from storage in the databases 232 at block 310. Further, the business logic security manager 208 and/or the business logic engine 206 can filter out any data to be excluded based on a data access policy, which can be based on any type of factor for excluding data. For example, data may be filtered based on the age of the data, such as files created more than five years ago or emails more than two years old.

Figure 4:
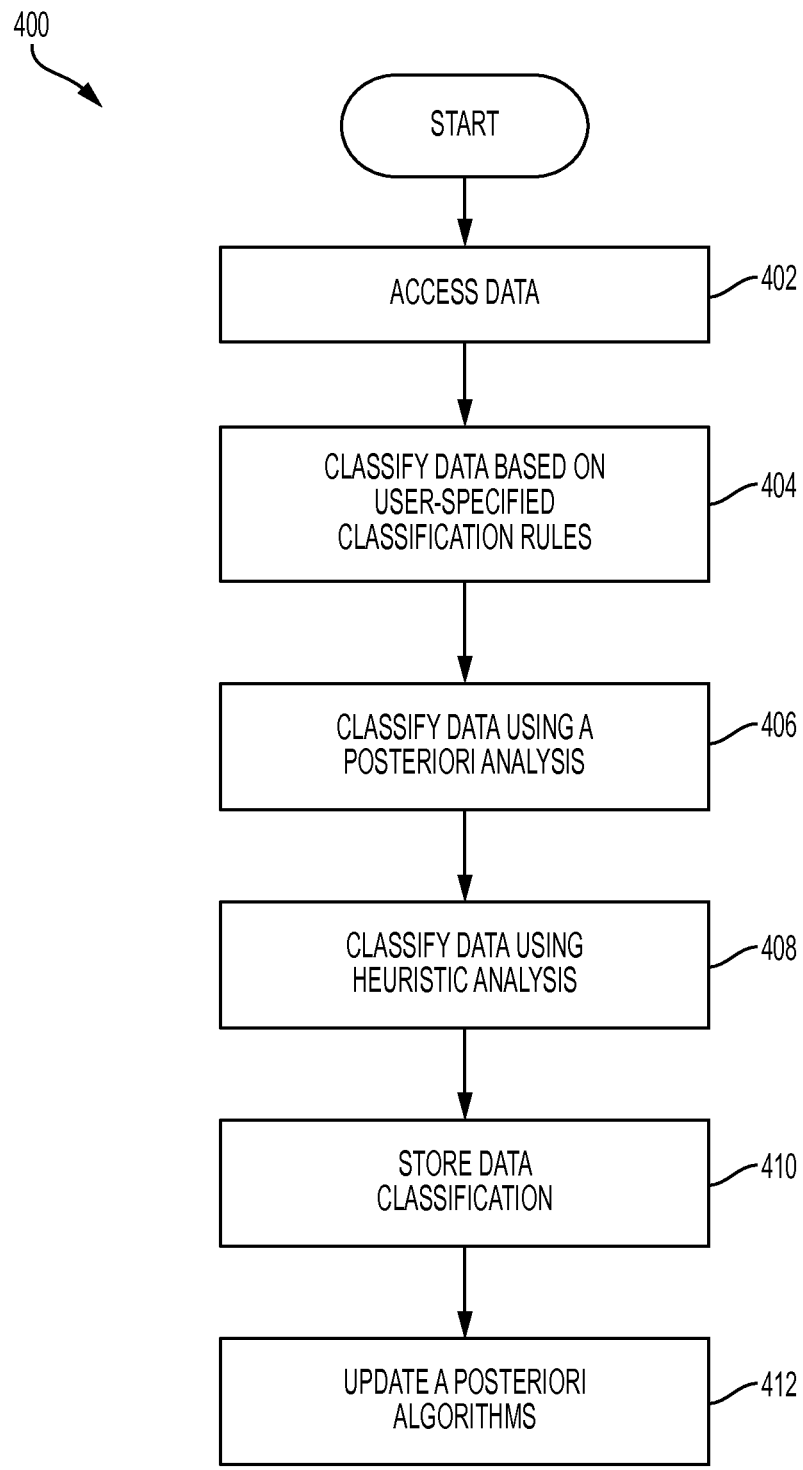
FIG. 4 presents a flowchart of an example of a data classification process.

At block 312, the business logic engine 206 or the business logic security manager 208 may classify the collected and/or filtered data. The data may be classified based on, for example, who can access the data, the type of data, the source of the data, or any other factor that can be used to classify data. In some embodiments, the data may be provided to the data classification system 134 for classification. Some non-limiting embodiments of a process for classifying the data are described in further detail below with respect to the process 400, which is illustrated in FIG. 4.

The business logic engine 206 further formats the data for storage at block 314. Formatting the data for storage can include creating a low-level abstraction of the data, transforming the data, or extracting metadata for storage in place of the data. In some cases, block 314 can include some or all of the embodiments described above with respect to the block 306. In some embodiments, data may go through one abstraction or transformation process at the block 306 to optimize the data for analysis and go through another abstraction or transformation process at the block 314 to optimize the data for storage and/or query access. In some embodiments, the metadata may be stored in addition to the data. Further, the metadata, in some cases, may be used for querying the databases 232. For example, a user can search the databases 232 for information based on one or more metadata fields. In some embodiments, one or more of the blocks 306 and 314 may be optional.

At block 316, the data collection system 132 can cause the data to be stored at, for example, the databases 232. This stored data can include one or more of the collected data, the metadata, and the abstracted data. In some embodiments, storing the data can include providing the data to the data repository engine 222 for indexing. In such embodiments, the data repository engine 222 can store the indexed data at the databases 232.

Although the process 300 was presented above in a specific order, it is possible for the operations of the process 300 to be performed in a different order or in parallel. For example, the business logic security manager 208 may perform the block 308, at least in part, prior to or in parallel with the blocks 302 and 304. As a second example, the business logic engine 206 may perform the block 306 as each item of data is accessed or after a set of data is accessed at the blocks 302 and 304.

FIG. 4 presents a flowchart of an example of a data classification process 400. The process 400 can be implemented by any system that can classify data and/or metadata. For example, the process 400, in whole or in part, can be implemented by one or more of the data classification system 134, the data repository engine 222, the task scheduler 224, the a priori classification engine 226, the a posteriori classification engine 228, and the heuristics engine 230. In some cases, the process 400 can be performed generally by the BIM system 130. Although any number of systems, in whole or in part, can implement the process 400, to simplify discussion, the process 400 will be described in relation to specific systems or subsystems of the BIM system 130.

The process 400 begins at block 402 where, for example, the data collection system 132 accesses data from one or more of the internal data sources 120 and the external data sources 122. The data collection system 132 may use the collection engine 202 to access the data. Further, the block 402 can include some or all of the embodiments described above with respect to the blocks 302 and 304. Moreover, some or all of the process 300 described above can be performed as part of the process performed at block 402. In some embodiments, the process 400 can be performed as part of the block 312 above. In such embodiments, the block 402 may include the data collection system 132 providing the data, a reformatted version of the data, an abstraction of the data, and/or metadata to the data classification system 134. In some implementations, the process 400 may be performed separately or independently of the data collection process. In such embodiments, the block 402 may include accessing the data from the databases 232. In some cases, the databases 232 may include a database for classified data and a separate database for data that has not yet been classified.

At block 404, the a priori classification engine 226 classifies the data based on a set of user-specified classification rules. As previously mentioned, a developer of the BIM system 130 or a user (e.g., an administrator) may specify the classification rules. Further, the classification rules can include any rules for classifying data based on the data or metadata associated with the data. For example, data may be classified based on the author of the data, the owner of the data, the time the data was created, etc.

At block 406, the a posteriori classification engine 228 classifies the data using a posteriori analysis. This may include the a posteriori classification engine 228 using one or more probabilistic algorithms to determine one or more classifications for the data. The a posteriori classification engine 228 can use any type of probabilistic algorithm for classifying the data. For example, the classification may be based on one or more Bayesian probability algorithms. As another example, the a posteriori classification may be based on clustering of similar or dissimilar pieces of data. One example of such an approach that can be adapted for use herein is the Braun-Blanquet method that is sometimes used in vegetation science. One or both of the a priori classification and the a posteriori classification may be based on one or more variables or criteria associated with the data or metadata.

In some embodiments, the a posteriori classification engine 228 may use the heuristics engine 230 to facilitate calculating the probabilistic classifications of the data. For example, the a posteriori classification engine 228 can modify the probabilities used to classify the data based on a determination of the heuristics engine 230 of the accuracy of the classification of previously classified data. The heuristics engine 230 may determine the accuracy of the classification of previously classified data based on, for example, feedback by the user. This feedback may include, for example, manual reclassification of data, indications by a user of the accuracy of prior classifications, indications of the accuracy or usefulness of query results from querying the databases 232 that include the classified data, etc. Further, the heuristics engine 230 may determine the accuracy of the classification of previously classified data based on, for example, the classifications of data accessed more recently than the previously classified data. In some cases, the more recent data may have been accessed before or at the same time as the previously classified data, but may be classified after the previously classified data.

At block 408, the heuristics engine 230 can classify data using a heuristics analysis. As previously described, in some cases, the heuristics engine 230 can classify the data based on the number or percentage of characteristics or attributes associated with the data that match a particular classification.

In some embodiments, the task scheduler 224 schedules one or more of the blocks 404, 406, and 408. Further, in some cases, the task scheduler 224 may determine whether to perform the process 400 and/or one or more of the blocks 404, 406, and 408. In some cases, one or more of the blocks 404, 406, and 408 may be optional. For instance, an initial classification may be associated with data when it is collected via the process associated with the block 404. The data may then be further classified or reclassified at collection, or at a later time, using the process associated with the block 406, the block 408, or a combination of the blocks 406 and 408.

At block 410, the data repository engine 222 stores or causes to be stored the data and the data classifications at the databases 232. In some cases, the data repository engine 222 may store metadata associated with the data at the databases 232 instead of, or in addition to, storing the data.

At block 412, the data repository engine 222 can update the a posteriori algorithms based on the classifications determined for the data. In addition, or alternatively, the a posteriori algorithms may be updated based on previously classified data. The a posteriori algorithms may be updated based on customer feedback and/or the determination of the heuristics engine 230 as described above with respect to the block 406. Further, updating the a posteriori algorithms may include modifying the probabilistic weights applied to one or more variables or pieces of metadata used to determine the one or more classifications of the data. Moreover, updating the a posteriori algorithms may include modifying the one or more variables or pieces of metadata used to determine the one or more classifications of the data. In some cases, the block 412 can include modifying the heuristic algorithms used at the block 408. For example, the number of characteristics required to classify the data with a particular classification may be modified. In addition, or alternatively, the weight applied to each of the characteristics may be modified at the block 412.

As with the process 300, it is possible for the operations of the process 400 to be performed in a different order or in parallel. For example, the blocks 404 and 406 may be performed in a different order or in parallel.

Figure 5:
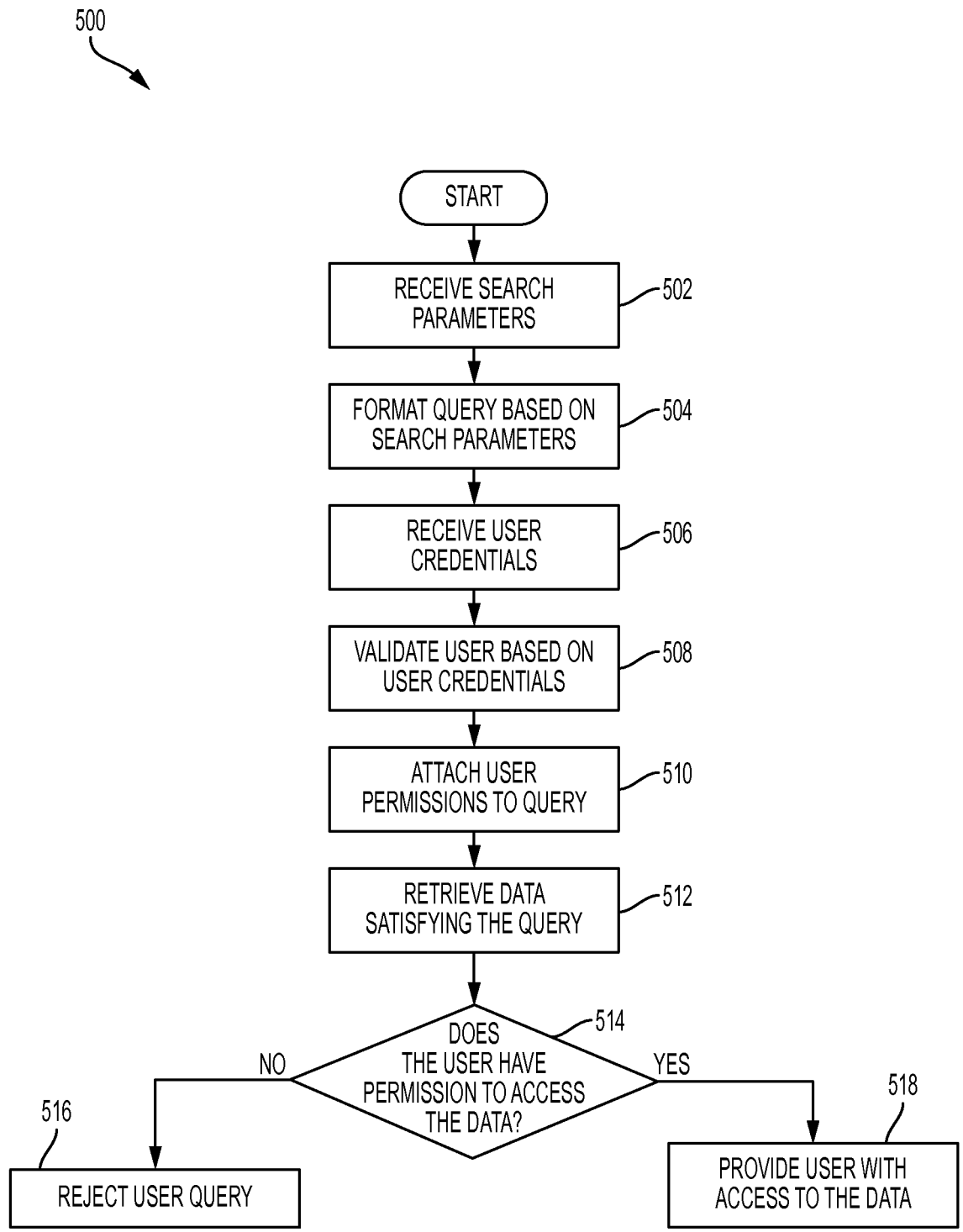
FIG. 5 presents a flowchart of an example of a data query process.

FIG. 5 presents a flowchart of an example of a data query process 500. The process 500 can be implemented by any system that can process a query provided by a user or another system and cause the results of the query to be presented to the user or provided to the other system. For example, the process 500, in whole or in part, can be implemented by one or more of the BIM access system 136, the user interface 240, the query manager 242, and the query security manager 244. In some cases, the process 500 can be performed generally by the BIM system 130. Although any number of systems, in whole or in part, can implement the process 500, to simplify discussion, the process 500 will be described in relation to specific systems or subsystems of the BIM system 130.

The process 500 begins at block 502 where, for example, the user interface 240 receives a set of one or more search parameters from a user via a client (e.g., the client 114). In some embodiments, the search parameters may be provided by another computing system. For example, in some embodiments, an application running on a server (not shown) or a client (e.g., the client 116) may be configured to query the BIM system 130 in response to an event or at a predetermined time. The application can then use the result of the query to perform an application-specific process. For instance, an application or script may be configured to query the BIM system 130 every month to determine the workload of each employee or of the employees in a specific department of an organization to determine, for example, whether additional employees are needed or whether the allocation of human resources within different departments should be redistributed. In this example, the application can determine whether to alert a user based on the result of the determination.

In some implementations, a user can provide a text-based query to the user interface 240. This text-based query can be parsed by, for example, the user interface 240 and/or the query manager 242. Alternatively, or in addition, the user interface 240 can provide a set of query options and/or fields that a user can use to formulate a query of the BIM system 130. The query options or fields can include any type of option or field that can be used to form a query of the BIM system 130. For example, the query options or fields can include tags, classifications, time ranges, keywords, user identifiers, user roles, customer identifiers, vendor identifiers, corporate locations, geographic locations, etc. In some embodiments, the query options and/or search fields presented to a user may be generated based on the data stored in the databases 232. For example, if the databases 232 includes email data, a sender field and a recipient field may be available for generating a query. However, if the databases 232 lacks any email data, the sender and recipient fields may not be available for generating a query.

In some cases, the query security manager 244 can limit or determine the fields or options that the user interface 240 can present to the user based on, for example, the user's permissions or the user's role. For example, fields relating to querying the BIM system 130 regarding the content of a business's email may be unavailable to a user who is not authorized to search the contents of collected email. For instance, searching the content of emails may be limited to the legal department for compliance purposes. Other users may be prohibited from searching the email content for privacy reasons.

At block 504, the query manager 242 formats a query based on the search parameters received at block 502. Formatting the query may include transforming the search parameters and query options provided by the user into a form that can be processed by the data repository engine 222. In certain embodiments, the block 504 may be optional. For example, in some cases the search parameters may be provided by the user in a form of a query that can be processed by the BIM system 130 without modification.

At block 506, the user interface 240 receives one or more user credentials from the user. In some cases, the user credentials may be received from an application. The user credentials can include any type of credential or identifier that can be used to identify a user and/or determine a set of permissions or a level of authorization associated with the user. At block 508, the query security manager 244 can validate the user, or application, based at least in part on the user credentials received at the user interface 240. Validating the user can include identifying the user, identifying permissions associated with the user, the user's role, and/or an authorization level associated with the user. In some embodiments, if the query security manager 244 is unable to validate the user or determines that the user lacks authorization to access the BIM system 130 and/or query the databases 232, the query security manager 244 may reject the user's query. Further, the user interface 240 may inform the user that the user is not authorized to access the BIM system 130 or to query the databases 232. In some implementations, if the user identifies as a guest or if the query security manager 244 is unable to validate the guest, the user may be associated with a guest identity and/or a set of guest permissions, which may permit limited access to the BIM system 130 or the data stored at the databases 232. In some cases, a guest may receive full access to the BIM system 130. However, the actions of the guest may be logged or logged differently than the actions of an identified user.

At block 510, the query security manager 244 attaches the user permissions to the query. Alternatively, or in addition, the query security manager may attach the user's identity, role, and/or authorization level to the query. In some embodiments, one or more of the blocks 506, 508, and 510 may be optional.

At block 512, the query manager 242 retrieves data, and/or metadata, satisfying the query. In some implementations, the block 512 may include providing the query to the data repository engine 222 for processing. The data repository engine 222 can then query the databases 232 to obtain data that satisfies the query. This data can then be provided to the query manager 242.

At decision block 514, the query security manager 244 can determine whether the user has permission, or is authorized, to access the data that satisfies the query. Determining whether the user has permission to access the data may be based on any type of factor that can be used to determine whether a user can access data. For example, the determination may be based, at least in part, on the user's credentials, the user's permissions, a security level associated with the data, etc. In some cases, the data repository engine 222 may perform the decision block 514 as part of the process associated with the block 512.

If the query security manager 244 determines that the user does not have permission to access the data, the query security manager 244 rejects the user query at block 516. In some cases, rejecting the user query may include informing the user that the query is not authorized and/or that the user is not authorized to access the data associated with the query. In other cases, rejecting the user query may include doing nothing or presenting an indication to the user that no data satisfies the user's query.

If the query security manager 244 determines that the user does have permission to access the data, the user interface 240 provides the user with access to the data at block 518. Providing the user with access to the data can include presenting the data on a webpage, in an application-generated window, in a file, in an email, or any other method for providing data to a user. In some cases, the data may be copied to a file and the user may be informed that the data is ready for access by, for example, providing the user with a copy of the file, a link to the file, or a location associated with the file.

With some queries, a user may be authorized to access some data that satisfies the query, but not other data that satisfies the query. In such cases, the user may be presented with the data that the user is authorized to access. Further, the user may be informed that additional data exists that was not provided because, for example, the user was not authorized to access the data. In other cases, the user may not be informed that additional data exists that was not provided.

In some embodiments, the decision block 514 and block 516 may be optional. For example, in some cases where the search parameters available to a user are based on the user's permissions, decision block 514 may be superfluous. However, in other embodiments, both the search parameters available to the user and the data the user can access are independently determined based on the user's permissions.

Advantageously, in certain embodiments, the process 500 can be used to identify new information and/or to determine trends that would be more difficult or identify or not possible to identify based on a single data source. For example, the process 500 can be used to identify the most productive and least productive employees of an organization based on a variety of metrics. Examining a single data source may not provide this information because employees serve different roles. Further, different employees are unproductive in different ways. For example, some employees may spend time an inordinate amount of time on social networking sites or emailing friends. Other employees may procrastinate by playing games or by talking in the kitchen. Thus, examining only email use or Internet activity may not provide an accurate determination of which employees are more productive. In addition, some employees can accomplish more work in less time than other employees. Thus, to determine which employees are the most productive during working hours requires examining a number of data sources. The BIM system 130 makes this possible by enabling a user to generate a query that relates the amount of time in the office to the amount of time spent procrastinating at different types of activities to the number of work-related tasks that are accomplished.

As a second example, the BIM system 130 can be used to identify the salespersons and the communications techniques that are most effective for each customer. For instance, a user can generate a query that relates sales, the method of communication, the content of communication, the salespersons contacting each of the customers, and the customers. Based on the result of this query, a manager may be able to determine that certain salespersons generate larger sales when using a particular communication method with a particular customer while other salespersons may be more effective with a different communication method with the particular customer or may be more effective with other customers.

An additional example of an application of the BIM system 130 can include gauging employee reaction to an executive memorandum or a reorganization announcement. Queries can be generated to access all communications associated with the memorandum or announcement. Alternatively, or in addition, queries can be generated to identify the general mood of employees post memorandum or announcement. These queries can examine the tone of emails and other communications (e.g., social networking posts, etc.). Additional examples of applications for using the BIM system 130 can include determining whether employees are communicating with external sources in a manner that adheres to corporate policies, communicating with customers in a timely fashion, or accessing data that is unrelated to their job role.

Figure 6:
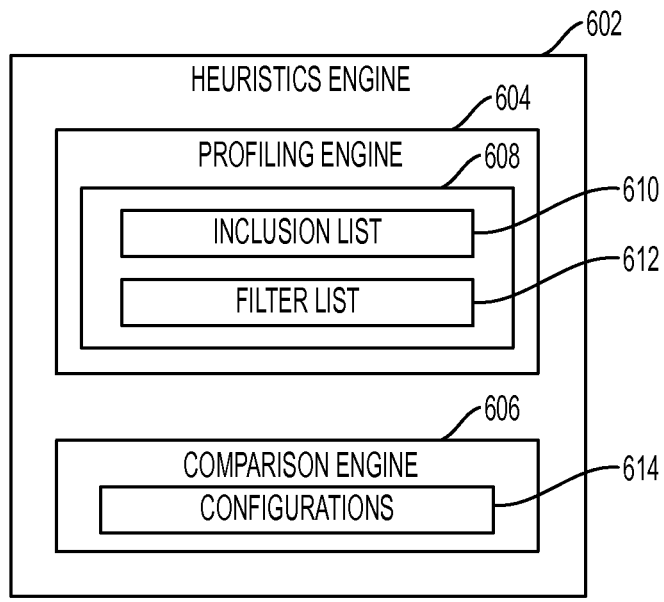
FIG. 6 illustrates an example of a heuristics engine.

FIG. 6 illustrates an example of a heuristics engine 602. In a typical embodiment, the heuristics engine 602 operates as described with respect to the heuristics engine 230 of FIG. 2. In a typical embodiment, the heuristics engine 602 is operable to perform a heuristics analysis for each of a plurality of different classifications and thereby reach a classification result for each classification. The classification result may be, for example, an indication whether a given classification should be assigned to given data. For purposes of simplicity, the heuristics engine 602 may be periodically described, by way of example, with respect to a single classification.

The heuristics engine 602 includes a profiling engine 604 and a comparison engine 606. In a typical embodiment, the profiling engine 604 is operable to develop one or more profiles 608 by performing, for example, a multivariate analysis. For example, in certain embodiments, the one or more profiles 608 may relate to what constitutes a personal message. In these embodiments, the profiling engine 604 can perform a multivariate analysis of communications known to be personal messages in order to develop the one or more profiles 608. In some embodiments, the one or more profiles 608 can also be manually established.

In typical embodiment, the one or more profiles 608 can each include an inclusion list 610 and a filter list 612. The inclusion list 610 can include a list of tokens such as, for example, words, that have been determined to be associated with the classification to which the profile corresponds (e.g., personal message, business message, etc.). In a typical embodiment, for each token in the inclusion list 610, the appearance of the token in a communication makes it more likely that the communication should be assigned the classification. The filter list 612 can include a list of tokens such as, for example, words, that have been determined to have little to no bearing on whether a given communication should be assigned the classification. In some embodiments, the filter list 612 may be common across all classifications.

In certain embodiments, the inclusion list 610 may be associated with statistical data that is maintained by the profiling engine 604. Based on the statistical data, the one or more profiles 608 can provide means, or expected values, relative to the inclusion list 610. In some embodiments, the expected value may be based on an input such as a length of a given communication (e.g., a number of characters or words). According to this example, the expected value may be an expected number of "hits" on the inclusion list 610 for a personal message of a particular length. The particular length may correspond to a length of the given communication. By way of further example, the expected value may be an expected percentage of words of a personal message that are "hits" on the inclusion list 610. Optionally, the expected percentage may be based on a length of the given communication in similar fashion to that described above with respect to the expected number of "hits."

The comparison engine 606 is operable to compare data to the one or more profiles 108 based on configurations 614. The configurations 614 typically include heuristics for establishing whether data should be classified into the classification. In particular, the configurations 614 can include one or more thresholds that are established relative to the statistical data maintained by the profiling engine 604. For example, each threshold can be established as a number of standard deviations relative to an expected value.

For example, continuing the personal-message classification example described above, the configurations 614 may require that an actual value of a given metric for a new communication not be more than two standard deviations below the expected value of the given metric. In this fashion, if the actual value is not more than two standard deviations below the expected value, the new communication may be assigned the classification. The given metric may be, for example, a number or percentage of "hits" as described above.

Figure 7:
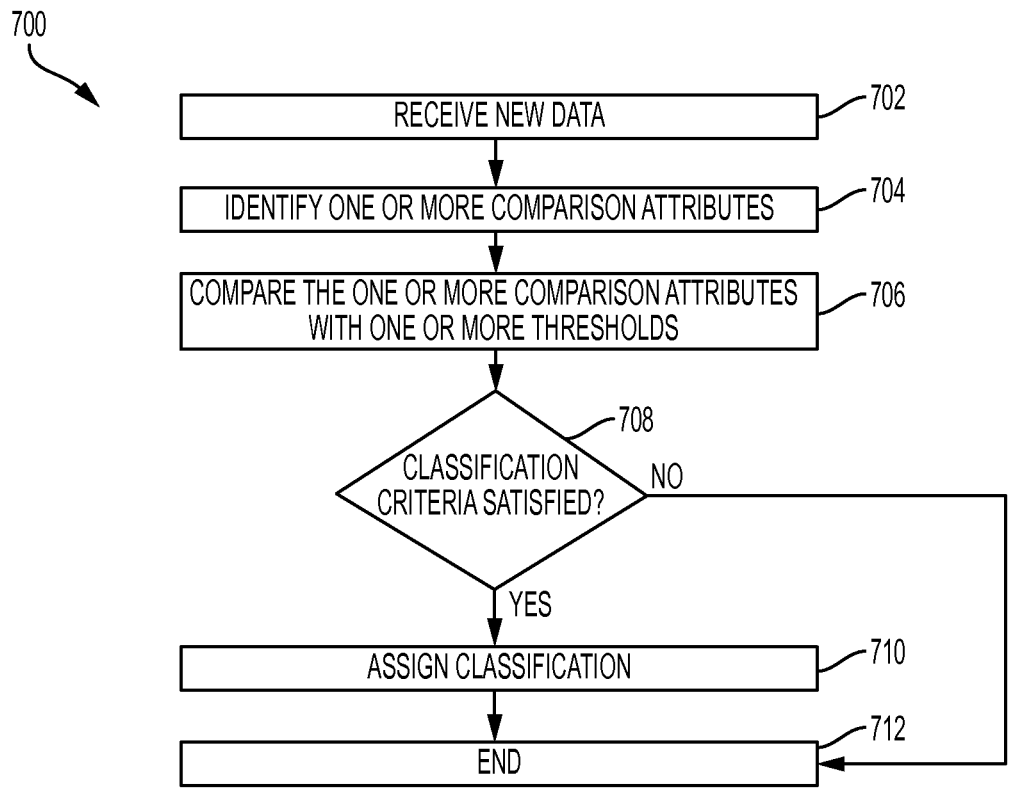
FIG. 7 presents a flowchart of an example of a heuristics process.

FIG. 7 presents a flowchart of an example of a heuristics process 700 for classifying data into a classification. The process 700 can be implemented by any system that can classify data and/or metadata. For example, the process 700, in whole or in part, can be implemented by a heuristics engine such as, for example, the heuristics engine 230 of FIG. 2 or the heuristics engine 602 of FIG. 6. In some cases, the process 700 can be performed generally by the BIM system 130. Although any number of systems, in whole or in part, can implement the process 700, to simplify discussion, the process 700 will be described in relation to the heuristics engine. The process 700 begins at step 702.

At step 702, the heuristics engine receives new data. The new data may be considered to be representative of any data, inclusive of metadata, for which classification is desired. The new data may be, for example, a new communication. From step 702, the process 700 proceeds to step 704. At step 704, the heuristics engine identifies one or more comparison attributes in the new data. For example, the one or more comparison attributes may be actual values for given metrics such as, for example, a number or percentage of "hits" on an inclusion list such as the inclusion list 610 of FIG. 6. From step 704, the process 700 proceeds to step 706.

At step 706, the heuristics engine compares the one or more comparison attributes with one or more thresholds. The one or more thresholds may be defined as part of configurations such as, for example, the configurations 614 of FIG. 6. From step 706, the process 700 proceeds to step 708. At step 708, the heuristics engine determines whether classification criteria has been satisfied. In a typical embodiment, the classification criteria is representative of criteria for determining whether the new data should be assigned the classification. The classification criteria may specify, for example, that all or a particular combination of the one or more thresholds be satisfied.

If it is determined at step 708 that the classification criteria not been satisfied, the process 700 proceeds to step 712 where the process 700 ends without the new data being assigned the classification. If it is determined at step 708 that the classification criteria has been satisfied, the process 700 proceeds to step 710. At step 710, the heuristics engine assigns the classification to the new data. From step 710, the process 700 proceeds to step 712. At step 712, the process 700 ends.

In certain embodiments, data queries as described with respect to FIGS. 1-5 may also be accomplished using query packages. A query package generally encapsulates package attributes such as, for example, search parameters as described above with respect to queries, as long with other package attributes that enable enhanced functionality. For example, a query package can further encapsulate a package attribute that specifies a type of data visualization that is to be created using the queried data. The type of data visualization can include, for example, scatterplots, pie charts, tables, bar charts, geospatial representations, heat maps, chord charts, interactive graphs, bubble charts, candlestick charts, stoplight charts, spring graphs, and/or other types of charts, graphs, or manners of displaying data.

In some embodiments, query packages may run one specific query. In various other embodiments, query packages may run multiple queries. Table 1 below lists example package attributes that can be included in a given query package.

TABLE 1

| PACKAGE ATTRIBUTE(S) | DESCRIPTION |
|---|---|
| Package Name | A name by which the query package can be referenced. |
| Package Description | A description of the query package's operation. |
| Security Scope | Optionally specify a security and data access policy as described with respect to FIG. 2. |
| Visualization | Specifies a type of data visualization such as, for example, scatterplots, pie charts, tables, bar charts, geospatial representations, heat maps, chord charts, interactive graphs, bubble charts, candlestick charts, stoplight charts, spring graphs, and/or other types of charts, graphs, or manners of displaying data. In cases where the package is representative of multiple queries, the visualization attribute may be represented as an array of visualizations that can each have a visualization type, a data source, and a target entity (e.g., entity that is being counted such as, for example, messages, message participants, etc.) |
| Default Group-By Field | Retrieves data according to, for example, one or more data columns (e.g., by location, department, etc.). |
| Aggregation Period | A time period such as, for example, daily, hourly, etc. |
| Data-Smoothing Attributes | Specifies one or more algorithms that attempt to capture important patterns in the data, while leaving out noise or other fine-scale structures/rapid phenomena. |
| Visualization-Specific Attributes | Certain types of visualizations may require additional attributes such as, for example, specification of settings for sorting, number of elements in a data series, etc. |
| Facet Names | Data (or fields) related to the query that can be used to categorize data. Particular values of facets can be used, for example, to constrain query results. |
| Array of Entities | An array of entities that can each have, for example, a name, entity type (e.g., message), filter expression, and a parent-entity property. |
| Array of Facets | An array of facets that can each have, for example, a name, group-by field, and a minimum/maximum number of results to show. |

In a typical embodiment, query packages can be shared among users or distributed to users, for example, by an administrator. In a typical embodiment, one user may share a particular query package with another user or group of users via the user interface 240. In similar fashion the other user or group of users can accept the query package via the user interface 240. Therefore, the query manager 242 can add the shared query package for the user or group of users. As described above, the query manager 242 generally maintains each user's query packages in a table by a unique identifier. In a typical embodiment, query packages further facilitate sharing by specifying data and data sources in a relative fashion that is, for example, relative to a user running the query. For example, package attributes can refer to data owned by a user running the query or to data that is owned by users under the supervision of the user running the query rather than to specific data or users.

Figure 8:
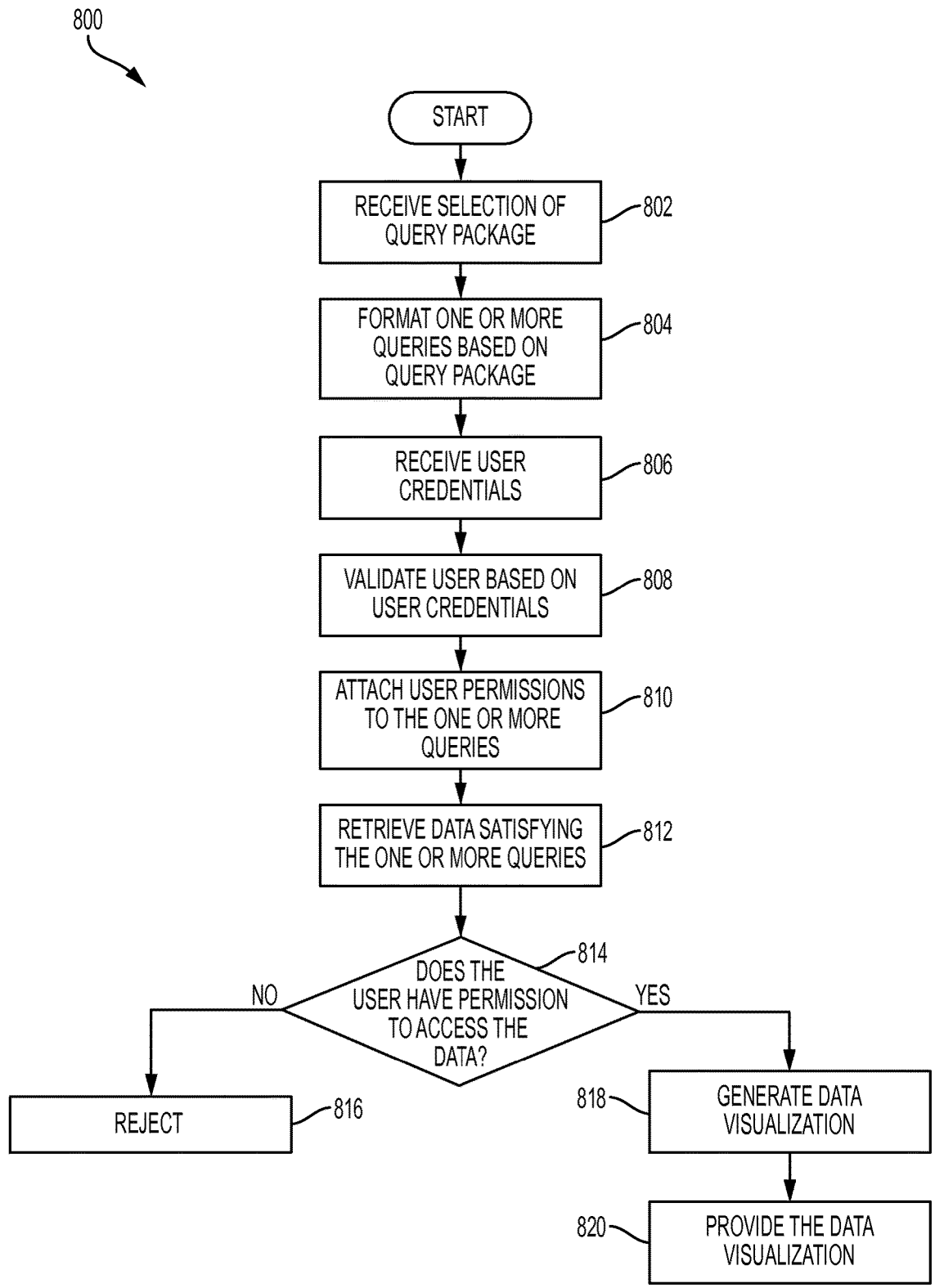
FIG. 8 presents a flowchart of an example of a data query process.

FIG. 8 presents a flowchart of an example of a data query process 800 that uses query packages. The process 800 can be implemented by any system that can process a query package provided by a user or another system and cause the results of a query encapsulated therein to be presented to the user or provided to the other system. For example, the process 800, in whole or in part, can be implemented by one or more of the BIM access system 136, the user interface 240, the query manager 242, and the query security manager 244. In some cases, the process 800 can be performed generally by the BIM system 130. Although any number of systems, in whole or in part, can implement the process 800, to simplify discussion, the process 800 will be described in relation to specific systems or subsystems of the BIM system 130.

The process 800 begins at block 802 where, for example, the user interface 240 from a user a selection of a query package. In various embodiments, the query package may be selected from a list or graphical representation of query packages. As described above, the query package typically specifies a data visualization based on a data query. In various embodiments, the query package may specify more than one data visualization and/or be based on more than one data query. At block 804, the query manager 242 formats one or more queries based on the query package selected at block 802. In certain embodiments, the block 804 may be optional. For example, in some cases the query package may already include a query that can be processed by the BIM system 130 without modification.

At block 806, the user interface 240 receives one or more user credentials from the user. In some cases, the user credentials may be received from an application. The user credentials can include any type of credential or identifier that can be used to identify a user and/or determine a set of permissions or a level of authorization associated with the user. At block 808, the query security manager 244 can validate the user, or application, based at least in part on the user credentials received at the user interface 240. Validating the user can include identifying the user, identifying permissions associated with the user, the user's role, and/or an authorization level associated with the user. In some embodiments, if the query security manager 244 is unable to validate the user or determines that the user lacks authorization to access the BIM system 130 and/or query the databases 232, the query security manager 244 may reject the one or more queries. Further, the user interface 240 may inform the user that the user is not authorized to access the BIM system 130 or to query the databases 232. In some implementations, if the user identifies as a guest or if the query security manager 244 is unable to validate the guest, the user may be associated with a guest identity and/or a set of guest permissions, which may permit limited access to the BIM system 130 or the data stored at the databases 232. In some cases, a guest may receive full access to the BIM system 130. However, the actions of the guest may be logged or logged differently than the actions of an identified user.

At block 810, the query security manager 244 attaches the user permissions to the one or more queries. Alternatively, or in addition, the query security manager may attach the user's identity, role, and/or authorization level to the one or more queries. In some embodiments, one or more of the blocks 806, 808, and 810 may be optional.

At block 812, the query manager 242 retrieves data, and/or metadata, satisfying the one or more queries. In some implementations, the block 812 may include providing the one or more queries to the data repository engine 222 for processing. The data repository engine 222 can then query the databases 232 to obtain data that satisfies the one or more queries. This data can then be provided to the query manager 242.

At decision block 814, the query security manager 244 can determine whether the user has permission, or is authorized, to access the data that satisfies the one or more queries. Determining whether the user has permission to access the data may be based on any type of factor that can be used to determine whether a user can access data. For example, the determination may be based, at least in part, on the user's credentials, the user's permissions, a security level associated with the data, etc. In some cases, the data repository engine 222 may perform the decision block 814 as part of the process associated with the block 812.

If the query security manager 244 determines that the user does not have permission to access the data, the query security manager 244 rejects the one or more queries at block 816. In some cases, rejecting the one or more queries may include informing the user that the query package not authorized and/or that the user is not authorized to access the data associated with the query package. In other cases, rejecting the one or more queries may include doing nothing or presenting an indication to the user that no data satisfies the query package.

If the query security manager 244 determines that the user does have permission to access the data, the query manager 242 (or a separate visualization component) generates the data visualization at block 818. At block 820, the user interface 240 provides the data visualization to the user. Providing the user the data visualization can include presenting the data visualization on a webpage, in an application-generated window, in a file, in an email, or any other method for providing data to a user. In some cases, the data visualization may be copied to a file and the user may be informed that the data visualization is ready for access by, for example, providing the user with a copy of the file, a link to the file, or a location associated with the file.

FIG. 9 illustrates an example of a user interface that can be used by a user to select a query package.

FIG. 10 illustrates an example of a user interface that can be used by a user to create or modify a query package.

Table 2 below provides an example of a data model that can be utilized by a BIM system such as, for example, the BIM system 130. In particular, Table 2 illustrates several entities that can be used to model communications such as, for example, personal communications or business communications.

TABLE 2

| ENTITY | FIELD | DATA TYPE |
| --- | --- | --- |
| Message | Body | String |
| | Classifications | Strings |
| | Content | String |
| | Date | Date Time |
| | External Recipients | Entities (Message Participant) |
| | File Attachments | Entities (File) |
| | In reply to | Entity (Message) |
| | Internal Recipients | Entities (Message Participant) |
| | Is Encrypted | Boolean |
| | Message Attachments | Entities (Messages) |
| | Message IDs | Strings |
| | Original Message ID | String |
| | Participants | Entities (Message Participant) |
| | Platform | Enum (Message Platform type) |
| | Recipients | Entities (Message Participant) |
| | Send Date | Date Time |
| | Send Time of Day | Time |
| | Sender | Entity (Message Participant) |
| | Size | Integer |
| | Subject | String |
| | Thread | Entity (Message Thread) |
| | Type | Enum (Message Address Type) |

TABLE 2-continued

| ENTITY | FIELD | DATA TYPE |
|---|---|---|
| Message Participant | Date | Date Time |
| | Deletion Date | Date Time |
| | Delivery Time | Time Span |
| | Has Been Delivered | Boolean |
| | ID | String |
| | Is Addressed in BCC | Boolean |
| | Is Addressed in CC | Boolean |
| | Is Addressed in TO | Boolean |
| | Is External Recipient | Boolean |
| | Is Internal Recipient | Boolean |
| | Is Recipient | Boolean |
| | Is Sender | Boolean |
| | MessgeAsSender | Entity (Message) |
| | MessageAsInternalRecipient | Entity (Message) |
| | MessageAsExternalRecipient | Entity (Message) |
| | Message Address | Entity (Message Address) |
| | Person | Entity (Person Snapshot) |
| | Receipt Date | Date Time |
| | Receipt Time of Day | Time |
| | Responses | Entity (Message) |
| | Response Time | Time Span |
| Message Address | Domain | Entity (ONS Domain) |
| | Is External | Boolean |
| | Is Internal | Boolean |
| | Name | String |
| | Platform | Enum (Message Platform Type) |
| | Type | Enum (Message Address Type) |
| DNS Domain | Name | String |
| Person Snapshot | Address | Entities (Messaging Address) |
| | All Reports | Entities (Person Snapshot) |
| | Company | String |
| | Department | String |
| | Direct Reports | Entities (Person Snapshot) |
| | First Name | String |
| | Full Name | String |
| | History | Entity (Person History) |
| | ID | String |
| | Initials | String |
| | Job Title | String |
| | Last Name | String |
| | Manager | Entity (Person Snapshot) |
| | Managers | Entities (Person Snapshot) |
| | Messaging Addresses | Entities (Message Address) |
| | Message Participants | |
| | Office | String |
| | OU | String |
| | Snapshot Date | Date Time |
| | Street Address | Complex Type (Street Address) |
| | Telephone Numbers | Strings |
| Street Address | City | String |
| | Country or Region | String |
| | PO Box | String |
| | State or Province | String |
| | Street | String |
| | Zip or Postal Code | String |
| Person History | Current | Entity (Person) |
| | Historic | Entities (Person) |
| | ID | String |
| | Messages | Entities (Message) |
| | Timestamp | Date Time |
| Message Thread | ID | String |
| | Messages | Entities (Message) |
| | Participants | Entities (Message Participant) |
| | Thread subject | String |
| | Timestamp | Date Time |
| File | Filename | String |
| | ID | String |
| | Messages | Entities (Message) |
| | Modified Date | Date Time |
| | Size | Integer |
| | Hash | String |

III. Data Loss Prevention

Figure 11:
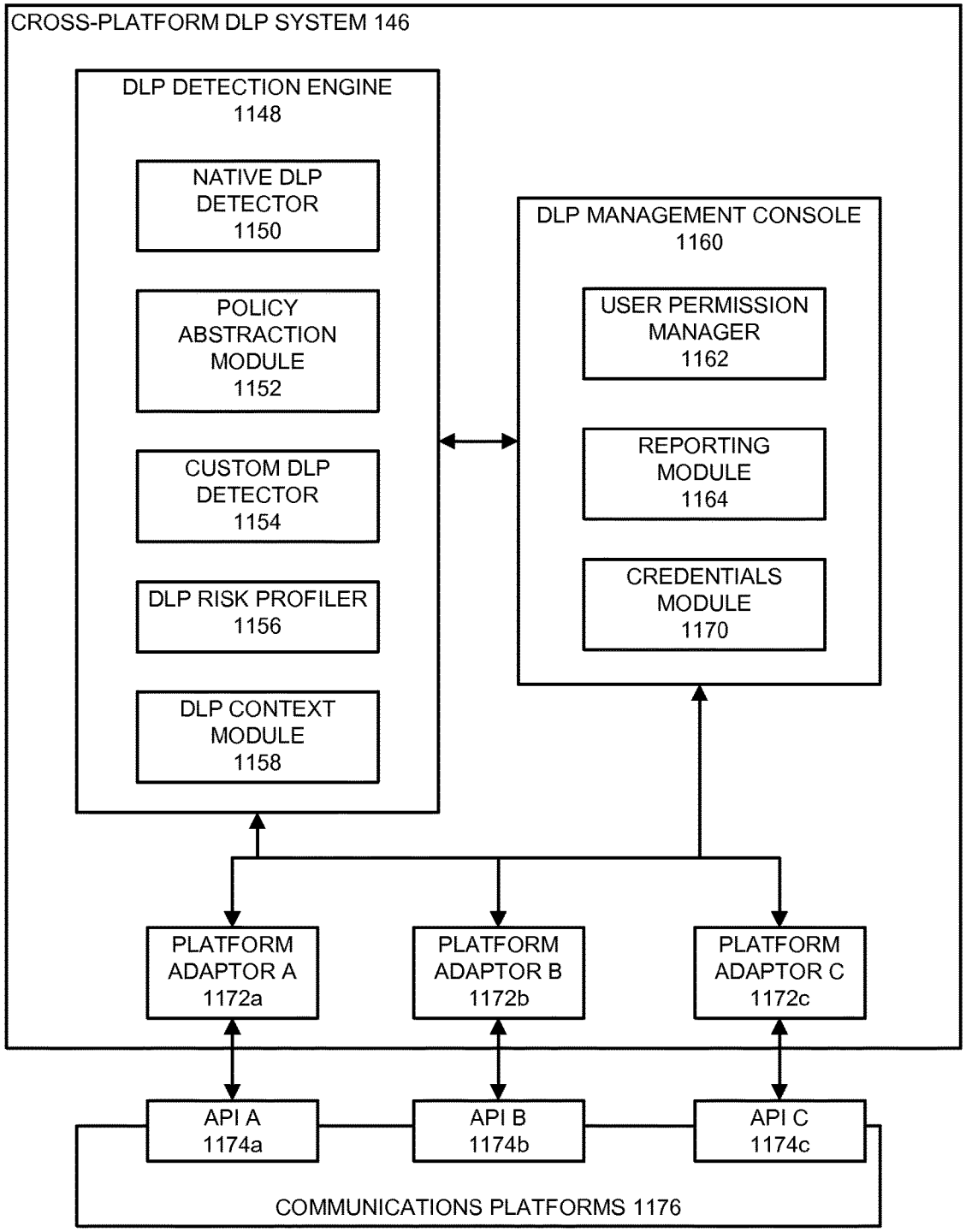
FIG. 11 illustrates an embodiment of an implementation of a cross-platform DLP system.

FIG. 11 illustrates an embodiment of an implementation of the cross-platform DLP system 146 of FIG. 1. The cross-platform DLP system 146 includes a DLP detection engine 1148 and a DLP management console 1160. The DLP detection engine 1148 typically performs operations that create and/or activate cross-platform DLP policies. The DLP detection engine 1148 can also monitor communications to identify violations of those cross-platform DLP policies. In a typical embodiments, the DLP management console 1160 performs operations that report and/or enforce cross-platform DLP policies responsive, for example, to violations detected by the DLP detection engine 1148.

As part of performing their respective functionality, the DLP detection engine 1148 and the DLP management console 1160 are operable to communicate with communications platforms 1176. The communications platforms 1176, in general, are representative of at least a portion of the internal data sources 120 and the external data sources 122 as illustrated in FIG. 1. For ease of illustration and description, the internal data sources 120 and the external data sources 122 are shown collectively as the communications platforms 1176.

In the illustrated embodiment, the communications platforms 1176 include an application programming interface (API) A 1174a, an API B 1174b, and an API C 1174c (collectively, APIs 1174). The APIs 1174 may each be considered a logical encapsulation of functions and operations provided by a distinct communications platform of the communications platforms 1176. In many cases, it may be that such functions and operations are not exposed by each of the communications platforms 1176 via a common API but rather via a plurality of native APIs and/or access interfaces. It should be appreciated that some or all of the communications platforms may not provide any API. Likewise, although the APIs 1174 are shown for illustrative purposes, it should be appreciated that the communications platforms 1176 can include any number of APIs and any number of communications platforms.

Each of the APIs 1174 provides an interface to native DLP support provided by a given communications platform of the communications platforms 1176. Examples of native DLP support that can be provided by the given communications platform include specifying a native DLP policy in a structure and format understood by that communications platform, activating a native DLP policy, implementing enforcement actions allowed by that communications platform (e.g., placing restrictions on a user or group of users), and/or the like. It should be appreciated that the APIs 1174 may not provide homogenous functionality. For example, the API A 1174a might permit certain enforcement actions but might not include any functionality for specifying and/or activating native DLP policies. Continuing this example, the API B 1174b might include all such functionality. By way of further example, different APIs of the APIs 1174 may enable different enforcement actions and/or specification or selection of different types of native DLP policies.

In a typical embodiment, the cross-platform DLP system 146 enables a common interface into the APIs 1174 via a platform adaptor A 1172a, a platform adaptor B 1172b, and a platform adaptor C 1172c (collectively, platform adaptors 1172). In similar fashion to the APIs 1174, the number of platform adaptors 1172 is illustrative in nature. Each of the platform adaptors 1172 typically maps a standard set of functionality to corresponding sets of calls to the APIs 1174. In that way, the platform adaptors 1172 can be collectively considered a standard API that is operable to be called, for example, by components of the DLP detection engine 1148 and the DLP management console 1160. The standard API of the platform adaptors 1172 can include, for example, functions that specify a native DLP policy on a given communications platform, functions that activate a native DLP policy, functions that implement specific enforcement actions, etc. By way of example, the platform adaptor A 1172a can map each call of the standard API to a corresponding API call on the API A 1174a to the extent such a corresponding API call exists. The platform adaptor A 1172a can include, for example, a capabilities call that results in all capabilities of the API A 1174a being returned. The capabilities can include, for example, features of the standard API that the API A 1174a supports. The platform adaptor B 1172b and the platform adaptor C 1172c can be similarly configured relative to the API B 1174b and the API C 1174c, respectively.

In the illustrated embodiment, the DLP detection engine 1148 includes a native DLP detector 1150, a policy abstraction module 1252, a custom DLP detector 1154, a DLP risk profiler 1156, and a DLP context module 1158. The policy abstraction module 1252 provides an interface for an appropriate user such as, for example, an administrator, to create and/or activate cross-platform DLP policies. The policy abstraction module 1252 typically creates the cross-platform DLP policies in a standardized policy format. The standardized policy format can generally be any format for specifying rules and/or Boolean conditions. In some cases, the standardized policy format may correspond to a format natively supported by one or more of the communications platforms 1176. In a typical embodiment, how the cross-platform DLP policies are activated on the communications platforms 1176 can depend on, among other things, an extent to which each of the communications platforms 1176 provides DLP support, administrator preference, etc.

In many cases, some or all of the communications platforms 1176 may provide at least some native DLP support. In these cases, if it is desired to activate a given cross-platform DLP policy natively on the communications platforms 1176, the policy abstraction module 1252 can provide the given cross-platform DLP policy in a corresponding call to the platform adaptors 1172. In a typical embodiment, the platform adaptors 1172 are operable to receive the given cross-platform DLP policy in the standardized policy format and re-specify it in a respective native format expected by each of the communications platforms 1176, for example, by translating the given cross-platform DLP policy from the standardized policy format to the respective native format. In some cases, some of the communications platforms 1176 may have a pre-existing native DLP policy that is deemed equivalent to a given cross-platform DLP policy. In these cases, no new native DLP policy usually needs to be specified. Rather, a corresponding platform adaptor of the platform adaptors 1172 can maintain a mapping to the equivalent native DLP policy. Once the given cross-platform DLP policy has been created and/or natively activated, as appropriate, the native DLP detector 1150 can perform DLP detection. Operation of the native DLP detector 1150 will be described in greater detail below.

As mentioned above, some or all of the communications platforms 1176 may either provide no DLP support or provide DLP support that is insufficient in some respect for natively activating the given cross-platform DLP policy. In addition, even if sufficient DLP support is provided by the communications platforms 1176, it may otherwise be desirable by the administrator for the cross-platform DLP system 146 to centrally activate the given cross-platform DLP policy for a particular set of communications platforms of the communications platforms 1176. Central activation typically means that, as to the particular set of communications platforms, violation detection is performed centrally by the cross-platform DLP system 146 without relying on native DLP functionality, if any, of the particular set of communications platforms. Under these circumstances, the policy abstraction module 1252 can provide the given cross-platform DLP policy to the custom DLP detector 1154 for storage and implementation. The custom DLP detector 1154 will be described in greater detail below.

In a typical embodiment, the policy abstraction module 1252 centrally maintains all cross-platform DLP policies, for example, in a database, persistent file-based storage, and/or the like. In some cases, all cross-platform DLP policies can be maintained on the BIM system 130, for example, in one or more of the databases 232. In addition, the policy abstraction module 1252 generally tracks how each cross-platform DLP policy is activated on each of the communications platforms 1176. As described above, cross-platform DLP policies can be activated natively on the communications platforms 1176, centrally activated by the cross-platform DLP system 146, and/or a combination thereof. The manner of activation can be maintained by the policy abstraction module 1252 as part of its tracking functionality.

The native DLP detector 1150 typically manages violation detection for native activations of cross-platform DLP policies. In a typical embodiment, the native DLP detector 1150 can import violations of native DLP policies, for example, from logs that are generated by such platforms. In some cases, the logs can be accessed via, for example, the platform adaptors 1172 and the APIs 1174. In other cases, it may be possible to access such logs without the platform adaptors 1172 and/or the APIs 1174 if, for example, a network storage location of the logs is known.

The custom DLP detector 1154 typically manages violation detection for central activations of cross-platform DLP policies. In a typical embodiment, the custom DLP detector 1154 centrally performs violation detection on communications centrally collected and stored by the BIM system 130 as described above. In this fashion, with respect to the central activations, the cross-platform DLP policy can be applied and evaluated against such communications for purposes of identifying violations.

The DLP risk profiler 1156 is operable to identify quasi-violations, assess risk of cross-platform DLP policies being violated and/or quasi-violated, and/or the like. A quasi-violation, as used herein, refers to user activity or behavior that does not literally violate a given policy but that is measurably and configurably close to doing so. An actual violation, as used herein, refers to user activity or behavior that literally violates a given policy. For purposes of this disclosure, the term violation can encompass both actual violations and quasi-violations. What constitutes measurably close can be empirically defined, for example, via statistical, mathematical, and/or rule-based methods.

For instance, a particular cross-platform DLP policy could prohibit sending files (e.g., email attachments) that are larger than a maximum size (e.g., ten megabytes). According to this example, measurably close could be empirically defined as being within a certain percentage of the maximum size (e.g., five percent), being within a certain numeric range relative to the maximum size (e.g., greater than nine megabytes but less than ten megabytes), etc. Measurably close could be further defined to include a repetition factor. For example, quasi-violations could be limited to cases where a given user has met the above-described empirical definition at least a specified number of times (e.g., five) within a specified window of time (e.g., one hour, one day, one week, etc.). Quasi-violations could also be limited to such cases where a number of times that the user has sent such files is within a certain number of standard deviations of an expected value for the specified window of time. It should be appreciated that similar principles could be applied to automatically identify quasi-violations for other types of cross-platform DLP policies that specify, for example, values and/or thresholds.

In various embodiments, the DLP risk profiler 1156 can also trigger a quasi-violation based on, for example, an assessment that a cross-platform DLP policy is in imminent risk of being violated. For example, certain DLP policies may relate to values that tend to increase over time or that exhibit a pattern (e.g., linear or exponential). For example, a given policy could limit each user to a certain quantity of instant messages per day (e.g., 100). If it appears that a particular user is projected to reach the certain quantity (e.g., based on a linear trend) or is within a defined range of the certain quantity (e.g., ninety-five instant messages before 2:00 pm local time), a quasi-violation could be triggered. A quasi-violation could also be triggered if, for example, a characteristic precursor to an actual violation has been detected. For example, a particular cross-platform DLP policy could specify that communications to customer A cannot occur via email. In that case, a characteristic precursor to an actual violation could be the appearance in a user's email contacts of an email address specifying Customer A's domain (e.g., example.com).

In various embodiments, the DLP risk profiler 1156 can also be utilized for on-demand risk assessment. For example, designated users (as described further below), administrators, and/or the like can use the DLP risk profiler 1156 to perform a risk query. In various embodiments, the risk query can be equivalent to a cross-platform DLP policy. For example, the risk query can be embody a prospective cross-platform DLP policy. An administrator, for example, could use the risk query to search communications collected by the BIM system 130 to determine a business impact of implementing the cross-platform DLP policy. The risk query is typically tailored to identify information related to the business impact. After execution of the risk query, the information is returned to the administrator. Based on the information returned by the risk query, the administrator could determine, inter alia, a volume of users exhibiting behaviors prohibited by the prospective cross-platform DLP policy, an overall number of past communications within a certain period of time that would have been implicated by the prospective cross-platform DLP policy, which departments or organizational units would be most impacted by the prospective cross-platform DLP policy, etc.

The DLP context module 1158 is operable to dynamically acquire context information responsive, for example, to a detected violation. In various embodiments, what constitutes context information for a violation of a given cross-platform DLP policy can be pre-defined as a query package as described above. Responsive to a violation of the given cross-platform DLP policy, the query package can be executed to yield the context information. An example of defining and executing a query package will be described in greater detail with respect to FIGS. 14 and 16. Also, in some embodiments, all or part of what constitutes context information can be specified, for example, by designated users upon receipt of an alert. In these embodiments, the designated users can request particular data points that are of interest given the contents of the alert. It should be appreciated that the context information can be acquired from any of the communications platforms 1176. For example, if a user were to violate the cross-platform DLP policy on an email platform, the context information could include information related to the user's contemporaneous communications on each of an instant-messaging platform, an enterprise social-networking platform, and/or any of the communications platforms 1176.

The DLP management console 1160 includes a user permission manager 1162, a reporting module 1164, and a credentials module 1170. In a typical embodiment, the user permission manager 1162 maintains an access profile for each user of the cross-platform DLP system 146. The access profile can be created based on, for example, directory information (e.g., Active Directory). In some embodiments, the access profile can be created by an administrator.

The access profile typically specifies a scope of violations that the user is authorized to view and/or for which the user should receive alerts or reports (e.g., all staff, all employees beneath the user in an employee hierarchy, etc.). The access profile also typically specifies enforcement actions that the user is allowed to take if, for example, DLP violations have occurred. In some cases, the user's ability to take the enforcement action may be conditioned on violation(s) having occurred. In other cases, some or all of the enforcement actions may be available to the user unconditionally. For purposes of this disclosure, a given user may be considered a designated user with respect to those cross-platform DLP policies for which the given user is authorized to view violations, receive reports or alerts on violations, and/or take enforcement actions.

The reporting module 1164 provides an interface to display to designated users information pertaining to violations of cross-platform DLP policies and any context information. In various embodiments, the reporting module 1164 is operable to initiate alerts or present reports using, for example, any of the communications platforms 1176. The reports and/or alerts can be presented using, for example, SMS text message, email, instant message, a dashboard interface, social media messages, web pages, etc. The reporting module 1164 can also provide via, for example, a dashboard interface, any enforcement actions that each designated user is authorized to take. The enforcement actions can include, for example, blocking particular domains (e.g., example.com), suspending a user account on all or selected ones of the communications platforms 1176, blocking sending communications, blocking receiving communications, and/or the like. In some embodiments, the enforcement actions, can include a "kill" option that suspends a user or group of users' access to all of the communications platforms 1176.

The credentials module 1170 typically stores administrative credentials for accessing each of the communications platforms 1176 via, for example, the APIs 1174. In various embodiments, the credentials module 1170 enables designated users to execute administrative actions (e.g., enforcement actions) that the designated users would ordinarily lack permission to perform, thereby saving time and resources of administrators. The user permission manager 1162 can determine, via access profiles, enforcement actions that the designated users are authorized to perform. Responsive to selections by the designated users, the credentials module 1170 can execute those enforcement actions on the communications platforms 1176 using the stored administrative credentials.

Figure 12:
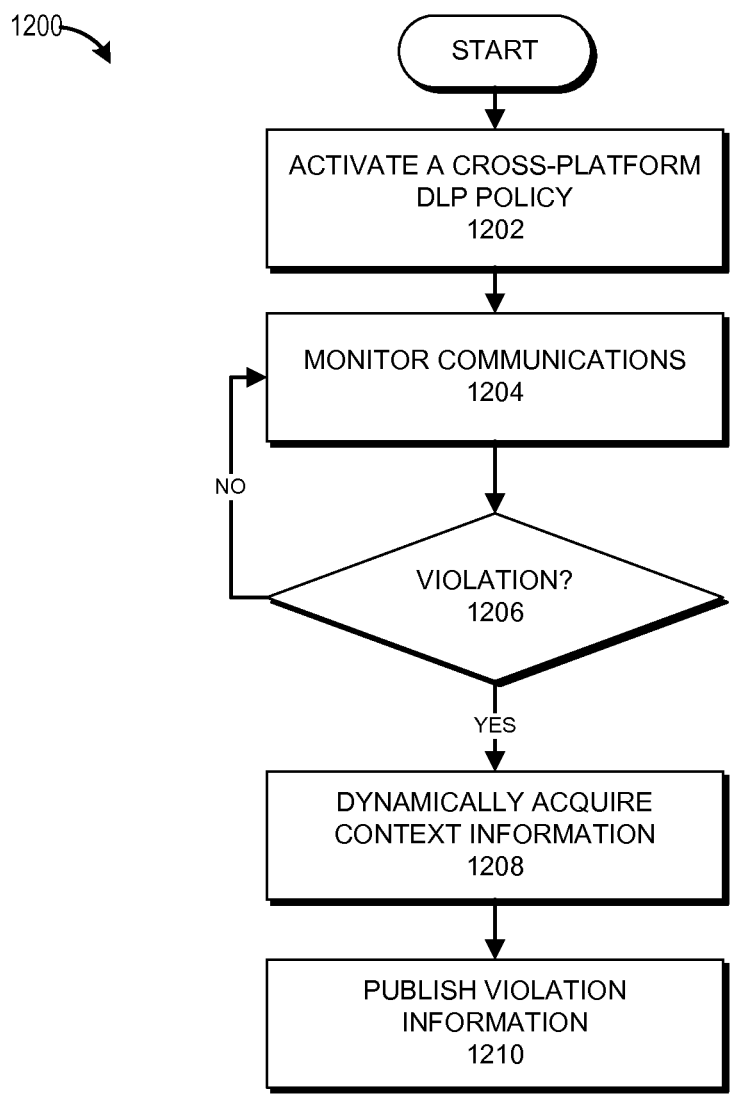
FIG. 12 illustrates an example of a process for cross-platform DLP implementation.

FIG. 12 presents a flowchart of an example of a process 1200 for cross-platform DLP implementation. The process 1200 can be implemented by any system that can access data, evaluate data, and/or interact with users. For example, the process 1200, in whole or in part, can be implemented by one or more of the BIM system 130, the DLP detection engine 1148, the DLP management console 1160, and/or components thereof. Although any number of systems, in whole or in part, can implement the process 1200, to simplify discussion, the process 1200 will be described in relation to specific systems or subsystems of the networked computing environment 100 of FIG. 1 and/or the cross-platform DLP system 146. For illustrative purposes, the process 1200 will be described with respect to a single cross-platform DLP policy. However, it should be appreciated that the process 1200 can be repeated relative to numerous cross-platform DLP policies that will be maintained by the cross-platform DLP system 146.

At block 1202, the DLP detection engine 1148 activates a cross-platform DLP policy on a set of communications platforms of the communications platforms 1176 for enforcement against a set of users (e.g., a user or group of users). In typical embodiment, the block 1202 includes the policy abstraction module 1252 interacting with an administrator to select and/or create the cross-platform DLP policy, select the set of users, and choose the set of communications platforms. In some cases, the set of communications platforms may include only one of the communications platforms 1176. As described above, relative to the set of communications platforms, the cross-platform DLP policy can be centrally activated, natively activated, or a combination thereof. In the case of native activation, the cross-platform DLP policy can include initiating a native DLP policy on one or more of the set of communications platforms. An example of how the cross-platform DLP policy can be created will be described with respect to FIG. 13.

At block 1204, the DLP detection engine 1148 monitors communications of the set of users on the set of communications platforms for violations of the cross-platform DLP policy. In various embodiments, the block 1204 can include monitoring for actual violations, quasi-violations, or both. In a typical embodiment, as part of the block 1204, the native DLP detector 1150 tracks violations of any native activations of the cross-platform DLP policy. The native activations can include, for example, native DLP policies that are a translated form of or are deemed equivalent to the cross-platform DLP policy. In a typical embodiment, the custom DLP detector 1154 centrally detects violations of any central activations of the cross-platform DLP policy. The central detection typically includes evaluating, against the cross-platform DLP policy, communications collected by the BIM system 130 that correspond to the central activations. In addition, the block 1204 can also include the DLP risk profiler 1156 monitoring for quasi-violations of the cross-platform DLP policy as described above.

At decision block 1206, the DLP detection engine 1148 determines whether a violation has been detected, for example, by the native DLP detector 1150, the custom DLP detector 1154, and/or the DLP risk profiler 1156. Responsive to a detected violation, the process 1200 proceeds to block 1208. Otherwise, the process 1200 returns to the block 1204 and proceeds as described above. At the block 1208, the DLP context module 1158 dynamically acquires context information for the detected violation. An example of how context information can be specified will be described with respect to FIG. 13. An example of dynamically acquiring context information will be described with respect to FIG. 14.

At block 1210, the DLP management console 1160 publishes violation information to at least one designated user. The at least one designated user can include, for example, a manager of a user who initiated the violation. The violation information can include, for example, information associated with the detected violation, the context information, and/or the like. The information associated with the detected violation can include, for example, user-identification information (e.g., name, user name, ID, etc.), violation type (e.g., identification of the particular violation if multiple violation types are allowed by the cross-platform DLP policy), a time of the violation, a communication that constituted the violation, a communication identifier for the communication that constituted the violation, and/or other information that is readily accessible at a time of violation detection. In a typical embodiment, the block 1210 results in the violation information being made accessible to the at least one designated user. In many cases, the block 1210 may include providing the at least one designated user with options for selecting one or more enforcement actions as a result of the detected violation. An example of publishing violation information will be described with respect to FIG. 15.

Figure 13:
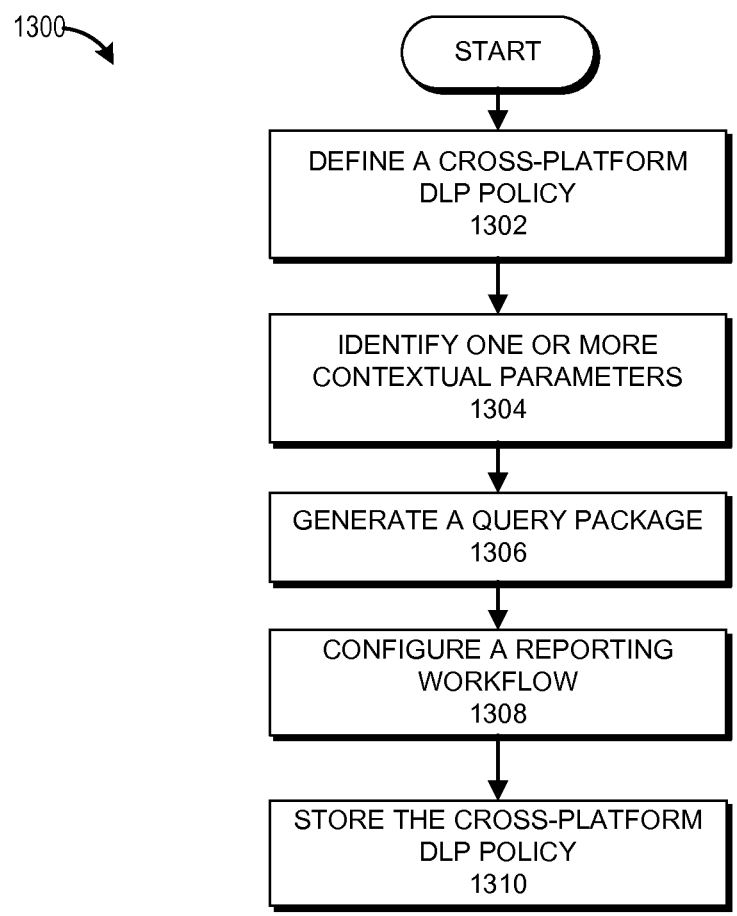
FIG. 13 illustrates an example of a process for creating a cross-platform DLP policy.

FIG. 13 presents a flowchart of an example of a process 1300 for creating a cross-platform DLP policy. The process 1300 can be implemented by any system that can access data, evaluate data, and/or interact with users. For example, the process 1300, in whole or in part, can be implemented by one or more of the BIM system 130, the DLP detection engine 1148, the DLP management console 1160, and/or components thereof. Although any number of systems, in whole or in part, can implement the process 1300, to simplify discussion, the process 1300 will be described in relation to specific systems or subsystems of the networked computing environment 100 of FIG. 1 and/or the cross-platform DLP system 146. In various embodiments, the process 1300 can be performed as part of the block 1202 of FIG. 12.

At block 1302, the policy abstraction module 1252 defines a cross-platform DLP policy. The block 1302 can include the policy abstraction module 1252 interacting with an administrator to establish, for example, a name and/or unique identifier for the cross-platform DLP policy. The block 1302 can include, for example, empirically defining how the cross-platform DLP policy can be violated responsive to input from the administrator. The empirical definition can include defining both actual violations and quasi-violations. In some embodiments, definitions of quasi-violations can be automatically derived from the definitions of actual violations (e.g., as percentages, ranges, standard deviations relative to expected values, etc.). In some embodiments, the cross-platform DLP policy can be defined in terms of a native DLP policy of a particular communications platform of the communications platforms 1176. In these embodiments, the administrator can be permitted to identify or provide the native DLP policy, which policy the policy abstraction module 1252 can then import and re-specify in a standardized format (e.g., by translation).

At block 1304, the policy abstraction module 1252 identifies one or more contextual parameters. The contextual parameters generally represent variable, violation-specification information that will be used as a basis for generating context information. The contextual parameters can include, for example, user-identification information (e.g., name, user name, ID, etc.), violation type (e.g., identification of the particular violation if multiple violation types are allowed by the cross-platform DLP policy), a time of the violation, a communication that constituted the violation, a communication identifier for the communication that constituted the violation, and/or other information that is readily accessible at a time of violation detection.

At block 1306, the policy abstraction module 1252 generates a query package that can be used to dynamically generate context information responsive to a detected violation. The query package can be specified, for example, as described above with respect to FIGS. 1-12. In general, the query package is tailored to request, in terms of the contextual parameters, context information for violations of the cross-platform DLP policy. The requested context information can include, for example, prior violations by a violating user within a certain period of time, communications by or to the violating user within a certain period of time before and/or after the violation (e.g., including communications on any of the communications platforms 1176), the violating user's communication patterns (e.g., who the violating user communicates with most, the violating user's volume of communications, top topics discussed in communications, etc.), and/or the like. The requested context information can also include aggregated context information such as, for example, a number of violations of the cross-platform DLP platform across a given organization or enterprise, a number of violations within the violating user's department or organization unit, most frequently taken enforcement actions by other managers responsive to violations of the cross-platform DLP policy, and/or the like.

At block 1308, the policy abstraction module 1252 configures a reporting workflow for violations of the cross-platform DLP policy. The configuring can include, for example, defining one or more designated users who can view violations, receive alerts or reports of violations, and/or take enforcement actions responsive to violations. In some cases, the one or more designated users may be defined generally using, for example, directory services (e.g., Active Directory). For example, the one or more designated users could include each direct manager of a violating user. In other cases, the one or more designated users can be defined as specific users for each user that is to be covered by the policy (e.g., a manually designated user for each user or group users impacted by the cross-platform DLP policy). The configuration at the block 1308 can also include, for example, establishing one or more enforcement actions that can be taken by the one or more designated users. In various embodiments, an access profile for each of the designated users can be used to establish which enforcement actions each designated user is permitted to take.

At block 1310, the policy abstraction module 1252 stores the cross-platform DLP policy. The storage can include, for example, storage of the query package as linked to the cross-platform DLP policy. In various embodiments, the storage at the block 1310 can be in memory accessible to the policy abstraction module 1252, in the databases 232 of FIG. 2, and/or the like.

Figure 14:
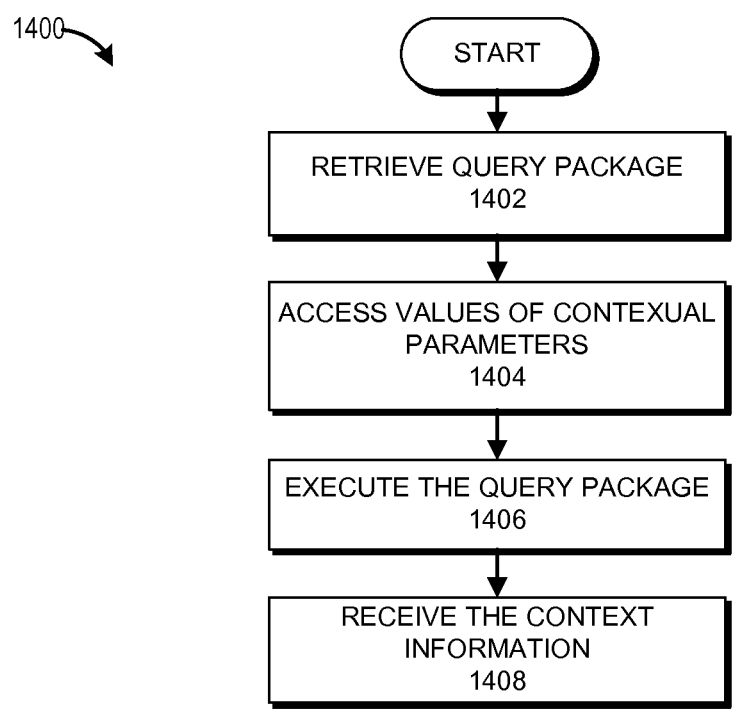
FIG. 14 illustrates an example of a process for dynamically acquiring context information.

FIG. 14 presents a flowchart of an example of a process 1400 for dynamically acquiring context information responsive to a detected violation of a cross-platform DLP policy. The detected violation may have been detected, for example, via the native DLP detector 1150, the custom DLP detector 1154, and/or the DLP risk profiler 1156. The process 1400 can be implemented by any system that can access data, evaluate data, and/or interact with users. For example, the process 1400, in whole or in part, can be implemented by one or more of the BIM system 130, the DLP detection engine 1148, the DLP management console 1160, and/or components thereof. Although any number of systems, in whole or in part, can implement the process 1400, to simplify discussion, the process 1400 will be described in relation to specific systems or subsystems of the networked computing environment 100 of FIG. 1 and/or the cross-platform DLP system 146. In various embodiments, the process 1400 can be performed as part of the block 1208 of FIG. 12.

At block 1402, the DLP context module 1158 retrieves a query package that is linked to the cross-platform DLP policy. In a typical embodiment, the query package may have been generated at the block 1306 of FIG. 13. At block 1404, the DLP context module 1158 accesses values of contextual parameters that are needed for the query package. The values can typically be obtained from information associated with the detected violation. The information associated with the detected violation is typically obtained by the native DLP detector 1150, the custom DLP detector 1154, and/or the DLP risk profiler 1156, as appropriate. At block 1406, the DLP context module 1158 executes the query package, for example, on the BIM system 130. At block 1408, the DLP context module 1158 receives the context information responsive to the execution of the query package.

Figure 15:
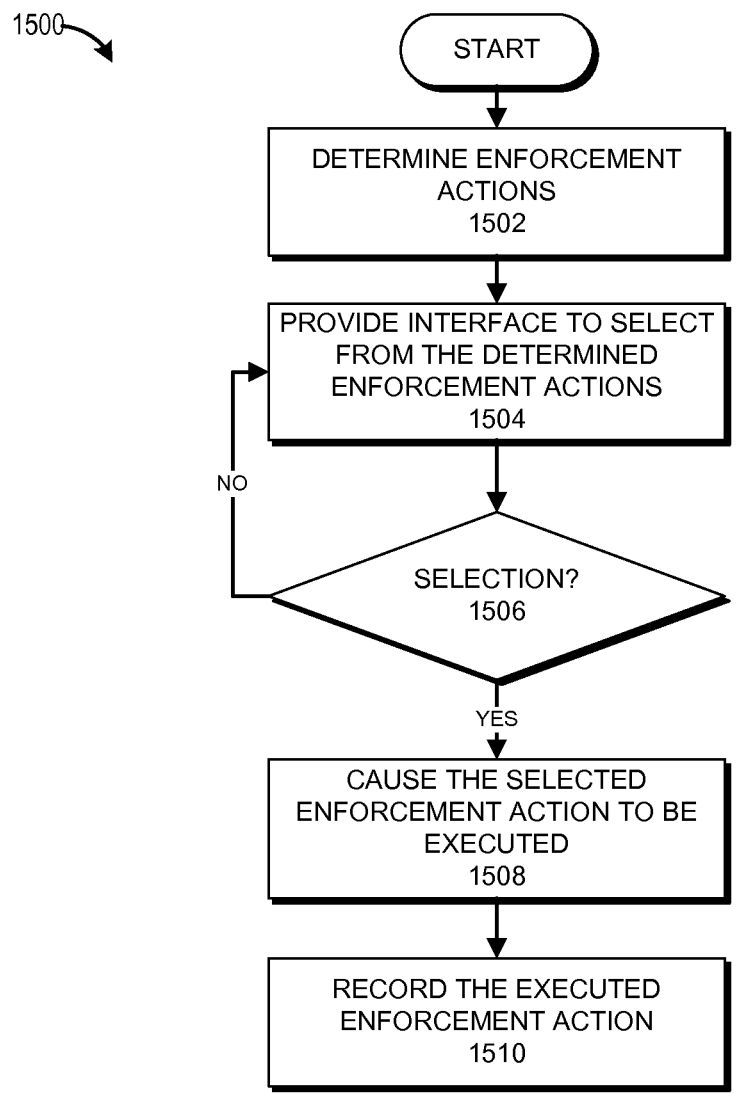
FIG. 15 illustrates an example of a process for publishing violation information.

FIG. 15 presents a flowchart of an example of a process 1500 for publishing violation information to one or more designated users responsive, for example, to a detected violation. The detected violation may have been detected, for example, via the native DLP detector 1150, the custom DLP detector 1154, and/or the DLP risk profiler 1156. The process 1500 can be implemented by any system that can access data, evaluate data, and/or interact with users. For example, the process 1500, in whole or in part, can be implemented by one or more of the BIM system 130, the DLP detection engine 1148, the DLP management console 1160, and/or components thereof. Although any number of systems, in whole or in part, can implement the process 1500, to simplify discussion, the process 1500 will be described in relation to specific systems or subsystems of the networked computing environment 100 of FIG. 1 and/or the cross-platform DLP system 146. In various embodiments, the process 1500 can be performed as part of the block 1210 of FIG. 12.

At block 1502, the user permission manager 1162 determines which enforcement actions that each designated user has permission to perform. In a typical embodiment, the determination can be made by ascertaining which enforcement actions of a set of potential enforcement actions are allowed by each designated user's access profile. At block 1504, the reporting module 1164 provides an interface for each designated user to select the determined enforcement actions. The interface can be, for example, a web interface, an interface on one of the communications platforms 1176, and/or the like. At decision block 1506, the reporting module 1164 determines whether a designated user has selected one of the determined enforcement actions. If not, the process 1500 returns to the block 1504 and proceeds as described above. If it is determined at the decision block 1506 that the designated user has selected one of the determined enforcement actions, the process 1500 proceeds to block 1508. In a typical embodiment, the selected enforcement action can be made with respect to one or more communications platforms of the communications platforms 1176. At block 1508, the credentials module 1170 causes the selected enforcement action to be executed with administrator privileges on each of the one or more communications platforms. At block 1510, the executed enforcement action is recorded, for example, in one or more of the databases 232. The block 1510 can include recording, for example, the executed enforcement, information associated with the detected violation, any context information, and/or the like.

Figure 16:
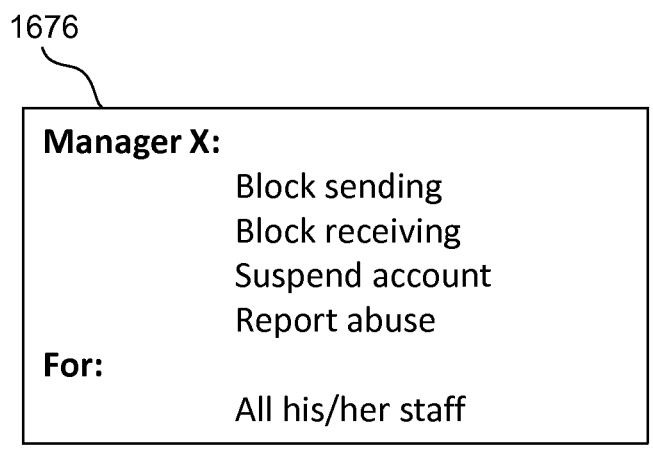
FIG. 16 illustrates an example of an access profile.

FIG. 16 illustrates an example of an access profile 1676. In the depicted embodiment, the access profile grants a "Manager X" a right to perform enforcement actions of "block sending," "block receiving," "suspend account," and "report abuse." As illustrated, the access profile 1676 grants the above-mentioned enforcement actions for "all his/her staff," which, in a typical embodiment, can be determined using, for example, directory services (e.g., Active Directory). In some cases, the access profile 1676 can include other enforcement actions such as, for example, "allow with warning." In these embodiments, any users impacted by the enforcement actions can be presented a warning that must be explicitly acknowledged and disregarded before the cross-platform DLP policy can be violated in the future.

IV. User Context Analysis and Context-Based DLP

In various embodiments, many of the principles described above can also be leveraged to generate intelligence regarding how user behavior on a remote computer system differs based, at least in part, on user context. In general, a user context is representative of one or more conditions under which one or more user-initiated events occur. A user-initiated event can be, for example, a user-initiated communication event on a communications platform. Examples of user-initiated communication events include a user creating, drafting, receiving, viewing, opening, editing, transmitting, or otherwise accessing or acting upon a communication. Communications can include, for example, emails, blogs, wikis, documents, presentations, social-media messages, and/or the like. User-initiated events can also include other user behaviors such as, for example, a user accessing or manipulating non-communication computer resources and artifacts thereof.

In various embodiments, user-initiated events can be originated via a user device in communication with a remote computer system or resource such as, for example, a communications platform. For a given user-initiated event, a corresponding user context can be defined by event-context information. The event-context information can include temporal data about the event such as, for example, information usable to identify a specific user or attributes thereof (i.e., user-identification information), information related to a physical location of a user device or attributes thereof (i.e., user-location information), information related to when a user-initiated event occurred (i.e., event-timing information), information usable to identify a user device or attributes thereof (i.e., user-device identification information), and/or the like.

In certain embodiments, a user-context-based analysis of user-initiated events can occur on demand responsive to requests from a user or system, automatically at certain scheduled times or intervals, etc. In particular, in some embodiments, a user-context-based analysis can be performed in real-time as information becomes available in order to facilitate dynamic implementation of DLP policies based, at least in part, on user context. In addition, in various embodiments, user devices can be enabled to configure the dynamic implementation based on user attestation of a risk or lack thereof. For illustrative purposes, examples will be described below relative to user-initiated communication events, often referred to herein simply as communication events. It should be appreciated, however, that the principles described can similarly be applied to other types of user-initiated events or user behaviors.

Figure 17:
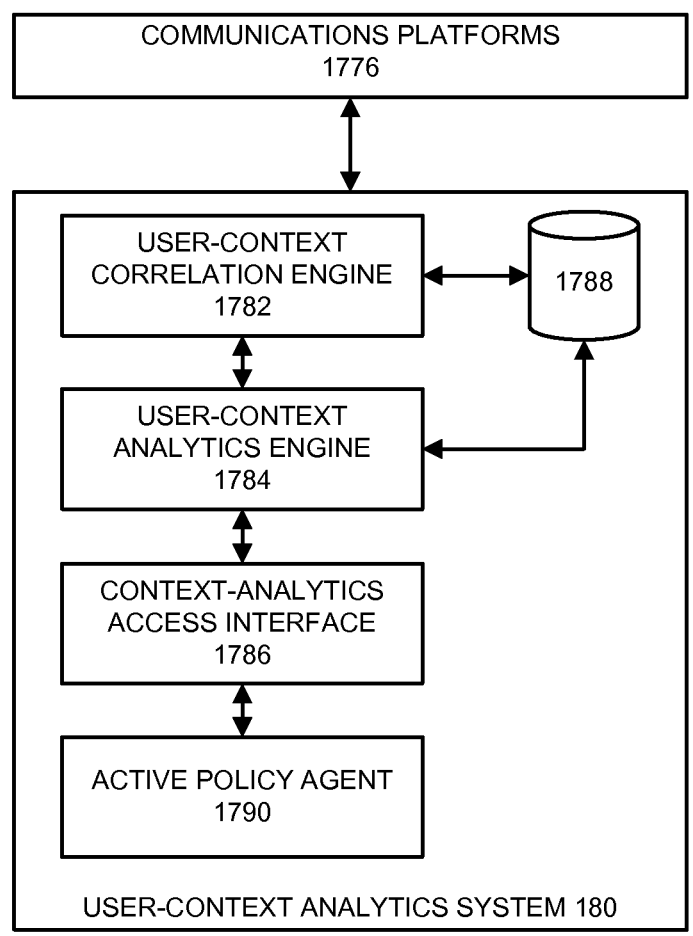
FIG. 17 illustrates an embodiment of a system for user-context-based analysis of communications.

FIG. 17 illustrates an embodiment of a system 1700 for user-context-based analysis of communications. The system 1700 includes communications platforms 1776, a BIM system 1830, a cross-platform DLP system 146, and the user-context analytics system 180. As shown, the communications platforms 1776, the BIM system 1830, the cross-platform DLP system 146, and the user-context analytics system 180 are operable to communicate over a network 1805.

The communications platforms 1776, the BIM system 1830, and the cross-platform DLP system 146 can operate as described above with respect to the BIM system 130, the cross-platform DLP system 146, and the communications platforms 1176, respectively. In a typical embodiment, the network 1805 can be representative of a plurality of networks such as, for example, the intranet 104 and the network 106 described above. In certain embodiments, the communications platforms 1776, the BIM system 1830, and the user-context analytics system 180 can collaborate to generate intelligence related to how user behavior differs based, at least in part, on user context.

More particularly, the communications platforms 1776 may be considered specific examples of one or more of the internal data sources 120 and/or one or more of the external data sources 122 described above. In that way, in certain embodiments, the BIM system 1830 is operable to collect and/or generate, inter alia, information related to communications on the communications platforms 1776. It should be appreciated that, in many cases, such communications may be the result of communication events such as, for example, a user creating, drafting, receiving, viewing, opening, editing, transmitting, or otherwise accessing or acting upon the communications. For simplicity of description, information collected or generated by the BIM system 1830 with respect to the communications platforms 1776 may be referred to herein as event-assessment data.

For example, the event-assessment data can include information related to a classification assigned to particular communications. As described above, communications can be assigned classifications, for example, by components such as the a priori classification engine 226, the a posteriori classification engine 228, and the heuristics engine 230. In an example, the event-assessment data can include content-based classifications such as classifications indicative of a particular topic or classifications based on whether a communication is conversational, formal, personal, work-related, sales-related, etc. By way of further example, the event-assessment data can include participant-based classifications that are based on, for example, an email address or domain of a communication participant, whether the communication includes customers as participants, whether the communication includes internal participants, roles of the communication participants, etc. Additional examples of content-based and participant-based classifications are described in the '162 application. As still further examples, the event-assessment data can include classifications based on a type of communication (e.g., email, instant message, voicemail, etc.), length of communication, and/or the like. Numerous other examples of event-assessment data will be apparent to one skilled in the art after reviewing the present disclosure.

The user-context analytics system 180 can include a user-context correlation engine 1782, a user-context analytics engine 1784, a context-analytics access interface 1786, an active policy agent 1790, and a data store 1788. In certain embodiments, the user-context correlation engine 1782 is operable to determine event-context information for certain user-initiated communication events. In some cases, determining the event-context information can involve requesting and receiving, from the communications platforms 1776, user-log data. The user-log data can include, for example, stored information related to each user session, such as, for example, an IP address, a user's client application (e.g., a user's choice of web browser), network or security settings of the user's device, other characteristics of the user's device (e.g., manufacturer, model, operating system, etc.), combinations of the same, and/or the like. In a typical embodiment, the user-context analytics system 180 can also correlate the event-context information to one or more user contexts. In various embodiments, event-context information and/or correlated event-context information can be stored in the data store 1788. Example operation of the user-context analytics system 180 will be described in greater detail with respect to FIGS. 19-21.

In a typical embodiment, the user-context analytics engine 1784 uses correlated event-context information as described above to associate user-communication pattern(s) with user contexts. Each user-communication pattern typically characterizes activity that takes place for a given user context. In an example, consider a particular user context that aggregates all of a particular user's communication events that originate from a public location. The public location may be indicative, for example, of the user using publicly available network access offered by a place of business (e.g., restaurant, hotel, etc.), governmental unit, and/or the like. According to this example, a user-communication pattern could indicate:

(1) A level of personal activity. In an example, personal activity can be measured based, at least in part, on a number of communication events involving personal messages as described above. A given communication pattern could indicate a number, percentage, statistical evaluation, or other analysis of the number or distribution of personal messages.

(2) Types of communication participants. In an example, a given communication pattern could indicate communication events involving particular communication-participant types such as: customer participants, internal participants, participants in certain business units (e.g., executive management, legal, etc.), participants having certain roles as indicated by directory services, and/or the like. A communication-participant type can also aggregate groups of communication participants. For example, a "strategic" group could aggregate communication participants in executive management and research and development. For each communication-participant type, a given communication pattern could indicate a number, percentage, statistical evaluation, or other analysis of a number or distribution of communications involving the communication-participant type.

(3) Content classifications. In an example, a given communication pattern could indicate communication events involving communications that involve certain topics (e.g., sales). In another example, a given communication pattern could indicate communication events involving communications that are deemed conversational, formal, work-related, etc. For each content classification, a given communication pattern could indicate a number, percentage, statistical evaluation, or other analysis of a number of communications involving the content classification.

(4) Communication type. In an example, a given communication pattern could indicate communication events by communication type such as, for example, email, instant message, document, voicemail, etc. For each communication type, a given communication pattern could indicate a number, percentage, statistical evaluation, or other analysis of a number of communications involving the communication type.

It should be appreciated that the foregoing examples are merely illustrative of information that can at least partially form the basis for a communication pattern. Numerous other examples will be apparent to one skilled in the art after reviewing the present disclosure.

In certain embodiments, the user-context analytics engine 1784 can generate a communication profile based, at least in part, on a communication pattern(s) for one or more user contexts. In certain embodiments, the communication profile can include comparative communication-pattern information related to a plurality of user contexts. For example, one user context could be defined by communication events originating from a public location and a another user context could be defined by communication events originating from all other locations.

In certain embodiments, the comparative communication-pattern information can include information summarizing or otherwise indicative of communication patterns associated with each user context. In some cases, the communication profile can include a report (e.g., a chart or graph) that facilitates a side-by-side comparison of the plurality of user contexts. In various embodiments, the communication profile can further indicate differences among the plurality of user contexts. For example, the communication profile could indicate differences in degree, number, and/or the like for each of personal activity, types of communication participants, content classifications, and communication types as described above. In various embodiments, differences can be indicated by sorting and ranking according to one or more representative metrics, providing an evaluation of one or more representative metrics (e.g., indicating which is highest or lowest), etc. In general, the representative metric can relate to any number, percentage, statistical evaluation, or other analysis generated as part of a given communication pattern as described above.

The context-analytics access interface 1786 is operable to interact with users of a client information handling system over a network such as, for example, an intranet, the Internet, etc. In a typical embodiment, the context-analytics access interface 1786 receives and services communication-analytics requests from users. The context-analytics access interface 1786 typically serves the communication-analytics requests via interaction with the user-context analytics engine 1784. In certain embodiments, the context-analytics access interface 1786 can trigger the operation of the user-context correlation engine 1782 and the user-context analytics engine 1784 described above. Further examples of operation of the context-analytics access interface 1786 will be described in greater detail with respect to FIGS. 19-21.

The active policy agent 1790 is typically operable to facilitate real-time user-context analysis and DLP implementation. In a typical embodiment, the active policy agent 1790 can determine a user context for each user session with one of the communications platforms 1776. Based, at least in part, on the user context, the active policy agent 1790 can select a dynamic DLP policy. In certain embodiments, the dynamic DLP policy can include a cross-platform DLP policy, which policy can be implemented by the cross-platform DLP system 146 as described above.

In addition to optionally including a cross-platform DLP policy, the dynamic DLP policy can specify one or more communication events of interest. In general, each user session is established between a user device and one or more of the communications platforms 1776. The active policy agent 1790 can monitor communication events originated by each such user device for the communication events of interest. For example, the communication events of interest may include a user creating, drafting, receiving, viewing, opening, editing, transmitting, or otherwise accessing or acting upon a communication in a specified manner.

If a communication underlying a particular communication event of interest meets risk-assessment criteria specified by the dynamic DLP policy, certain action can be taken. The risk-assessment criteria may target, for example, communications that involve particular types of communication participants, that have particular content classifications, that are of particular communication types, and/or the like. The actions that can be taken may include publishing a warning to the user, alerting an administrator or other designated user, preventing further actions by the user, forcing user log off, etc. In addition, in various embodiments, risk assessments of communication events of interest can be published to a real-time risk-evaluation dashboard that is visible to the user.

In a particular example, the communication events of interest can include pre-transmission communication events. Pre-transmission communication events can include the user drafting or editing a communication that has not been sent. In various embodiments, draft communications are maintained in a designated folder or other location that is resident on or otherwise accessible to at least one of the communications platforms 1776. In various embodiments, the draft communications can be accessed and classified in similar fashion to any other communication. Responsive to certain risk-assessment criteria being met as described above, transmission of such draft communications can be prevented. Further examples of operation of the active policy agent 1790 will be described below.

Figure 18:
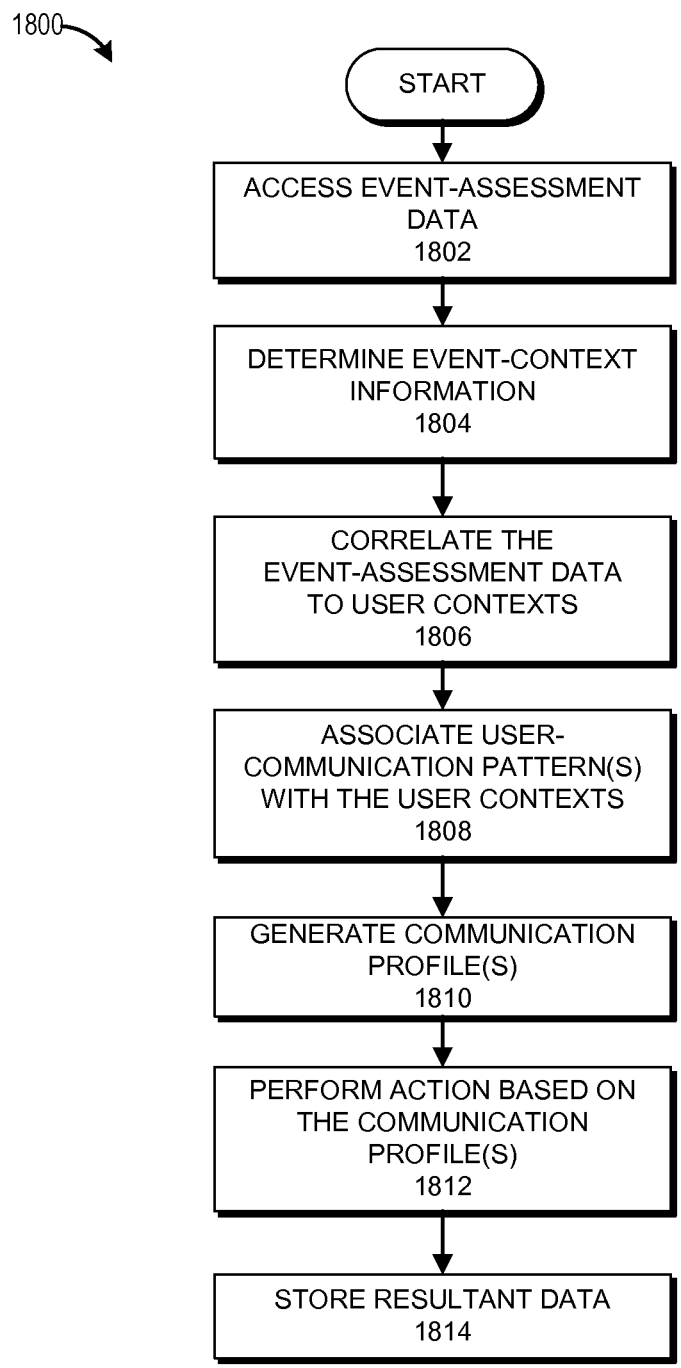
FIG. 18 presents a flowchart of an example of a process for performing user-context-based analysis of communication events.

FIG. 18 presents a flowchart of an example of a process 1800 for performing user-context-based analysis of communication events. The process 1800 can be implemented by any system that can access data, evaluate data, and/or interact with users. For example, the process 1800, in whole or in part, can be implemented by one or more of the BIM system 1830, the communications platforms 1776, the cross-platform DLP system 146, the user-context analytics system 180, the user-context correlation engine 1782, the user-context analytics engine 1784, the context-analytics access interface 1786, the data store 1788, and/or the active policy agent 1790. The process 1800 can also be performed generally by the system 1700. Although any number of systems, in whole or in part, can implement the process 1800, to simplify discussion, the process 1800 will be described in relation to specific systems or subsystems of the system 1700 and/or the user-context analytics system 180. In various embodiments, the process 1800 can be initiated via a communication-analytics request received via the context-analytics access interface 1786. Such a request can be received from a user device, a computer system, or another entity.

At block 1802, the user-context correlation engine 1782 accesses event-assessment data for a plurality of communication events. In some cases, the plurality of user-initiated communication events can include all communication events of a given user (or set of users) over a certain period of time (e.g., a preceding one year, six months, etc.). It should be appreciated that the plurality of communication events may relate to different ones of the communications platforms 1776. In that way, the plurality of user-initiated communication events may be considered cross-platform communication events. In various embodiments, the plurality of user-initiated communication events, or criteria for identifying the plurality of user-initiated communication events, can be specified in a communication-analytics request.

At block 1804, the user-context correlation engine 1782 determines event-context information for each of the plurality of communication events. The event-context information can include, for example, user-identification information, user-location information, event-timing information, user-device identification information, anomalous-event information, and/or the like as described above.

In general, the user-identification information can be any information usable to identify a user or some attribute of a user who is associated with a given communication event. User-identification information can include, for example, a user name, employee identifier, or other data. In many cases, the user-identification information may be determined from the event-assessment data. In other cases, additional user-identification information may be retrieved from another system such as, for example, one or more of the communications platforms 1776. For example, in some embodiments, if a user identifier is known, the user identifier can be used to retrieve, from one or more of the communications platforms 1776, information about a corresponding user's role or responsibilities in an organization (e.g., using directory services).

In general, the user-location information can be any information related to a physical location of the user device, or attributes thereof, at a time that a given communication event occurs. The given communication event is typically originated on one of the communications platforms 1776 via a user device under control of a user. The user-location information can include multiple levels of descriptive information.

In certain embodiments, at least a portion of the user-location information can be determined by resolving an IP address associated with the user to a physical location. The IP address can be accessed, for example, from the event-assessment data and/or retrieved from a particular one of the communications platforms 1776 on which the given communication event occurred. In some cases, the IP address can be obtained from user-log data as described above. In an example, the IP address can be resolved to a city, state, province, country, etc. In addition, in various embodiments, it can be determined directly from the IP address via what network provider the user device is accessing one or more of the communications platforms 1776, whether the user device is inside or outside of a particular enterprise network, whether the user device is inside or outside of a particular city, state, province, country, etc.

In addition, or alternatively, the IP address may be looked up in an IP address registry to determine at least a portion of the user-location information. The IP address registry can associate certain network-location attributes (e.g., network addresses and network-address ranges) with a particular user's home, a public place of business (e.g., network access at a coffee shop, mall, airport, etc.), and/or the like. In embodiments that utilize the IP address registry, the user-context correlation engine 1782 can determine, as part of the event-context information, whether the user device was in a public location (e.g., coffee shop, mall, or airport), at the user's home, etc. at the time of the given communication event. In some embodiments, the IP address registry may be stored in the data store 1788 or in memory. In these embodiments, users or administrators may register the network-location attributes. In other embodiments, all or part of the IP address registry can be provided by a third-party service provider.

In general, the user-device identification information can include information descriptive of the user device, hardware or software of the user device, and/or attributes thereof. For example, the user-device identification information can include information related to a client application on the user device that is used to access one or more of the communications platforms (e.g., a user's choice of web browser), network or security settings of the user device or an application executing thereon, other characteristics of the user device (e.g., manufacturer, model, operating system, etc.), and/or the like. In many cases, some or all of the user-device identification information can be accessed from the event-assessment data. In other cases, at least a portion of the user-device identification information can be retrieved from one or more of the communications platforms 1776 (e.g., via user-log data as described above).

The event-timing information can include, for each communication event, information descriptive of when the communication event occurred. For example, the event-timing information can include time classifications such as, for example, whether the communication event occurred in the morning, in the evening, on the weekend and/or the like as measured by a corresponding user's local time. The event-timing information can also indicate whether the communication event occurred during or outside of the user's working hours. In various embodiments, the event-timing information can be determined from a timestamp for the communication event. The timestamp can be obtained, for example, from the event-assessment data or retrieved from another system such as one of the communications platforms 1776.

The anomalous-event information can indicate, for each communication event, whether the communication event is deemed anomalous. In a typical embodiment, the communication event may be considered anomalous if it is determined to be of questionable authenticity. For example, the communication event may be considered anomalous if another communication event occurred within a certain period of time (e.g., 30 minutes) of that communication event and is deemed to involve a same user (e.g., using the same user credentials), on a different user device, in a sufficiently distant physical location (e.g., two-hundred kilometers away as determined via IP address). In various embodiments, what constitutes a sufficiently distant physical location can be varied according to a period of time separating two communication events (e.g., allowing for a distance of no greater than one kilometer per minute elapsed). In various embodiments, the anomalous-event information can be determined from other event-context information. For example, the user-context correlation engine 1782 can aggregately analyze a location and timing of all of the plurality of communication events. Based, at least in part, on the analysis, the user-context correlation engine 1782 can identify anomalous communication events as described above.

At block 1806, the user-context correlation engine 1782 correlates the event-assessment data to one or more user contexts. In some cases, the one or more user contexts can be specified in a communication-analytics request as described above. In a typical embodiment, each user context is defined by a distinct subset of the event-context information. In a typical embodiment, the user-context correlation engine 1782 correlates the event-assessment data to user contexts on an event-by-event basis. That is, the event-assessment data for a given communication event is correlated to a given user context if the communication satisfies each constraint of the user context. For example, if a particular user context is directed to communication events occurring during non-working hours and at public locations, the event-assessment data for a particular communication event would be correlated to the particular user context only if the particular communication event is deemed to have occurred during non-working hours (relative to the local time of a corresponding user) and in a public location.

Each user context can include any combination of event-context information described above. For example, user-context constraints can be defined in terms of user-identification information, event-timing information, user-device identification information, user-location information, anomalous-event information, and/or other information. In the case of event-timing information, a given user context may specify one or more recurring periods of time such as, for example, time periods deemed working hours, non-working hours, etc. In addition, in some embodiments, each user context may specify a static non-overlapping period of time for a particular user (e.g., 2010-2012 for a first user context and 2013-present for a second user context). In these embodiments, the non-overlapping periods of time can enable measurement of communication-pattern evolution of users over time.

In some cases, each user context can be mutually exclusive of each other user context. In an example, one user context could be directed to communication events deemed to occur in a public location while another user context could be directed to communication events deemed to occur in all other locations. In another example, one user context could be directed to communication events deemed to occur during working hours while another user context could be directed to communication events deemed to occur during non-working hours. It should be appreciated, however, that each user context need not be mutually exclusive other user contexts. For example, one user context could be directed to communication events occurring during non-working hours, another user context could be directed to communication events occurring during working hours, and yet another user context could be directed to communication events originating from a user's home.

At block 1808, the user-context correlation engine 1782 associates one or more communication patterns with each of the one or more user contexts. In general, each communication pattern can include any of the communication-pattern information described above with respect to FIG. 17. At block 1810, the user-context correlation engine 1782 generates a communication profile for at least one user. In various embodiments, the block 1810 can include generating a communication profile for each user responsible for one of the plurality of user-initiated communication events. In general, each communication profile can include any of the information (e.g., comparative communication-pattern information) described above with respect to FIG. 17.

At block 1812, the user-context correlation engine 1782 performs actions based on the one or more communication profiles. In some embodiments, the block 1812 can include publishing the one or more communication profiles (e.g., in the form of reports) to an administrator or other designated user. In additional embodiments, the block 1812 can include performing an automated risk evaluation of comparative communication-pattern information contained in the one or more communication profiles. In various embodiments, the automated risk evaluation may use risk-assessment criteria to target certain communication profiles deemed dangerous. In various cases, the risk-assessment criteria can be maintained in the data store 1788 or in memory.

For example, the risk-assessment criteria may target communication events that involve communications to customers and are originated from a public location. The risk-assessment criteria can specify, for example, a threshold number of communication events. Responsive to the comparative communication-pattern information for a particular communication profile meeting the risk-assessment criteria, an alert can be transmitted to a designated user. Other examples of risk-assessment criteria and of automated risk evaluation will be apparent to one skilled in the art after reviewing the present disclosure.

At block 1814, resultant data is stored in the data store 1788 or in memory. The resultant data can include, for example, the accessed event-assessment data, the determined event-context information, the correlated event-assessment data, information related to user-communication patterns, the one or more communication profiles, and/or other data.

Figure 19:
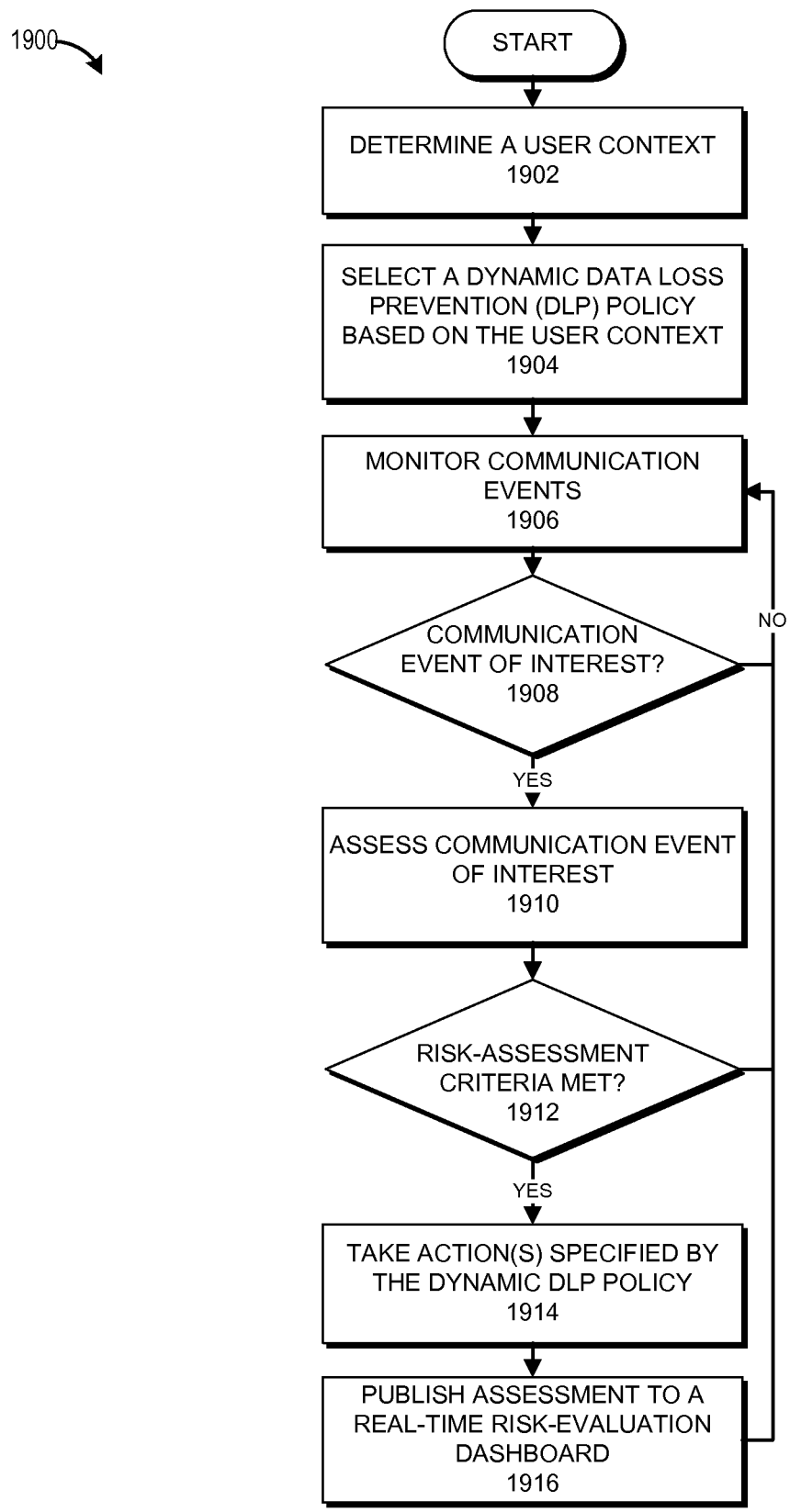
FIG. 19 presents a flowchart of an example of a process for performing dynamic DLP via a real-time user-context-based analysis.

FIG. 19 presents a flowchart of an example of a process 1900 for performing dynamic DLP via a real-time user-context-based analysis. The process 1900 can be implemented by any system that can access data, evaluate data, and/or interact with users. For example, the process 1900, in whole or in part, can be implemented by one or more of the BIM system 1830, the communications platforms 1776, the cross-platform DLP system 146, the user-context analytics system 180, the user-context correlation engine 1782, the user-context analytics engine 1784, the context-analytics access interface 1786, the data store 1788, and/or the active policy agent 1790. The process 1900 can also be performed generally by the system 1700. Although any number of systems, in whole or in part, can implement the process 1900, to simplify discussion, the process 1900 will be described in relation to specific systems or subsystems of the system 1700 and/or the user-context analytics system 180.

At block 1902, the active policy agent 1790 determines a current user context of at least one user device currently accessing one of the communications platforms 1776. In general, the current user context can include any combination of information described above relative to event-context information.

At block 1904, the active policy agent 1790 selects a dynamic DLP policy based on the user context. In a typical embodiment, the dynamic DLP policy may include a cross-platform DLP policy that is implemented as described above. In addition, the dynamic DLP policy may include DLP risk-assessment criteria. In certain embodiments, the DLP risk-assessment criteria are used to assess a riskiness of communication events. If, for example, the user context indicates that the at least one user device is currently inside a given corporate firewall, the DLP risk-assessment criteria may be relaxed or nonexistent. Conversely, if, for example, the user context indicates that the at least one user device is in a public location, the DLP risk-assessment criteria may be more stringent.

More particularly, in a typical embodiment, the DLP risk-assessment criteria specifies one or more rules for determining whether a given communication event is deemed risky. In certain embodiments, the risk-assessment criteria can be based, at least in part, on content-based classifications of communications associated with communications event of interest. For example, in certain embodiments, communications related to a topic of sales may be deemed risky if the user context indicates that the at least one user device is in a public location. According to this example, communications related to the topic of sales could be specified as risky in the risk-assessment criteria. In contrast, communications related to the topic of sales may not be deemed risky if, for example, the at least one user device is determined to be at a corresponding user's home. According to this alternative example, the risk-assessment criteria may not specifically identify the topic of sales. The risk-assessment criteria can also specify other criteria such as, for example, particular communication-participant types. Other examples will be apparent to one skilled in the art after reviewing the present disclosure.

At block 1906, the active policy agent 1790 monitors communication events originated by the at least one user device. Advantageously, in certain embodiments, the block 1906 can include monitoring pre-transmission communication events as described above relative to FIG. 17. At decision block 1908, the active policy agent 1790 determines whether a communication event of interest has occurred. If not, the process 1900 returns to block 1906 and proceeds as described above. Otherwise, if it is determined at the decision block 1908 that a communication event of interest has occurred, the process 1900 proceeds to block 1910.

At block 1910, the active policy agent 1790 evaluates the communication event of interest according to the DLP risk-assessment criteria. At decision block 1912, the active policy agent 1790 determines whether the DLP risk-assessment criteria is met. If not, the process 1900 returns to block 1906 and proceeds as described above. Otherwise, if the active policy agent 1790 determines at the decision block 1912 that the DLP risk-assessment criteria is met, the process 1900 proceeds to block 1914. At block 1914, the active policy agent 1790 takes action specified by the dynamic DLP policy. For example, in the case of pre-transmission communication events, the active policy agent 1790 may prevent transmission of a communication in the fashion described above. By way of further example, the action taken can also include publishing a warning to the user, alerting an administrator or other designated user, preventing further actions by the user, forcing user log off, etc.

At block 1916, the active policy agent 1790 publishes a risk assessment to a real-time risk-evaluation dashboard on the at least one user device. In various embodiments, the risk assessment can indicate whether the communication event of interest is deemed risky, not risky, etc. In some cases, the risk assessment can be a scaled metric indicating a degree to which the communication event of interest is deemed risky. In various embodiments, the block 1916 can be omitted such that no risk assessment is published. From block 1916, the process 1900 returns to block 1906 and proceeds as described above. The process 1900 can continue indefinitely (e.g., until terminated by rule or by an administrator or other user).

Figure 20:
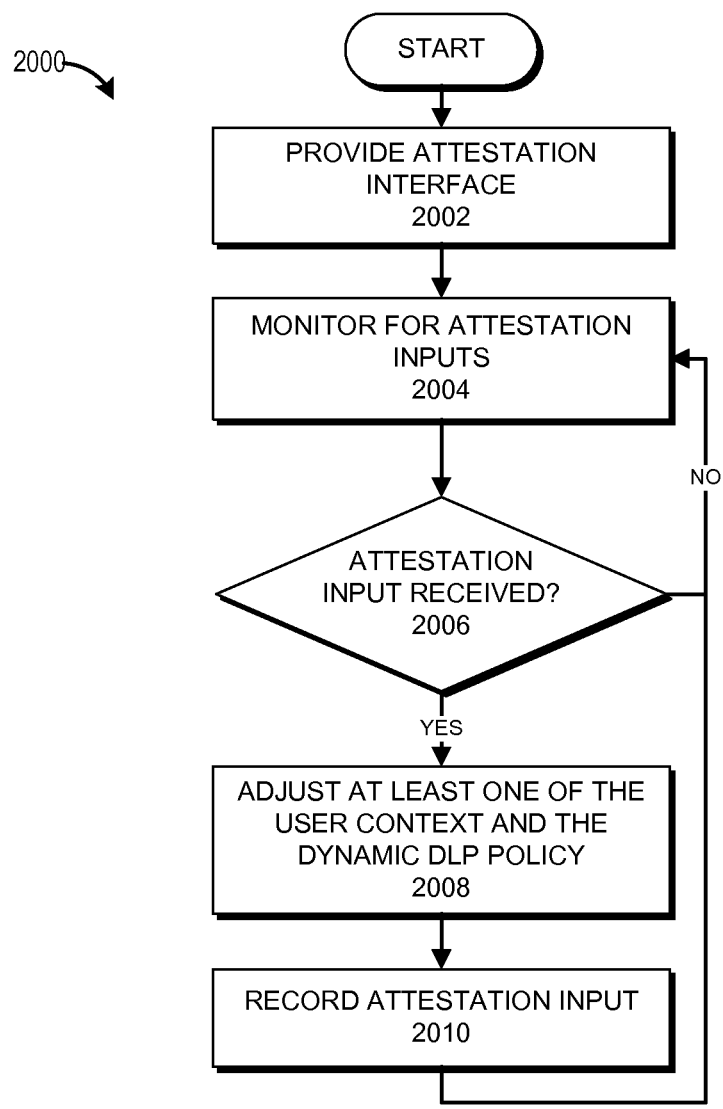
FIG. 20 presents a flowchart of an example of a process for configuring a dynamic DLP policy and/or a user context responsive to user input.

FIG. 20 presents a flowchart of an example of a process 2000 for configuring a dynamic DLP policy and/or a user context responsive to user input. The process 2000 can be implemented by any system that can access data, evaluate data, and/or interact with users. For example, the process 2000, in whole or in part, can be implemented by one or more of the BIM system 1830, the communications platforms 1776, the cross-platform DLP system 146, the user-context analytics system 180, the user-context correlation engine 1782, the user-context analytics engine 1784, the context-analytics access interface 1786, the data store 1788, and/or the active policy agent 1790. The process 2000 can also be performed generally by the system 1700. Although any number of systems, in whole or in part, can implement the process 2000, to simplify discussion, the process 2000 will be described in relation to specific systems or subsystems of the system 1700 and/or the user-context analytics system 180.

At block 2002, the active policy agent 1790 provides an attestation interface to at least one user device. In a typical embodiment, the attestation interface may be provided on, or be accessible from, a real-time risk-evaluation dashboard as described with respect to FIG. 17 and with respect to block 1916 of FIG. 19. In general, the real-time risk-evaluation dashboard may indicate a determined user context of the at least one user. In addition, as described above, the real-time risk-evaluation dashboard may indicate risk assessments provided by the active policy agent 1790. In many cases, as described above relative to FIG. 19, the active policy agent 1790 may have already taken action based on the risk assessments and the determined user context.

In certain embodiments, the attestation interface can allow the user to provide attestation input that modifies how the active policy agent 1790 reacts to communication events of interest. In an example, an attestation input can allow the user to indicate that the determined user context is incorrect in determining the at least one user device to be in a public location. In another example, an attestation input can allow the user to indicate that a determined assessment of "risky" or "not risky" for a communication event of interest is incorrect.

At block 2004, the active policy agent 1790 monitors for attestation inputs. At decision block 2006, the active policy agent 1790 determines whether an attestation input has been received from the at least one user device. If not, the process 2000 returns to block 2004 and proceeds as described above. Otherwise, if it is determined at the decision block 2006 that an attestation input has been received, the process 2000 proceeds to block 2008.

At block 2008, the active policy agent 1790 adjusts at least one of the user context and the dynamic DLP policy responsive to the attestation input. In typical embodiment, the attestation input serves as a user certification, for example, that the determined user context is incorrect or that a communication event of interest has been inaccurately assessed as risky. For example, if the at least one user device is at the user's home and not in public location as suggested by the determined user context, the attestation input may so indicate and the active policy agent 1790 can modify the user context accordingly. By way of further example, if the attestation input indicates that a specific communication event of interest is incorrectly assessed as "risky," the active policy agent 1790 can modify the dynamic DLP policy to allow the communication event of interest (e.g., by adjusting a trigger threshold). In some cases, allowing the communication event of interest can involve performing an action that was previously prevented (e.g., transmitting a communication).

At block 2010, the active policy agent 1790 records the user attestation input in the data store 1788 or in memory. In various embodiments, the recordation can facilitate auditing of user attestations by administrators or other users. In some cases, all user attestations may be provided immediately to an administrator or designated user as an alert. In other cases, all user attestations can be provided in periodic reports and/or in an on-demand fashion. From block 2010, the process 2000 returns to block 2004 and proceeds as described above. The process 2000 can continue indefinitely (e.g., until terminated by rule or by an administrator or other user).

V. Example Operation of a Subject-Matter-Affiliation System

Figure 21:
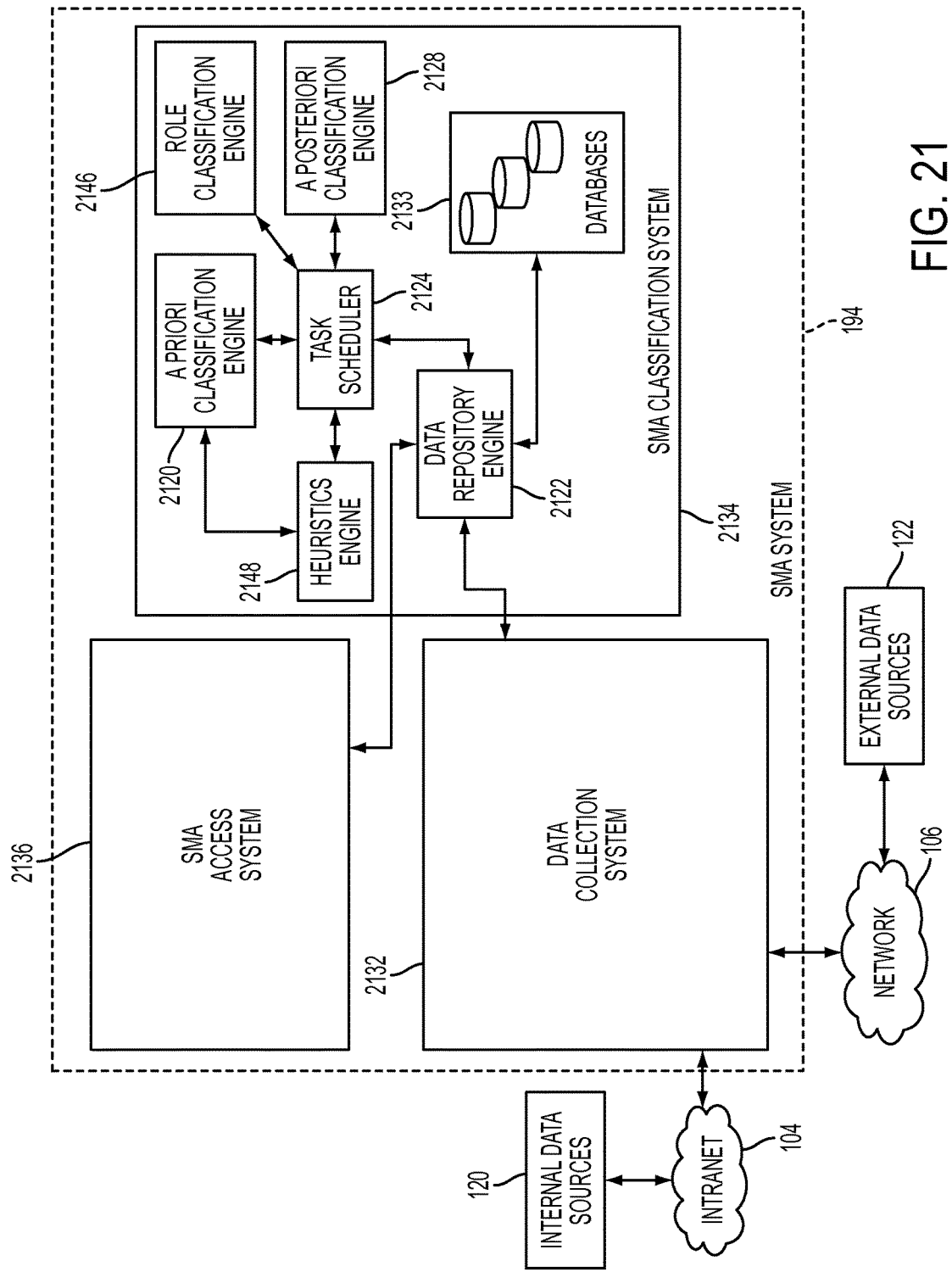
FIG. 21 illustrates an embodiment of an implementation of a subject-matter-affiliation system.

FIG. 21 illustrates an example of the SMA system 194. In a typical embodiment, the SMA system 194 can include functionality and components described with respect to the BIM system 130 of FIGS. 1 and 2. More particularly, however, the SMA system 194 is configured to identify user affiliations with particular topics. The SMA system 194 can include a SMA access system 2136, a data collection system 2132, and a SMA classification system 2134.

The data collection system 2132 can have any of the functionality described with respect to the data collection system 132 of FIGS. 1-2. In some implementations, the data collection system 2132 can in fact be the data collection system 132 of the BIM system 130, such that the data collection system 2132 is only logically included in the SMA system 194. As previously described, the data collection system 2132 can be configured to, among other things, collect data from internal data sources 120 and/or external data sources 122. The data collected by the data collection system 2132 can include communications such as, for example, email messages, social-media messages, comments, blog posts, presentations, documents, and/or other data.

The data collected by the data collection system 2132 can also include, for example, a set of users. The set of users typically includes individuals who are accessible to the SMA system 194 for potential SMA determinations. For example, in some embodiments, the set of users can include all employees of the organization. In these embodiments, the set of users can be acquired, for example, from the internal data sources 120 (e.g., the organization's human-resources system, directory services such as Active Directory, etc.). Additionally, or alternatively, in certain embodiments, the set of users can also be individuals who are participants with respect to the communications described above (e.g., sender, recipient, author, etc.).

The data collected by the data collection system 2132 can also include, for example, a global set of topics. In a typical embodiment, the global set of topics can be considered a taxonomy that is usable to classify subjects (i.e. topics) of interest. In some embodiments, each topic can be characterized by one or more words or phrases. For example, in certain embodiments, the set of topics can take on a list structure such that each topic in the list includes the one or more words or phrases that characterize the topic. In certain other embodiments, the set of topics can be represented using a more complex structure such as, for example, a tree or hierarchy. In these embodiments, narrower topics can be represented as child nodes of parent nodes that are representative of broader topics. In some embodiments, the set of topics can be compiled by ingesting organizational content such as, for example, a web site, white papers, document or content management systems, etc. The set of topics can also be compiled from pre-existing industry taxonomies (e.g., healthcare, oil-and-gas, and finance industries). The set of topics can also be compiled manually, for example, by domain experts, administrators, or developers.

After the data collection system 2132 has collected and, in some cases, processed the data, the data may be provided to the SMA classification system 2134 for further processing and storage. The SMA classification system 2134 can include a data repository engine 2122, a task scheduler 2124, an a priori classification engine 2126, an a posteriori classification engine 2128, a heuristics engine 2148, a role classification engine 2146, and a set of databases 2133. In general, the data repository engine 2122 and the set of databases 2133 can operate as described with respect to the data repository engine 222 and the set of databases 232, respectively, of FIG. 2.

In a typical embodiment, the set of topics, the set of users, and the communications can be supplied as SMA inputs to the task scheduler 2124. The task scheduler 2124 can supply the SMA inputs to the a priori classification engine 2126. In a typical embodiment, the a priori classification engine 2126 includes configurations and functionality described with respect to the a priori classification engine 226 of FIG. 2 along with additional configurations and functionality that are specific to the SMA system 194. For example, for each user in the set of users, the a priori classification engine 2126 can compute one or more topical metrics. For a given topic and user, each topical metric is typically a measurement of the user's affiliation with the topic. In a typical embodiment, the determination of the topical metric is based, at least in part, on the content of the communications in which the user has participated. Example operation of the a priori classification engine 2126 will be described with respect to FIG. 22.

In addition to the a priori classification engine 2126, the task scheduler 2124 can provide the SMA inputs, along with additional data generated by the a priori classification engine 2126, to the a posteriori classification engine 2128. In a typical embodiment, the a posteriori classification engine 2128 includes configurations and functionality described with respect to the a posteriori classification engine 228 of FIG. 2 along with additional configurations and functionality that are specific to the SMA system 194. For example, the a posteriori classification engine 2128 can analyze and examine timing and data attributes of the communications to determine, for example, each user's scope of affiliation and an affiliation timeline. Example operation of the a posteriori classification engine 2128 will be described with respect to FIG. 22.

In certain embodiments, the a posteriori classification engine 2128 can also be used to identify redundancies within the set of users. For example, separate users may be detected based on the individual's inclusion in the organization's human-resources system, the individual's social-networking account (e.g., Twitter), multiple email addresses for the individual, etc. In a typical embodiment, users that refer to a same individual can be identified and merged based on probabilistic analyses of similarity indicators such as, for example, overlapping names, conversations relating to overlapping topics from the set of topics, conversations involving an overlapping set of participants, communications originating from a same IP address range, and/or other similar data and metadata.

In a typical embodiment, multiple similarity indicators can be combined to create one or more Boolean rules regarding whether to merge identities of users. For example, if two users have overlapping names (e.g., within an edit-distance threshold) and the two users' conversation topics sufficiently overlap (e.g., one user's topics seventy-five percent overlaps the other user's set of topics), the identities of the two users could be merged. Merging typically involves combining, for example, identification information, contact information, any applicable topical, affiliation-scope, and timeline metrics, etc. In addition, merging typically results in communications, conversations, and other collected data for the merged users being associated with a single identity.

In various embodiments, merging users as described above can result in a given individual (i.e. user) being recognized as having an affiliation with topics that might otherwise be undiscoverable. For example, if the given user has a social-networking account associated with a non-work persona, it may be discovered, after merging, that the given user has a subject-matter affiliation with real estate, particular sports (e.g., lacrosse, rugby, softball), particular places (e.g., Taiwan, Argentina, Morocco), particular television shows or movies (e.g., Star Wars), video gaming, and/or the like. Such affiliation identification could be useful, for example, when a project requires non-traditional expertise, when determining who to invite to a dinner with an investor who is a rugby enthusiast, etc.

In certain embodiments, the a priori classification engine 2126 and/or the a posteriori classification engine 2128 can use the heuristics engine 2148 to facilitate operation thereof. In a typical embodiment, the heuristics engine 2148 includes configurations and functionality described with respect to the heuristics engine 230 of FIG. 2 along with additional configurations and functionality that are specific to the SMA system 194.

In a typical embodiment, the role classification engine 2146 receives, optionally via the task scheduler 2124, outputs of the a priori classification engine 2126 and the a posteriori classification engine 2128. The role classification engine 2146 is typically operable to generate multidimensional SMA data for each topic and user. The multidimensional SMA data can include, for example, a topical dimension, a scope dimension, and a timeline dimension. The topical dimension generally includes data indicative of an extent to which the user has been deemed to have an affiliation with the topic. For example, the topical dimension can include an affiliation index via which the user's affiliation can be measured and ranked against that of other users.

The scope dimension generally includes data indicative of a scope of the user's subject-matter affiliation with a particular topic. For example, although the topical dimension may indicate a particular subject-matter affiliation via the affiliation index, the scope dimension can include an assigned role for that subject-matter affiliation. For example, the assigned role can be that of evangelist, knowledge creator, knowledge manager, etc. The timeline dimension generally includes data indicative of a recency and/or depth of the user's subject-matter affiliation with the topic. For example, the timeline dimension can include a timeline classification such as, for example, long-time affiliate, deep-domain affiliate, cutting-edge affiliate, and strategic affiliate. Examples of the topical dimension, the scope dimension, and the timeline dimension will be described in greater detail with respect to FIG. 22.

Users can communicate with the SMA system 194 using a client computing system (e.g., client 114, client 116, or client 118). In a typical embodiment, at least some users can access the SMA system 194 using the SMA access system 2136. The SMA access system 2136 can include, for example, configurations and functionality described with respect to the BIM access system 136.

In addition, in some embodiments, the SMA access system 2136 can permit authorized users (e.g., administrators, super users, or other users) to manually change SMA classifications generated, for example, by the role classification engine 2146. In similar fashion, the authorized user could manually designate subject-matter affiliations that were missed by the role classification engine 2146, manually add, remove, or revise affiliation-scope classifications assigned by the role classification engine 2146, manually add, remove, or revise timeline classifications assigned by the role classification engine 2146, etc.

Figure 22:
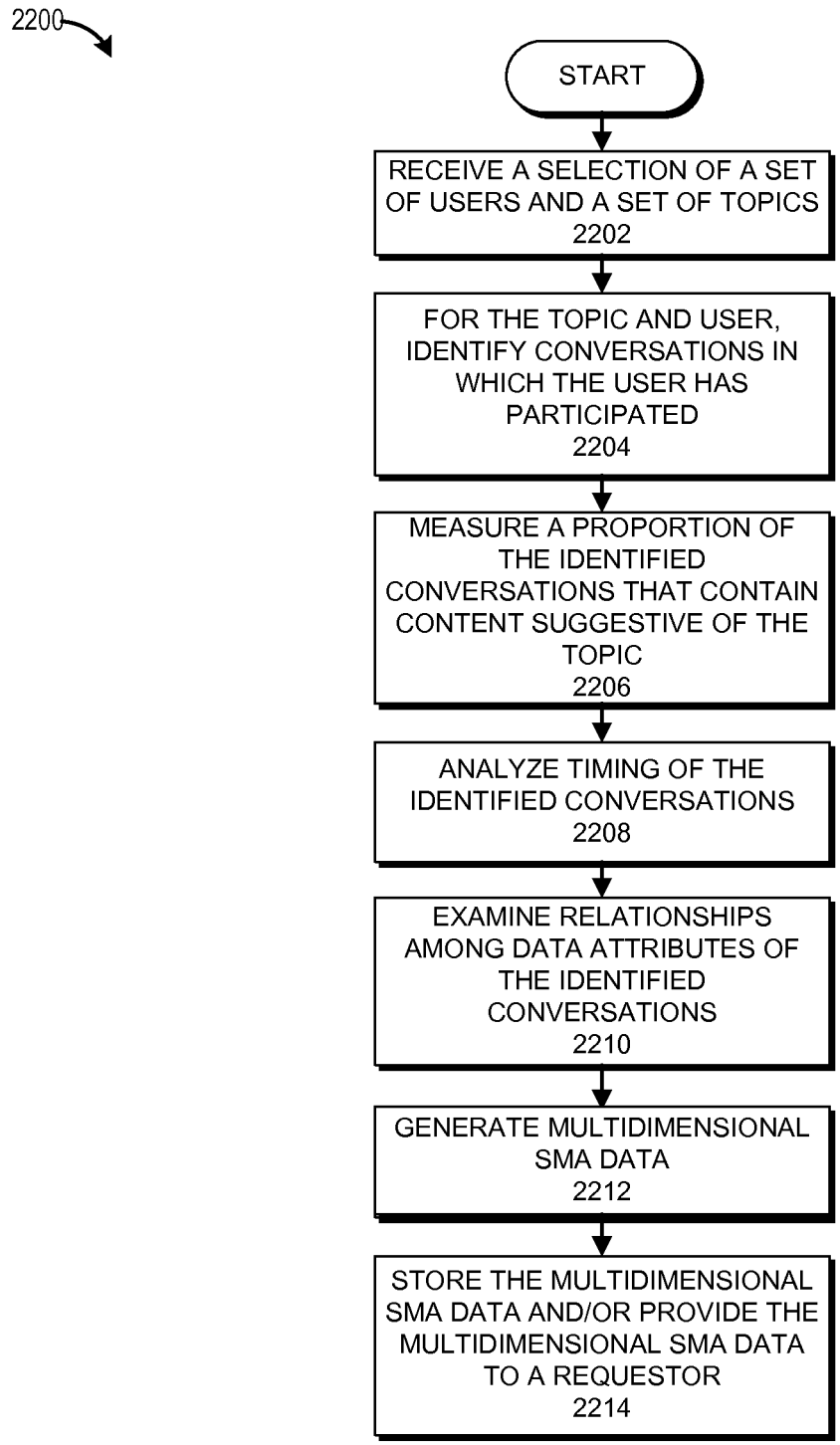
FIG. 22 presents a flowchart of an example of a process for classifying users as having a subject-matter affiliation with particular topics.

FIG. 22 presents a flowchart of an example of a process 2200 for classifying users as having a subject-matter affiliation with particular topics. The process 2200 can be implemented by any system that can classify data and/or metadata. For example, the process 2200, in whole or in part, can be implemented by the a priori classification engine 2126, the a posteriori classification engine 2128, the heuristics engine 2148 and/or the role classification engine 2146. In some cases, the process 2200 can be performed generally by the SMA classification system 2134 or the SMA system 194. Although any number of systems, in whole or in part, can implement the process 2200, to simplify discussion, the process 2200 will be described in relation to specific systems or subsystems of the SMA system 194.

At block 2202, the a priori classification engine 2126 receives a selection of a set of topics and a set of users. The set of topics can be selected, for example, responsive to configuration or election by an administrator, developer, super user, or other user. The set of topics can be also be received, for example, from the self-service access broker 196 as described with respect to FIGS. 24-28. In some cases, the set of topics can include only one topic and the set of users can include only one user.

In various embodiments, the set of topics can be a taxonomy that is created automatically, for example, by ingesting all or part of an organization's stored content. The set of topics can also be established manually. In a typical embodiment, each topic in the set of topics is characterized by one or more words or phrases. For example, a given topic could be characterized by a name (or partial name) of a product or technology. Topics can be general (e.g., "databases") or specific (e.g., "Hadoop"). In similar fashion to the set of topics, the set of users can be selected, for example, responsive to configuration or election by an administrator, developer, super user, or other user. As described above, the set of users can include all or a subset of individuals who are accessible to the SMA system 194 for potential SMA classifications.

At block 2204, for each user in the set of users, the a priori classification engine 2126 identifies conversations in which the user has participated. The conversations are typically identified as distinct communication threads within the collected communications. For example, in a typical embodiment, an original message and each successive response to that original message would be considered part of a same conversation.

At block 2206, for each topic and user, the a priori classification engine 2126 measures a proportion of the identified conversations that contain content suggestive of the topic (i.e., the user's topic-relevant conversations). In certain embodiments, the measurement yields one or more topical metrics that express, at least in part, a frequency or prevalence of the user's topic-relevant conversations. The one or more topical metrics can include, for example, a cardinality of the user's set of topic-relevant conversations, a decimal or percentage value of all of the user's conversations that the topic-relevant conversations represent, etc. The one or more topical metrics can also include statistical values such as, for example, a number of standard deviations that separate the cardinality from a mean value (e.g., a mean value based on a set of verified test data, a mean value across all users, etc.).

At block 2208, for each topic and user, the a posteriori classification engine 2128 analyzes a timing of the user's topic-relevant conversations. In a typical embodiment, the analysis results in one or more timeline metrics that indicate, at least in part, when the user first exhibited a subject-matter affiliation with the topic. For example, the one or more timeline metrics can include a date of a first topic-relevant conversation, a date of a most recent topic-relevant conversation, a number of topic-relevant conversations within certain periods of time (e.g., within the last month, within each month between the first date and the most recent date, etc.), a statistical distribution over time of conversations concerning the topic, etc.

At block 2210, for each topic and user, the a posteriori classification engine 2128 examines relationships among data attributes of the topic-relevant conversations. The data attributes that are examined can include, for example, who sent and received each communication of a topic-relevant conversation, who authored a document (e.g., that is attached to a communication or that itself is a communication), who initiated a topic-relevant conversation, who brought others into a topic-relevant conversation (e.g., by forwarding), etc. The examination typically yields one or more affiliation-scope metrics that are usable, at least in part, to suggest a role for the user's subject-matter affiliation. The one or more affiliation-scope metrics can include, for example, a number of topic-relevant conversations that the user originated, a number of topic-relevant conversations authored by the user (e.g., documents, presentations, etc.), a number of individuals that the user brought into topic-relevant conversations (e.g., by sending or forwarding), an average length of communications originated by the user (e.g., measured in characters, words, sentences, etc.), and/or the like.

At block 2212, for each topic and user, the role classification engine 2146 generates multidimensional SMA data. In a typical embodiment, the multidimensional SMA data includes a topical dimension, an affiliation-scope dimension, and a timeline dimension. In various embodiments, the topical dimension, the affiliation-scope dimension, and the timeline dimension can be generated, at least in part, based on the one or more topical metrics, the one or more affiliation-scope metrics, and the one or more timeline metrics, respectively. The multidimensional SMA data can include, for example, an affiliation index via which the user's SMA can be measured and ranked against that of other users. In certain embodiments, the affiliation index can be part of the topical dimension. The affiliation-scope data can be, for example, a record. An example of generating the multidimensional SMA data will be described with respect to FIG. 23.

At block 2214, for each topic and user, the data repository engine 2122 can store the multidimensional SMA data, for example, in one or more of the databases 2133 and/or provide all or part of the multidimensional SMA data to a requestor thereof (e.g., the self-service access broker 196).

Figure 23:
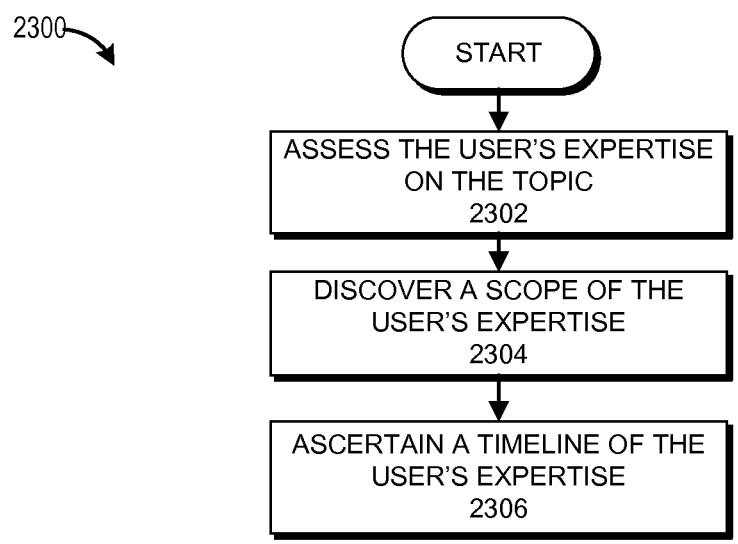
FIG. 23 presents a flowchart of an example of a process for generating multidimensional subject-matter-affiliation data for a given topic and user.

FIG. 23 presents a flowchart of an example of a process 2300 for generating multidimensional SMA data for a given topic and user. In various embodiments, the process 2300 may be performed, for example, as all or part of the block 1214 of FIG. 12. The process 2300 can be implemented by any system that can classify data and/or metadata. For example, the process 2300, in whole or in part, can be implemented by the a priori classification engine 2126, the a posteriori classification engine 2128, the heuristics engine 2148, and/or the role classification engine 2146. In some cases, the process 2300 can be performed generally by the SMA classification system 2134 or the SMA system 194. Although any number of systems, in whole or in part, can implement the process 2300, to simplify discussion, the process 2300 will be described in relation to specific systems or subsystems of the SMA system 194.

At block 2302, the role classification engine 2146 assesses the user's subject-matter affiliation with the topic. The role classification engine 2146 can utilize, for example, the one or more topical metrics generated at the block 2206 of FIG. 22. The assessment typically involves determining an affiliation index for the user relative to the topic. In certain embodiments, the affiliation index can be one of the one or more topical metrics. For example, in some embodiments, the affiliation index can be a cardinality of the user's set of topic-relevant conversations. In still other embodiments, the affiliation index can be a normalized value. For example, the affiliation index could be determined by dividing the cardinality of the user's set of topic-relevant conversations by the highest such cardinality across all users.

At block 2304, the role classification engine 2146 discovers a scope of the user's subject-matter affiliation. The discovery can utilize, for example, the one or more affiliation-scope metrics generated at the block 2210 of FIG. 22. In addition, or alternatively, the role classification engine 2146 can utilize pre-existing user-classification data such as, for example, job titles and employee classifications. The pre-existing user-classification data can be collected, for example, from an organization's human resources system, directory services (e.g. Active Directory), and/or the like.

In a typical embodiment, the discovery at the block 2304 includes assigning at least one affiliation-scope classification to the user. For example, in certain embodiments, the role classification engine 2146 is operable to assign one or more of a plurality of affiliation-scope classifications that are each associated with specific criteria. If the user meets the specific criteria, the role classification engine 2146 can assign the affiliation-scope classification. For example, in some embodiments, the one or more affiliation-scope classifications that the role classification engine 2146 is operable to assign can include roles of evangelist, knowledge manager, knowledge creator, and influencee.

The specific criteria for the evangelist role is typically associated with metrics (e.g., the one or more affiliation-scope metrics) that are indicative of the user's actions to promote the topic and inspire others to join the topic. For example, the specific criteria for the evangelist role could establish a threshold for a number of other individuals (e.g., other users) whom the user brought into a topic-relevant conversation (e.g., by forwarding, originating a new message, etc.). The threshold could be expressed in terms of a raw number, a normalized value, etc. In some embodiments, the specific criteria can further specify that the user have a certain title or user classification within the organization (e.g., manager, vice president, etc.). As described above, the title or user classification can be obtained from the organization's human-resources system, directory services (e.g., Active Directory), and/or the like.

The specific criteria for the knowledge creator role is typically associated with metrics (e.g., the one or more affiliation-scope metrics) that are indicative of the user's actions to create knowledge related to the topic. For example, the specific criteria for the knowledge creator role could establish thresholds for a number of conversations originated by the user, a number of documents or other communications authored by the user (e.g., as identified via author metadata of presentations, documents, etc.), an average length of communications created by the user (e.g., expressed in characters, words, sentences), and/or the like. As described above, the thresholds could be expressed in terms of a raw number, a normalized value, etc. In some embodiments, the specific criteria can further specify that the user have a certain title or user classification within the organization (e.g., manager, vice president, etc.).

The specific criteria for the knowledge manager role is typically associated with metrics (e.g., the one or more affiliation-scope metrics) that are indicative of the user's actions to manage or control knowledge related to the topic. For example, the specific criteria for the knowledge manager role could include a threshold for a number of topic-relevant conversations in which the user has participated and a requirement that the knowledge manager be a supervisor for a defined number of knowledge creators and/or evangelists. The threshold could be expressed in terms of a raw number, a normalized value, etc. A user can be identified as a supervisor using, for example, the organization's human resource's system, directory services (e.g., Active Directory), and/or the like.

The specific criteria for the influencee role is typically associated with metrics (e.g., the one or more affiliation-scope metrics) that are indicative of the user being influenced on the topic by other users. For example, the specific criteria for the influencee role could include a threshold for a number of topic-relevant conversations in which the user has participated and specify that the user not be a knowledge creator, knowledge manager, or evangelist (or that the user not meet certain criteria thereof). The specific criteria could also require, for example, that the user has originated or created at least a minimum number of communications (e.g., raw value, statistical value, or normalized value).

At block 2306, the role classification engine 2146 ascertains a timeline of the user's subject-matter affiliation. The block 2306 can utilize, for example, the one or more timeline metrics generated at the block 2208 of FIG. 22. In addition, as discussed with respect to the block 2304, the role classification engine 2146 can utilize pre-existing user-classification data such as, for example, job titles and employee classifications. In a typical embodiment, the block 2306 includes assigning at least one timeline classification to the user.

For example, in certain embodiments, the role classification engine 2146 is operable to assign one or more of a plurality of timeline classifications that are each associated with specific criteria. If the user meets the specific criteria, the role classification engine 2146 can assign the timeline classification. For example, in some embodiments, the one or more timeline classifications that the role classification engine 2146 is operable to assign can include roles of long-time affiliate, deep-domain affiliate, cutting-edge affiliate, and strategic affiliate. In similar fashion to the plurality of affiliation-scope classifications, the specific criteria for each of the plurality of timeline classifications are typically associated with metrics (e.g., the one or more timeline metrics) that are indicative of the respective role.

For example, the specific criteria for the role of long-time affiliate could require that the user's topic-relevant conversations begin prior to a certain date, that a certain number, percentage, or statistical distribution of the user's topic-relevant conversations occur prior to a certain date, etc. In some embodiments, the role of long-time affiliate can be determined relative to other users in the set of users so that, for example, the certain date need not be determined or can be dynamically established based on a statistical analysis of the set of users and the timing of their topic-relevant conversations.

The role of deep-domain affiliate is typically used for users who exhibit a continuous subject-matter affiliation with a given topic over time. For example, the specific criteria for the role of deep-domain affiliate could require that the user have at least a minimum number of topic-relevant conversations within each of a plurality of periods of time. In some embodiments, the role of deep-domain affiliate can be established relative to other users in the set of users so that, for example, the minimum number of topic-relevant conversations can be dynamically established based on a statistical analysis of the set of users and the timing of their topic-relevant conversations.

The role of cutting-edge affiliate is typically used for users who exhibit extensive recent subject-matter affiliation. For example, the specific criteria for the role of cutting-edge affiliate could require that the user have at least a minimum number of topic-relevant conversations within a certain recent period of time (e.g., last month, last year, etc.). In some embodiments, the role of cutting-edge affiliate can be established relative to other users in the set of users so that, for example, the minimum number of topic-relevant conversations can be dynamically established based on a statistical analysis of the set of users and the timing of their topic-relevant conversations.

The role of strategic affiliate is typically used for users who hold a position of preeminence in the organization. For example, the specific criteria for the role of strategic affiliate could require that the user have at least a minimum number of topic-relevant conversations within a certain recent period of time (e.g., last month, last year, etc.) along with having a certain position within the organization (e.g., manager, vice president, etc.). The user's position within the organization can be determined using, for example, the organization's human resources and/or directory services as described above. In some embodiments, the role of strategic affiliate can be established relative to other users in the set of users so that, for example, the minimum number of topic-relevant conversations and/or the required position can be dynamically established based on a statistical analysis of the set of users and the timing of their topic-relevant conversations.

VI. Example Operation of a Self-Service Access Broker

Figure 24:
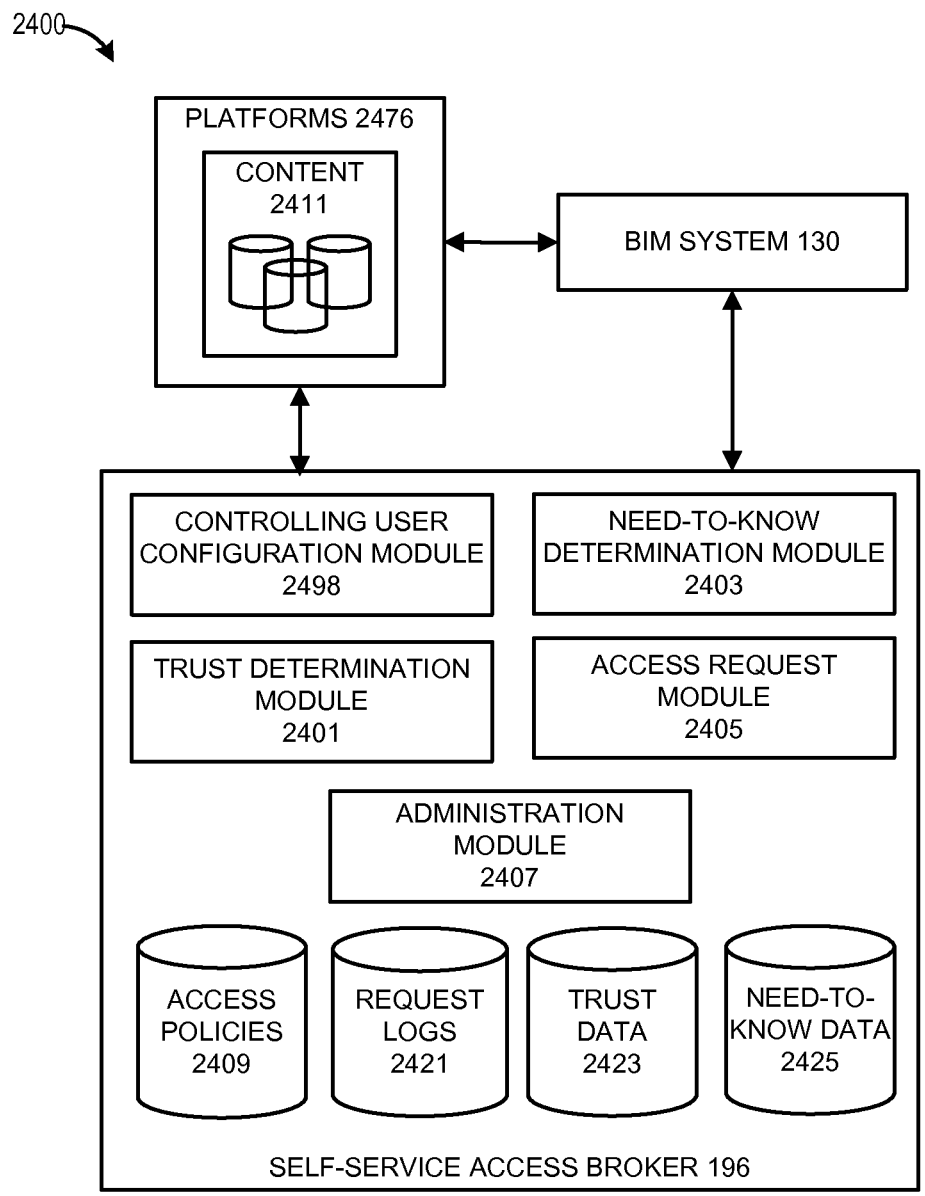
FIG. 24 illustrates an embodiment of a system for self-service access to content.

FIG. 24 illustrates an embodiment of a system 2400 for self-service access to content. The system 2400 includes the self-service access broker 196 of FIG. 1, the BIM system 130 of FIG. 1, and content platforms 2476. In general, the content platforms 2476 can include, for example, systems that allow publishing, editing, modifying, and/or maintaining of content. As illustrated, the content platforms 2476 can store or maintain content 2411.

The content platforms 2476, in general, are representative of at least a portion of the internal data sources 120 and the external data sources 122 as illustrated in FIG. 1. For ease of illustration and description, those of the internal data sources 120 and the external data sources 122 that can serve as a content platform are shown collectively as the content platforms 2476. In a typical embodiment, each item of content in the content 2411 can have one or more controlling users. In addition to having its ordinary meaning, a controlling user can refer to a user (or users) who is primarily responsible for granting or denying requests to access particular content of the content 2411 (e.g., a content owner). In some embodiments, the self-service access broker 196 can, in effect, serve as the content platforms 2476. In these embodiments, the self-service access broker 196 can directly manage and/or maintain the content 2411. Some embodiments can also implement a combination of the foregoing.

In the illustrated embodiment, the self-service access broker 196 includes a controlling-user configuration module 2498, a trust determination module 2401, a need-to-know determination module, an access request module 2405, and an administration module 2407. The controlling-user configuration module 2498 can be a hardware and/or software module operable to interact with controlling users of the content 2411. For example, the controlling-user configuration module 2498 can be used to establish self-service access policies for particular content of the content 2411. In general, a self-service access policy can be a policy for automatically granting or denying user requests to access particular content (e.g., a document, file, site, communication, presentation, etc.). Self-service access policies established via the controlling-user configuration module 2498 can be stored in a policies repository 2409. In addition, in certain embodiments, the controlling-user configuration module 2498 can be used, by controlling users, to reverse policy-based access decisions of the self-service access broker 196, for example, by granting access to users who were automatically denied access, revoking access to users who were automatically granted access, etc.

The trust determination module 2401 can be a hardware and/or software module operable to determine trust measures of users. Each trust measure can be an indication of a trustworthiness of users, for example, as a result of analyzing logged behavior of users on communications platforms such as the communications platforms 1176 of FIG. 11, the communications platforms 1776 of FIG. 17, etc. In certain embodiments, the logged behavior of users can be used as indicators of an extent to which the users are good custodians of the data to which they have been entrusted. In various cases, the trust measure can be based on, for example, a number of DLP violations, directory-services information, communication profiles, combinations of same, and/or the like. In various embodiments, trust measures can be stored in a trust repository 2423. In some embodiments, trust measures can be determined entirely in real-time in response to requests to access particular content. In these embodiments, the trust repository 2423 may be eliminated. In still other embodiments, trust measures can be stored in the trust repository 2423 for purposes of improving trust determination over time (e.g., using machine learning and/or manual techniques).

In some embodiments, a trust measure can be a quantity of virtual currency, referred to herein as trust tokens. In this manner, trust tokens can derive value from limited distribution. In certain embodiments, each user can be given an allocation of trust tokens by applying one or more rules which define how trust tokens are earned. Advantageously, in certain embodiments, trust tokens can be one way of safeguarding against previously trustworthy users who, for example, suddenly become disgruntled employees, from binge-accessing and exposing organizational content. In these embodiments, even users deemed highly trustworthy, and who are given relatively large allocations of trust tokens, can be prevented from having unlimited self-service access to data because each access would require "spending" trust tokens. Example operation of the trust determination module 2401 will be described with respect to FIG. 27.

The need-to-know determination module 2403 can be a hardware and/or software module operable to determine a particular user's need to access particular content, for example, by comparing topics contained in the particular content with topics contained in the particular user's communications. In certain embodiments, the need-to-know determination module 2403 can define the user's need to know, or access, the particular content in terms of the user's measured affiliation with one or more topics of the particular content. In a typical embodiment, the need-to-know determination module 2403 can communicate with the SMA system 194 to determine the user's subject-matter affiliation with a given topic. Example operation of the need-to-know determination module 2403 will be described with respect to FIG. 28. In various embodiments, resultant data from the need-to-know determination module 2403 can be stored in a need-to-know repository 2425. In some embodiments, need-to-know can be determined entirely in real-time in response to requests to access particular content. In these embodiments, the need-to-know repository 2425 may be eliminated. In still other embodiments, need-to-know values can be stored in the need-to-know repository 2425 for purposes of improving need-to-know determinations over time (e.g., using machine learning and/or manual techniques).

The access request module 2405 can be a hardware and/or software module operable to receive and process user requests to access particular content of the content 2411 according to applicable self-service access policies of the policies repository 2409. For example, the access request module 2405 can automatically grant or deny access requests using, for example, information provided by the trust determination module 2401, the need-to-know determination module 2403, and/or other resources such as the user-context analytics system 180. In certain embodiments, the access request module 2405 can log each access automatically granted or denied in request logs 2421. In addition, in certain embodiments, each revocation or reversal of automatic grants/denials can be recorded in the request logs 2421.

The administration module 2407 can be a hardware and/or software module operable to interface with the content platforms 2476, for example, to implement access rights granted, denied, or revoked using the self-service access broker 196. In various cases, the administration module 2407 can map to access-rights functionality of an applicable API or other interface of the content platforms 2476. For example, when an access request for particular content is automatically granted, the administration module 2407 can call an appropriate API or otherwise cause the access grant to be effected on an appropriate content platform of the content platforms 2476. In an example, the administration module 2407 can cause a requesting user to be added to an access control list for requested content.

In some embodiments, as illustrated, the administration module 2407 can access some or all of the content platforms 2476 via the BIM system 130. In these embodiments, the administration module 2407 can use the BIM system 130 (e.g., via the access manager 204 of FIG. 2) to access and provide particular content of the content 2411 to the requesting user. In these implementations, it may not be necessary for the self-service access broker 196 to make changes to access control lists or other access rights on the content platforms 2476. Rather, the administration module 2407 can use, for example, credentials available to the access manager 204 to acquire content where appropriate (e.g., using the controlling user's credentials). In these implementations, the request logs 2421 can serve as the controlling authority for self-service access rights. In implementations where the self-service access broker 196 directly maintains all or a portion of the content 2411, the request logs 2421 can similarly serve as the controlling authority for self-service access rights.

It should be appreciated that the particular arrangement of modules in FIG. 24 is only for illustrative purposes. For example, in various implementations, the same or different functionality could be allocated among more or fewer modules than what is shown in FIG. 24. In similar fashion, although particular data stores are illustrated in FIG. 24, it should be appreciated that such data storage can be divided among any number of logical or physical data stores. In addition, various data stores can be eliminated. For example, if particular implementations have no need for the trust determination module 2401 or the need-to-know determination module 2403 to persist data, the trust repository 2423 and/or the need-to-know repository 2425 can be eliminated.

Other variations from the foregoing will be apparent to one skilled in the art after reviewing the present disclosure. For simplicity of description and illustration, various examples will be described below relative to the example arrangement depicted in FIG. 24.

Figure 25:
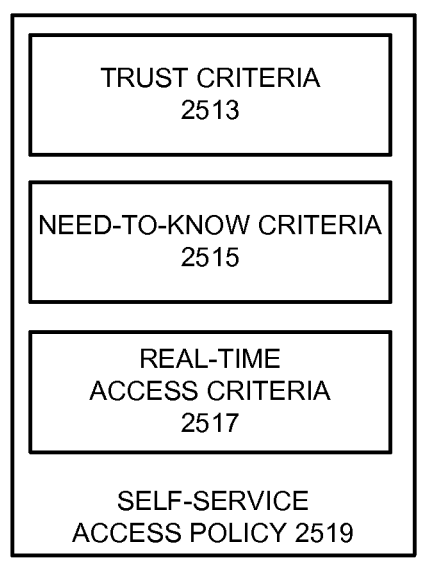
FIG. 25 illustrates an example format of a self-service access policy.

FIG. 25 illustrates an example format of a self-service access policy 2519 that can be used to secure particular content. The self-service access policy 2519 can include, for example, trust criteria 2513, need-to-know criteria 2515, real-time access criteria 2517, and/or other constraints. In certain embodiments, the trust criteria 2513 can include a configurable trust-measure threshold that restricts which users can access the particular content. The trust-measure threshold can be a configurable value or range of values. For example, in certain embodiments, trust measures can be scaled or normalized values such that the trust-measure threshold can be set to low, medium, high, etc. In addition, or alternatively, in some embodiments, the trust criteria 2513 can include a quantity of trust tokens. The quantity of tokens can, in effect, be a "cost" of accessing the particular content such that users accessing the particular content must "spend" the quantity of trust tokens.

The need-to-know criteria 2515 can restrict access to the particular content on the basis of requesting users' subject-matter affiliation with one or more topics of the particular content. In some cases, the need-to-know criteria 2515 can include criteria for a single topic (e.g., a user-selected topic that characterizes the particular topic, an automatically determined topic, etc.). In other cases, the need-to-know criteria 2515 can include criteria for a combination of topics such that, for example, a requesting user may have to satisfy applicable conditions for each topic, at least one topic, etc.

In an example, with reference to the topical dimension described above with respect to the SMA system 194, the need-to-know criteria 2515 can include one or more thresholds related to a topical dimension such as a cardinality of the user's set of topic-relevant conversations, a number of standard deviations that separate the cardinality from a mean value (e.g., a mean value based on a set of verified test data, a mean value across all users, etc.), a decimal or percentage value of all of the user's conversations that the topic-relevant conversations represent, an affiliate index, combinations of same, and/or the like.

In another example, with reference to the timeline dimension described above with respect to the SMA system 194, the need-to-know criteria 2515 can include one or more thresholds or requirements related to a date of a requesting user's first topic-relevant conversation, a date of the requesting user's most recent topic-relevant conversation, the requesting user's number of topic-relevant conversations within certain periods of time (e.g., within the last month, within each month between the first date and the most recent date, etc.), a statistical distribution over time of the requesting user's conversations concerning the topic, etc. In addition, or alternatively, still with reference to the timeline dimension described above, the need-to-know criteria 2515 can require that the requesting user have a particular timeline classification such as, for example, long-time affiliate, deep-domain affiliate, cutting-edge affiliate, and strategic affiliate.

In yet another example, with reference to the affiliation-scope dimension described above with respect to the SMA system 194, the need-to-know criteria 2515 can include one or more thresholds or requirements related to a number of topic-relevant conversations that a requesting user originated, a number of topic-relevant conversations authored by the requesting user (e.g., documents, presentations, etc.), a number of individuals that the requesting user brought into topic-relevant conversations (e.g., by sending or forwarding), an average length of communications originated by the requesting user (e.g., measured in characters, words, sentences, etc.), and/or the like. In addition, or alternatively, still with reference to the affiliation-scope dimension described above, the need-to-know criteria 2515 can require that the requesting user have a particular affiliation-scope classification such as, for example, evangelist, knowledge manager, knowledge creator, and influencee.

The real-time access criteria 2517 can be used to restrict access to the particular content on the basis of real-time attributes of a user requesting accessing to the particular content. For example, the real-time access criteria 2517 can require or exclude any aspect of user-location information, event-timing information and/or user-device identification information as described above. In a particular example, the real-time access criteria 2517 could specify that requests originating from a public location (e.g., coffee shop, mall, or airport) and/or a mobile device be denied. In another example, the real-time access criteria 2517 could require that, if a current user context exhibits one or more outlier conditions relative to a user's communication profile, the request should be denied. Examples of outlier conditions include the user making the request at a time when the user is typically inactive, the request being made from an unrecognized device, the request being made from an unrecognized location, combinations of same and/or the like.

Figure 26:
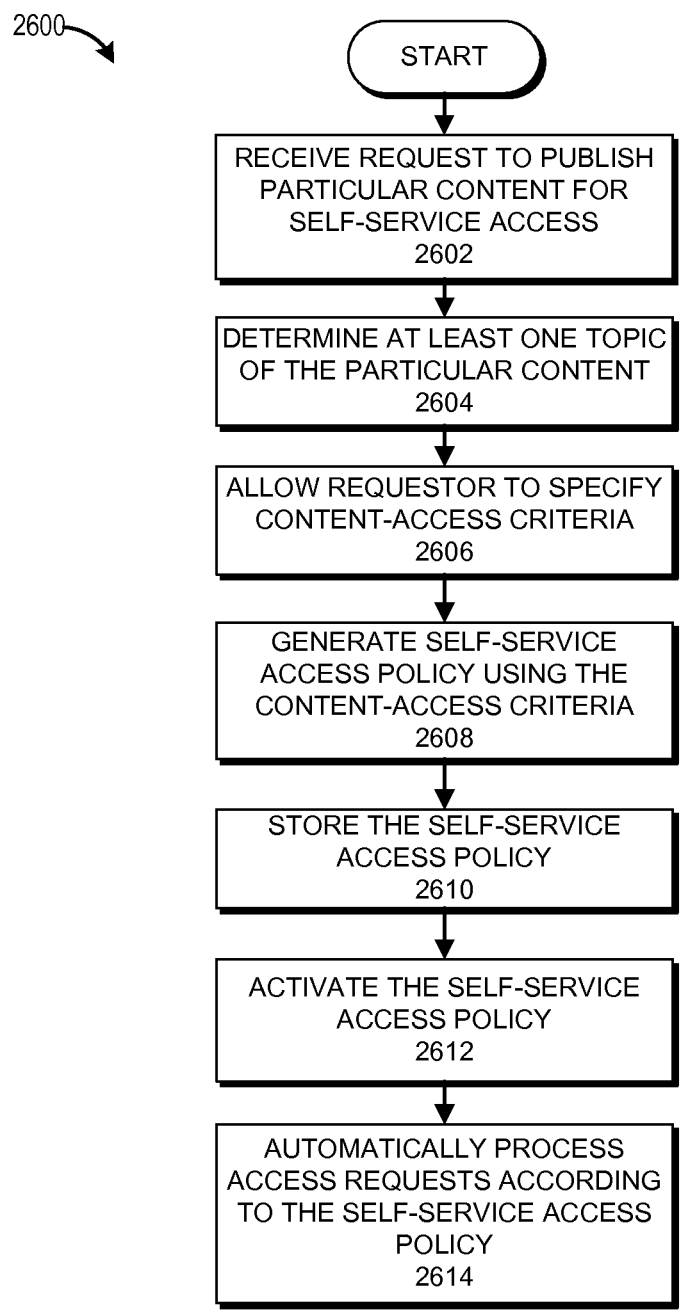
FIG. 26 presents a flowchart of an example of a process for establishing self-service access policies.

FIG. 26 presents a flowchart of an example of a process 2600 for establishing self-service access policies. The process 2600 can be implemented by any system that can access data and communicate over a network. For example, the process 2600, in whole or in part, can be implemented by the SMA system 194 (or a component thereof), the BIM system 130 (or a component thereof), the cross-platform DLP system 146 (or a component thereof), the user-context analytics system 180 (or a component thereof), the controlling-user configuration module 2498, the trust determination module 2401, the need-to-know determination module 2403, the access request module 2405, and/or the administration module 2407. In some cases, the process 2600 can be performed generally by the self-service access broker 196 or the central management platform 192. Although any number of systems, in whole or in part, can implement the process 2600, to simplify discussion, the process 2600 will be described in relation to specific systems or subsystems of the self-service access broker 196.

At block 2602, the controlling-user configuration module 2498 receives a request, from a controlling user, to publish particular content of the content 2411 for self-service access. In various cases, the particular content can be identified by a uniform resource locator (URL), a document identifier, and/or the like. In various cases, the request can be received from one of the clients 114, 116, or 118. In some cases, the request can be received via redirect from an initial request made to a particular content platform of the content platforms 2476.

At block 2604, the controlling-user configuration module 2498 determines one or more topics of the particular content. In some embodiments, the controlling user can be permitted to select the topics from a global set of topics or a taxonomy that is collected, for example, by the data collection system 2132 of the SMA system 194. In other embodiments, the topics can be automatically determined, for example, by ingesting words and phrases of the particular content as described above with respect to the SMA system 194. In some embodiments, the particular content may already have a pre-processed set of topics based on previous operation of the SMA system 194 (e.g., stored in the set of databases 2133). In these embodiments, the at least one topic can simply be retrieved.

At block 2606, the controlling-user configuration module 2498 allows the controlling user to specify content-access criteria. In general, the block 2606 can include allowing the controlling user to specify any of the criteria described above with respect to the self-service access policy 2519 of FIG. 25. At block 2608, the controlling-user configuration module 2498 generates a self-service access policy for the particular content using the content-access criteria specified at the block 2606. In general, the block 2608 can include producing the self-service access policy according to a standardized format used by the self-service access broker 196.

At block 2610, the controlling-user configuration module 2498 stores the self-service access policy in the policies repository 2409. At block 2612, the controlling-user configuration module 2498 activates the self-service access policy, for example, by making the particular content available to requesting users as specified by the self-service access policy. At block 2614, the access request module 2405 automatically processes requests to access the particular content according to the self-service access policy. The block 2614 can include, for example, automatically granting or denying access requests. Example functionality that can occur at the block 2614 will be described with respect to FIG. 29.

Figure 27:
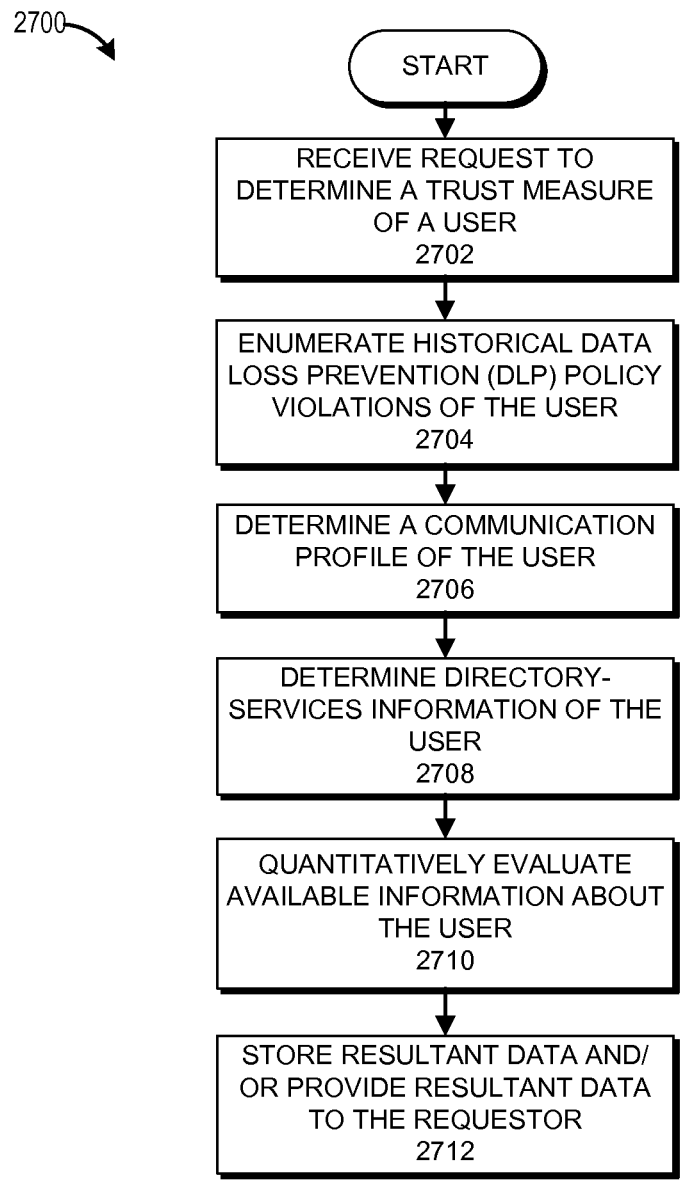
FIG. 27 presents a flowchart of an example of a process for determining trust values usable for self-service access.

FIG. 27 presents a flowchart of an example of a process 2700 for determining trust values usable for self-service access. In some embodiments, the process 2700 can be executed periodically (e.g., daily, weekly, monthly) for each user in a set of users of all users in an organization. In addition, in some embodiments, the process 2700 can be triggered for a particular user by the access request module 2405.

The process 2700 can be implemented by any system that can access data and communicate over a network. For example, the process 2700, in whole or in part, can be implemented by the SMA system 194 (or a component thereof), the BIM system 130 (or a component thereof), the cross-platform DLP system 146 (or a component thereof), the user-context analytics system 180 (or a component thereof), the controlling-user configuration module 2498, the trust determination module 2401, the need-to-know determination module 2403, the access request module 2405, and/or the administration module 2407. In some cases, the process 2700 can be performed generally by the self-service access broker 196 or the central management platform 192. Although any number of systems, in whole or in part, can implement the process 2700, to simplify discussion, the process 2700 will be described in relation to specific systems or subsystems of the self-service access broker 196.

At block 2702, the trust determination module 2401 receives a request to determine a trust measure for a user. In various cases, the request can be received from the access request module 2405, an administrator or other user, another computer system, etc. At block 2704, the trust determination module 2401 enumerates historical DLP policy violations by the user, for example, via communication with the cross-platform DLP system 146 and/or the user-context analytics system. In various implementations, quasi-violations as described above can also be enumerated. In some cases, only violations (and/or quasi-violations) of a particular set of DLP policies or cross-platform DLP policies can be enumerated.

At block 2706, the trust determination module 2401 determines a communication profile of the user. In some embodiments, the communication profile can be a pre-processed communication profile that is retrieved from the user-context analytics system 180. In other embodiments, the trust determination module 2401 can cause, for example, the user-context correlation engine 1782 to generate and provide the communication profile in the fashion described with respect to FIG. 18.

At block 2708, the trust determination module 2401 determines directory-services information of the user. In various cases, the directory-services information can be retrieved directly from a directory service, from the BIM system 130, and/or the like. The directory-services information can indicate, for example, a geographic location, a title or rank in an organizational hierarchy, a role, etc.

At block 2710, the trust determination module 2401 quantitatively evaluates available information about the user to yield, for example, the trust measure. In some implementations, the trust measure can be a computation resulting from a rule-based evaluation of the information from blocks 2704-2708 and/or other information. In an example, the block 2710 could include computing, for a given time period, a weighted (or unweighted) sum of a number of DLP violations, a number of email attachments transmitted from a public location (e.g., from the communication profile), a number of external communication participants in the users' communications, a number of communications sent to more than one user, length of employment with a given organization, combinations of same and/or the like.

In some cases, the trust measure can be a quantity of trust tokens. Trust tokens can be allocated to the user as a result of the user meeting criteria for earning tokens. In a simple example, if there are seven levels in an organizational hierarchy, the user could be allocated seven tokens if at the highest level, one token if at the lowest level, etc. In another example, the user could be allocated ten tokens if, based on the enumerated DLP violations, there are fewer than five DLP violations. In yet another example, the user could be allocated ten trust tokens if, based on the communication profile, there are no communications with email attachments sent from a public location. In still another example, the user could be allocated a number of trust tokens equal to the percentage of user-initiated communication events that are initiated from a non-public location on a non-mobile device. In another example, a rule could specify a reduction of trust tokens. For example, the user could be deducted one trust token for each automatic access grant that has been revoked over the past month. It should be appreciated that the foregoing are merely illustrative examples. Quantities of trust tokens can also be determined in numerous other manners that will be apparent to one skilled in the art after reviewing the present disclosure.

At block 2712, the trust determination module 2401 stores resultant data, such as the trust measure, in the trust repository 2423. As mentioned above, in some embodiments, the trust repository 2423 can be eliminated (e.g., if there is no need to persist the trust measures because the trust measures are always determined in real-time). In these embodiments, storage of the resultant data can be eliminated. In addition, or alternatively, the trust determination module 2401 can provide the resultant data to the requestor.

Figure 28:
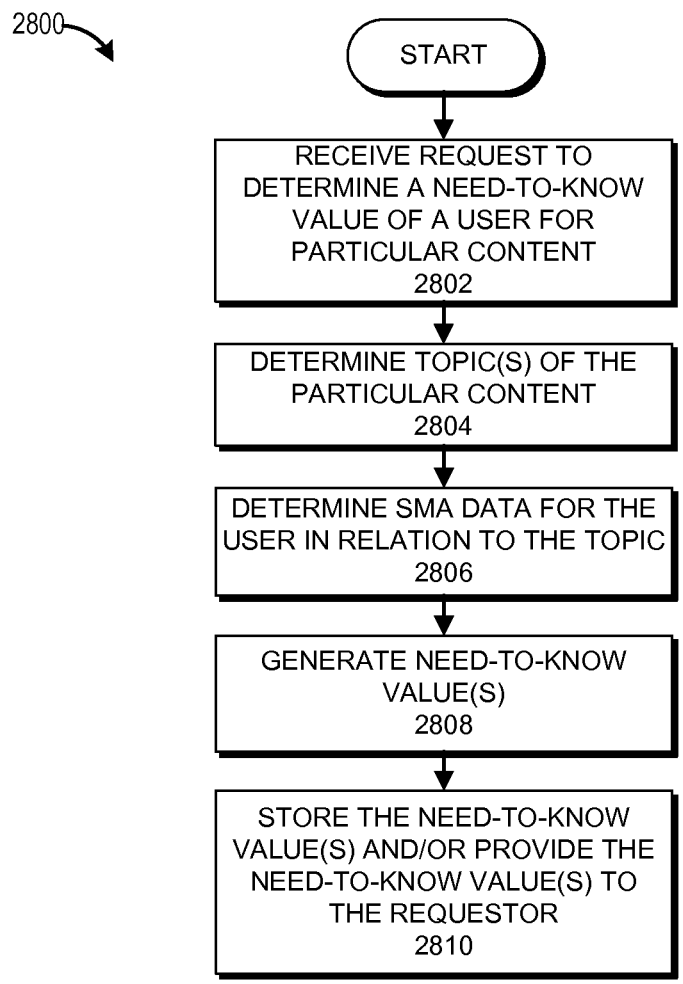
FIG. 28 presents a flowchart of an example of a process for determining need-to-know values usable for self-service access.

FIG. 28 presents a flowchart of an example of a process 2800 for determining need-to-know values usable for self-service access. In some embodiments, the process 2800 can be executed periodically (e.g., daily, weekly, monthly) for each user in a set of users of all users in an organization, for each topic in global set of topics or taxonomy. In addition, in some embodiments, the process 2800 can be triggered for a particular user by the access request module 2405.

The process 2800 can be implemented by any system that can access data and communicate over a network. For example, the process 2800, in whole or in part, can be implemented by the SMA system 194 (or a component thereof), the BIM system 130 (or a component thereof), the cross-platform DLP system 146 (or a component thereof), the user-context analytics system 180 (or a component thereof), the controlling-user configuration module 2498, the trust determination module 2401, the need-to-know determination module 2403, the access request module 2405, and/or the administration module 2407. In some cases, the process 2800 can be performed generally by the self-service access broker 196 or the central management platform 192. Although any number of systems, in whole or in part, can implement the process 2800, to simplify discussion, the process 2800 will be described in relation to specific systems or subsystems of the self-service access broker 196.

At block 2802, the need-to-know determination module 2403 receives a request to determine one or more need-to-know values for a user in relation to particular content. In various cases, the request can be received from the access request module 2405, an administrator or other user, another computer system, etc.

At block 2804, the need-to-know determination module 2403 determines one or more topics of the particular content. In some embodiments, the one or more topics may have been specified and determined, for example, at a time of establishing an applicable self-service access policy. In these embodiments, the topics can be retrieved, for example, from the policies repository 2409. In other embodiments, the need-to-know determination module 2403 can cause the topics to be determined in any of the ways described above with respect to the block 2604 of FIG. 26.

At block 2806, the need-to-know determination module 2403 determines SMA data about the user in relation to each of the topics. In certain embodiments, the block 2806 can include causing the SMA system 194 to generate multidimensional SMA data as described with respect to the process 2300 of FIG. 23. In certain other embodiments, the block 2806 can include accessing pre-processed SMA data for the user, for example, from the SMA system 194 (e.g., as a result of a previous execution of the process 2300 for all users, a set of users, etc.).

At block 2808, the need-to-know determination module 2403 generates need-to-know values in relation to the user for each of the topics. In general, the need-to-know values can include any values specified by an applicable self-service access policy as described, for example, with respect to the self-service access policy 2519 of FIG. 25. In a typical embodiment, the generated need-to-know values can correspond to portions of the SMA data determined at the block 2806. At block 2810, the need-to-know determination module 2403 stores resultant data, such as the need-to-know values, in the need-to-know repository 2425. As mentioned above, in some embodiments, the need-to-know repository 2425 can be eliminated (e.g., if there is no need to persist the need-to-know values because the need-to-know values are always determined in real-time). In these embodiments, storage of the resultant data can be eliminated. In addition, or alternatively, the need-to-know determination module 2403 can provide the resultant data to the requestor.

Figure 29:
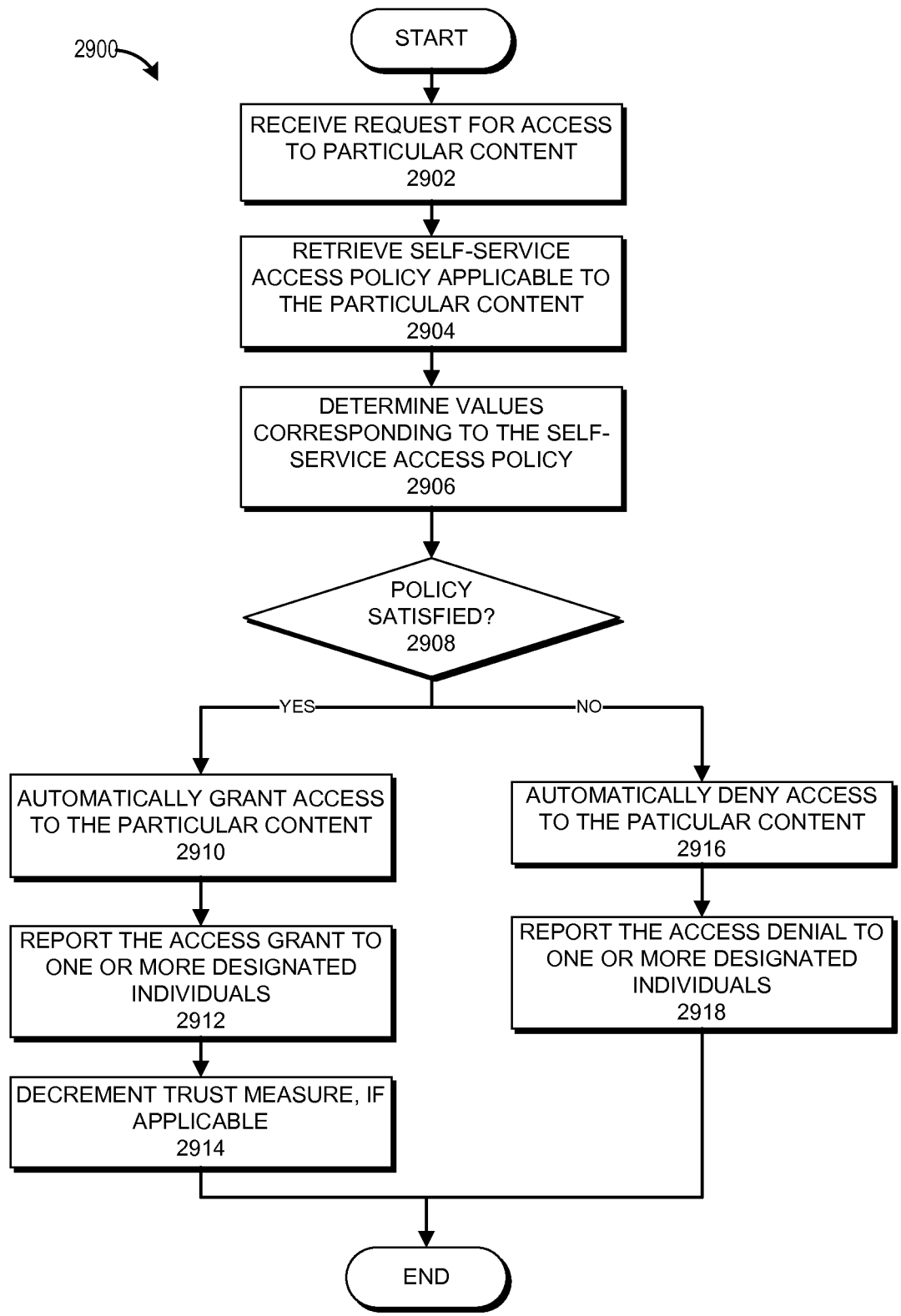
FIG. 29 presents a flowchart of an example of a process for processing self-service access requests.

FIG. 29 presents a flowchart of an example of a process 2900 for processing self-service access requests. The process 2900 can be implemented by any system that can access data and communicate over a network. For example, the process 2900, in whole or in part, can be implemented by the SMA system 194 (or a component thereof), the BIM system 130 (or a component thereof), the cross-platform DLP system 146 (or a component thereof), the user-context analytics system 180 (or a component thereof), the controlling-user configuration module 2498, the trust determination module 2401, the need-to-know determination module 2403, the access request module 2405, and/or the administration module 2407. In some cases, the process 2900 can be performed generally by the self-service access broker 196 or the central management platform 192. Although any number of systems, in whole or in part, can implement the process 2900, to simplify discussion, the process 2900 will be described in relation to specific systems or subsystems of the self-service access broker 196.

At block 2902, the access request module 2405 receives a request from a user to access particular content of the content 2411. At block 2904, the access request module 2405 retrieves, from the policies repository 2409, a self-service access policy applicable to the particular content.

At block 2906, the access request module 2405 determines values corresponding to content-access criteria of the self-service access policy. In an example, if the content-access criteria includes trust criteria, the access request module 2405 can cause a trust measure to be generated by the trust determination module 2401 as described with respect to the process 2700 of FIG. 27. In another example, if the content-access criteria includes need-to-know criteria, the access request module 2405 can cause applicable need-to-know values to be generated by the need-to-know determination module 2403 as described with respect to the process 2800 of FIG. 28. In yet another example, if the content-access criteria includes real-time access criteria, the access request module 2405 can retrieve a current user context (and related values), for example, from the user-context analytics system 180. In some cases, the access request module 2405 can retrieve pre-processed values, for example, as a result of previous operation of the trust determination module 2401, the need-to-know determination module 2403, the user-context analytics system 180, etc.

At decision block 2908, the access request module 2405 determines whether the content-access criteria of the self-service access policy is satisfied. As noted above, the content-access criteria can include trust criteria, need-to-know criteria, real-time access criteria, and/or other criteria. If it is determined at the decision block 2908 that the content-access criteria is satisfied, at block 2910, the access request module 2405 automatically grants the user access to the particular content. In certain embodiments, the granted access can be enacted by the administration module 2407 as previously described. At block 2912, the access request module 2405 reports the access grant to one or more designated users such as, for example, a controlling user of the particular content, a manager of the user, and/or other users. At block 2914, in embodiments utilizing trust tokens, the access request module 2405 can decrement the user's trust measure by an applicable quantity of trust tokens (e.g., as specified in a trust-measure threshold). After block 2914, the process 2900 ends.

If it is determined at the decision block 2908 that the content-access criteria is not satisfied, at block 2916, the access request module 2405 automatically denies the user access to the particular content. At block 2918, the access request module 2405 reports the access denial to one or more designated users such as, for example, a controlling user of the particular content, a manager of the user, and/or other users. After block 2918, the process 2900 ends.

In certain embodiments, as described above, the controlling user of the particular content can override, or reverse, the automatic grants or denials of the access request module 2405. For example, after receiving the report of the automatic grant at the block 2910, the controlling user, via the controlling-user configuration module 2498, can revoke the automatic grant. In similar fashion, after receiving the report of the automatic denial at the block 2916, the controlling user, via the controlling-user configuration module 2498, can grant the user access.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising, by a computer system:
  receiving a request from a user to access particular content;
  in response to the request:
    determining a trust measure of the user, wherein the trust measure is based, at least in part, on an analysis of logged user-initiated communication events of the user on a plurality of communications platforms, wherein the trust measure is variable over time in relation to the logged user-initiated communication events;

wherein the determining the trust measure comprises:
enumerating historical data loss prevention (DLP) policy violations by the user on the plurality of communications platforms;
determining a communication profile of the user based, at least in part, on the logged user-initiated communication events;
determining directory-services information for the user from a directory service; and
quantitatively evaluating a combination of the DLP policy violations, the communication profile, and the directory-services information via one or more rules, wherein the trust measure comprises a numerical result of the quantitatively evaluating;

accessing a self-service access policy applicable to the particular content;
ascertaining, from the self-service access policy, a trust threshold applicable to the particular content; and
responsive to a determination that the trust measure fails to satisfy the trust threshold, automatically denying access by the user to the particular content.

2. The method of claim 1, wherein the enumerating comprises enumerating quasi-violations by the user on the plurality of communications platforms.

3. The method of claim 1, wherein the determining the communication profile of the user comprises:
accessing event-assessment data for the logged user-initiated communication events, wherein each user-initiated communication event relates to at least one communication of a plurality of communications, wherein the event-assessment data comprises information related to a content-based classification of each of the plurality of communications;
determining event-context information for each of the logged user-initiated communication events, the event-context information comprising user-identification information, user-location information, event-timing information, and user-device identification information;
correlating the event-assessment data to a plurality of user contexts, each user context defined by a distinct subset of the event-context information;
associating at least one user-communication pattern with each user context based, at least in part, on the correlated event-assessment data; and
generating the communication profile using a result of the associating.

4. The method of claim 1, wherein the determining the communication profile comprises accessing a pre-processed communication profile of the user.

5. The method of claim 1, wherein the quantitatively evaluating comprises:
determining trust values for the historical DLP violations, the communication profile, and the directory-services information; and
wherein the trust measure is based on a combination of the trust values.

6. The method of claim 1, wherein the determining the trust measure comprises accessing a pre-processed trust measure in memory.

7. The method of claim 1, comprising, responsive to a determination that the trust measure satisfies the trust threshold, automatically granting access by the user to the particular content.

8. The method of claim 7, wherein the automatically granting comprises causing the user to be added to an access control list for the particular content.

9. The method of claim 1, wherein the trust measure comprises an allocation of virtual currency.

10. The method of claim 9, comprising:
responsive to a determination that the trust measure satisfies the trust threshold, automatically granting access by the user to the particular content; and
decrementing the trust measure by a configurable amount.

11. The method of claim 1, comprising:
determining information related to a current user context of the user; and
responsive to a determination that the current user context comprises an outlier condition, denying access by the user to the particular content regardless of the trust measure.

12. An information handling system comprising at least one processor coupled to a memory, wherein the at least one processor is operable to implement a method comprising:
receiving a request from a user to access particular content;
in response to the request:
determining a trust measure of the user, wherein the trust measure is based, at least in part, on an analysis of logged user-initiated communication events of the user on a plurality of communications platforms, wherein the trust measure is variable over time in relation to the logged user-initiated communication events;
wherein the determining the trust measure comprises:
enumerating historical data loss prevention (DLP) policy violations by the user on the plurality of communications platforms;
determining a communication profile of the user based, at least in part, on the logged user-initiated communication events;
determining directory-services information for the user from a directory service; and
quantitatively evaluating a combination of the DLP policy violations, the communication profile, and the directory-services information via one or more rules, wherein the trust measure comprises a numerical result of the quantitatively evaluating;
accessing a self-service access policy applicable to the particular content;
ascertaining, from the self-service access policy, a trust threshold applicable to the particular content; and
responsive to a determination that the trust measure fails to satisfy the trust threshold, automatically denying access by the user to the particular content.

13. The information handling system of claim 12, wherein the enumerating comprises enumerating quasi-violations by the user on the plurality of communications platforms.

14. The information handling system of claim 12, wherein the determining the communication profile of the user comprises:
accessing event-assessment data for the logged user-initiated communication events, wherein each user-initiated communication event relates to at least one communication of a plurality of communications, wherein the event-assessment data comprises information related to a content-based classification of each of the plurality of communications;
determining event-context information for each of the logged user-initiated communication events, the event-context information comprising user-identification information, user-location information, event-timing information, and user-device identification information;

correlating the event-assessment data to a plurality of user contexts, each user context defined by a distinct subset of the event-context information;

associating at least one user-communication pattern with each user context based, at least in part, on the correlated event-assessment data; and generating the communication profile using a result of the associating.

15. The information handling system of claim 12, wherein the determining the communication profile comprises accessing a pre-processed communication profile of the user.

16. The information handling system of claim 12, wherein the quantitatively evaluating comprises:

determining trust values for the historical DLP violations, the communication profile, and the directory-services information; and wherein the trust measure is based on a combination of the trust values.

17. The information handling system of claim 12, wherein the determining the trust measure comprises accessing a pre-processed trust measure in memory.

18. A computer-program product comprising a non-transitory computer-usable medium having computer-readable program code embodied therein, the computer-readable program code adapted to be executed to implement a method comprising:

receiving a request from a user to access particular content;

in response to the request:

determining a trust measure of the user, wherein the trust measure is based, at least in part, on an analysis of logged user-initiated communication events of the user on a plurality of communications platforms, wherein the trust measure is variable over time in relation to the logged user-initiated communication events;

wherein the determining the trust measure comprises:

enumerating historical data loss prevention (DLP) policy violations by the user on the plurality of communications platforms;

determining a communication profile of the user based, at least in part, on the logged user-initiated communication events;

determining directory-services information for the user from a directory service; and quantitatively evaluating a combination of the DLP policy violations, the communication profile, and the directory-services information via one or more rules, wherein the trust measure comprises a numerical result of the quantitatively evaluating;

accessing a self-service access policy applicable to the particular content;

ascertaining, from the self-service access policy, a trust threshold applicable to the particular content; and responsive to a determination that the trust measure fails to satisfy the trust threshold, automatically denying access by the user to the particular content.

\* \* \* \* \*